(12) United States Patent
Liu et al.

(10) Patent No.: US 6,839,680 B1
(45) Date of Patent: Jan. 4, 2005

(54) INTERNET PROFILING

(75) Inventors: Albert M. Liu, Cupertino, CA (US); Stefan F. Gower, Fremont, CA (US); Hamid Ben-Malek, Sunnyvale, CA (US)

(73) Assignee: Fujitsu Limited (JP)

( * ) Notice: Subject to any disclaimer, the term of this patent is extended or adjusted under 35 U.S.C. 154(b) by 0 days.

(21) Appl. No.: 09/410,151

(22) Filed: Sep. 30, 1999

(51) Int. Cl.[7] .............................................. G06F 17/60
(52) U.S. Cl. ...................................................... 705/10
(58) Field of Search ...................................... 705/10, 7

(56) References Cited

U.S. PATENT DOCUMENTS

| | | | |
|---|---|---|---|
| 5,619,709 A | | 4/1997 | Caid et al. ................... 395/794 |
| 5,761,662 A | | 6/1998 | Dasan ......................... 707/10 |
| 5,848,396 A | * | 12/1998 | Gerace ........................ 705/10 |
| 5,901,287 A | | 5/1999 | Bull et al. ............. 395/200.48 |
| 6,009,410 A | * | 12/1999 | LeMole et al. ............... 705/14 |
| 6,144,944 A | * | 11/2000 | Kurtzman, II et al. ........ 705/14 |
| 6,189,008 B1 | * | 2/2001 | Easty et al. .................... 707/10 |
| 6,236,990 B1 | * | 5/2001 | Geller ........................... 705/5 |
| 6,321,206 B1 | * | 11/2001 | Honarvar ....................... 705/7 |
| 6,345,293 B1 | * | 2/2002 | Chaddha ..................... 709/219 |
| 6,483,523 B1 | * | 11/2002 | Feng .......................... 345/745 |

OTHER PUBLICATIONS

Beatty, Sally. "IBM's HotMedia Software Aims to Speed Up Catchy Online Ads," Wall Street Journal. New York: Oct. 27, 1998. (from proqest).*

Cox, Beth. "NetGravity and MatchLogic Form Alliance, " from www.internetnews.com/IAR/article.php/12971, Oct. 27, 1998.*

"Accrue Insight 3.0 Products," Accrue Software, Inc., http://www.accrue.com/products/insight.html, pp. 1–5.

"Business–To–Business E–Commerce: Finding the 80–20 Solution," BroadVision, Inc., White Paper One–To–One Commerce, http://www.broadvision.com/OneToOne/SessionMgr/bv/scripts/welcome.jsp, pp. 1–6.

(List continued on next page.)

Primary Examiner—Tariz R. Hapiq
Assistant Examiner—Johnna Stimpak
(74) Attorney, Agent, or Firm—Fenwick & West LLP

(57) ABSTRACT

A system, method, and various software products provide for consistent identification of web users across multiple web sites, servers and domains, monitoring and capture of data describing the users' web activities, categorization of the web activity data, aggregation of the data into time dependent models describing interest of users and groups over time. Categorization is made with respect to a category tree which may be standardized or customized for each web site. User groups may be defined based on membership rules for category interest information and demographics. Individual user profiles are then created for users automatically based on satisfaction of the user group membership rules. As new data is collected on a user over time, the category interest information extracted from the user's web activity is updated to form a current model of the user's interests relative to the various categories. This information is also used to automatically update group membership and user profile information. Identification of users across multiple sites is provided by a global service that recognizes each user and provides a globally unique identifier to a requesting web server, which can use the identifier to accumulate activity data for the user. Client side user identification is provided to track user activity data on web servers that do not communicate with the global service and do not process activity for category information. User profiles may be shared among web sites that form alliances. User activity data may be aggregated along various dimensions including users/user groups, categorization, and time to provide robust models of interest at any desired time scale.

2 Claims, 19 Drawing Sheets

OTHER PUBLICATIONS

"Dynamo Product Suite," Art Technology Group, http://www.atg.com/products/highlights/index.jhtml?didframe=true, pp. 1–2.

"Engage ProfileServer," Engage Technologies, http://www.engage.com/products/profileserver/default.htm, pp. 1–6.

"GuestTrack Product Overview," GuestTrack, http://www.guesttrack.com/exec/gt/prod-gt-overview.html?user=ffffffffff, pp.1–3.

"Personalization Server," Art Technology Group, http://www.atg.com/products/dps/dps_main.html?didframe=true, pp. 1–4.

"Personify Essentials," Personify, http://www.personify.com/products/offer/essentials/essentials.html, pp. 1–2.

"Personify Essentials Technology," Personify, http://www.personify.com/products/technology/essentialstechnology.html, pp. 1–3.

"Product Datasheet," Open Sesame, http://www.opensesame.com/data.html, pp. 1–2.

"Products and Services, Internet Solutions from Engage," Engage Technologies, http://www.engage.com/products/default.htm, pp. 1–3.

"Products & Services, SelectCast," eHNC, http://www.aptex.com/Products/selectcast/index.htm, pp. 1–2.

"Products and Services, SelectResponse," eHNC, http://www.aptex.com/Products/selectresponse/index.htm, pp. 1–3.

"Smart eMarketing Software," Andromedia, http://www.andromedia.com/products, pg. 1.

"ThemeScape Technology Overview," Cartia, Inc., http://www.cartia.com/products/techoverview.html, pp. 1–3.

"WebGroove Relate," http://www.webgroove.com/relate.html, pp. 1–2.

"WebGroove User Profiling System," WebGroove, http://www.webgroove.com/, pp. 1–2.

\* cited by examiner

INTERNET PROFILING

BACKGROUND

1. Field of the Invention

The present invention relates to the analysis of the behavior and interests of users of online networks, and more particularly to the analysis and modeling of user's interests for users of the Internet and World Wide Web.

2. Background of the Invention

In any market, customer behavior is important. This is true of traditional retail businesses, where there are well developed mechanisms for determining customer's interests. In brick-and-mortar businesses, the customers of the business can be observed by watching those customers walk through a store. Customer behavior can also be observed by tracking their purchases (e.g., through credit card purchases.) Customer observation is, in fact, an important technique used by many retail businesses. It is so important that major databases of customer behavior exist and are in continuous usage. For example, many supermarket chains have vast databases of customer behavior. Analysis of the data in such databases can be used for many purposes (e.g., inventory control, product placement, new product analysis).

Understanding customer behavior is also necessary for electronic commerce, but the techniques of observing the customer in this medium are necessarily different. The way that customers interact with an e-commerce web site is radically different from the experience of walking into a business in person and making a purchase, but many things remain the same. When Web visitors browse a web site, sometimes they buy, and sometimes they do not. Businesses are very interested in knowing why visitors buy and why they don't. So these new electronic merchants want to understand their prospects and their customers. These businesses must observe their web visitors. This observation leads to the need for modeling the interests of customers over time, the need for managing the tremendous amount of data that such modeling would entail, and the need for categorizing web content to providing for meaningful models of user interests.

Conventionally, observation of users in online systems has typically involved using user-provided information about users interests, such as surveys or forms that allow the user the identify the categories of information that are important to them. Examples of this approach include the various customizable home pages offered by search portals such as Yahoo and Excite. In these portals, users can select various predefined categories of interest, and relevant news and related data is then provided to the user. If however the user's interests change over time, the user must manually change the specified categories of interest; this is not done automatically. These sites also allow users to specify their interests with simple keywords, but again, if the interests change, the user must manually change these keywords.

Other web sites more systematically track user behavior in terms of clickthroughs and page views, and then assemble information about these activities. As the user's activity changes on this particular web site, the assembled information is updated. This approach, while capturing some aspects of change in user behavior, it typically limited to only identifying interests relative to a single web site. User behavior on other web sites does not effect the particular site's assembled information, even though such remote behavior may most accurately express the user's interests. More particularly, the analysis of user behavior is typically limited to the particular Internet domain of the server that tracks the usage. User activity at another domain is not tracked.

Further, the assembled information on such a server only expresses the user's interest without respect to potential future or past interests. That is, it does not model changing user interests over time. However, it is the change in user interest over time that is of significant value to web marketers and others attempting to deliver content to web visitors.

SUMMARY OF THE INVENTION

The present invention overcomes the limitations in the prior art by providing a system and methodology, and various software products that tracks user activity across multiple domains, and from such activity develops a time based model that describes the user's interests over time. The changing user interests are also used to determine each user's membership in any number of defined user groups. Each user's time based model of interests and group memberships forms a detailed profile of the Internet activity that can be used to market information and products to the user, to customize web content dynamically, or for other marketing purposes.

Thus the present invention fulfills an important need: to identify web visitors and understand their interests over time. The present invention, sometimes referred to herein as "ProReach" or "ProReach system" is a software system that tracks and analyzes web visitors on the World Wide Web. In short, it helps turn web visitors into web customers. The present invention has the following features and aspects.

First, the present invention can identify and monitor a web visitor as he visits a web site. Of course, on the internet there are many web sites, and there would many web visitors. Whether two web sites or thousands of web sites are involved, or there are millions of web visitors, the present invention provides a system which can identify many visitors across many web sites. Thus, in this aspect, the present invention identifies each visitor to a web site, with unique identification information. This allows the visitor to be consistently identified, during both multiple visits to the same web site, and during visits to other web sites.

ProReach combines data from many web activities to get a more complete picture of a web visitor. ProReach is able to combine the data from these different web sites because the visitor identification process works across the web. This simply means that when a web visitor goes from place to place on the world wide web, ProReach can repeatedly and consistently identify the web visitor typically. More specifically, in contrast to other web tracking products, the ProReach System collects data on both the web server and the web client. ProReach does the latter by providing downloadable software that web clients can install on their systems. Once installed, this software tracks the web user's actions from his machine. Each time he visits a web site, his actions are recorded. Periodically, a compact version of this data is uploaded to ProReach, and then distributed to other web sites which maintain profiles and user group information relative to the user.

Accordingly, the user's activity at each web site there is monitored to identify items of web content with which the user interacts, such as page views, purchases, and so forth. The monitoring may be done by the web server itself, or by the client side software. This monitoring includes identifying each item of web content, such as with its URL or URI, along with information about how long the user viewed the content. This is beneficial because web activities that take longer —such as reading a web page —reflect a higher of interest by the user. The data of a user's specific interaction with an item of content is stored in a web event record. (Certain web activities, e.g., simple, fast clickthroughs may not be tracked in a web event record because they do not useful reflect a user's interest.) This process of identifying web visitors and monitoring the web content they interact with occurs automatically and continuously. Over time then, a large number of web event records will be generated resulting from the activities of many web users at many web sites.

Once data of a web visitor visit to a web site is gathered, this data is not yet in a form that is particularly helpful to making business decisions. For example, it is not particularly helpful to know that some web visitor has viewed hundreds of web pages at a dozen web sites. Rather, it is more useful to understand what kinds of things did the web visitor look at: Motorcycles? Cosmetics? News? Technical information? Music CDs? Books?

Ideally, every document on the World Wide Web would be associated with a description that would describe briefly what that document was about.

That is, this description would categorize that document, much in the way in which books are categorized in a library. Such an ideal is never going to be a reality any time soon, if ever. So there needs to be a way to automatically categorize the documents that a web visitor sees. This categorization technique should be robust, accurate and maintainable.

The ProReach system provides just this capability. It uses a content recognition engine to do this. A content recognition engine is a software component that can take a document and a set of categories and compute how closely the document matches up with these categories. Using the content recognition engine, the ProReach system can categorize various kinds of web document, and provide a ranked list of categories, including hierarchical categories that pertain to the document. The basic idea is that the content recognition engine evaluates some number of categories that may or may not match up with a given document. The content recognition engine tests the document and returns a score as to how closely it matches with each category. During this process, the document gets tested against many categories, so the resulting categorization is really a vector of categorization scores. Each categorization score of that vector shows how well that document matches up with a given category, such as sports, news or computers.

Accordingly, each web event record is processed to determine its relevance to various defined categories. The categories are maintained in a category tree which covers a wide range of categories and topics. Preferably the web content is scored with respect to each category to indicate to the degree to which the content may be said to be about category. This categorization takes place automatically, without requiring action by a webmaster or system administrator.

The categories themselves used as part of the categorization process are part of the data that are provided to the content recognition engine. ProReach preferably provides turnkey categories, allowing the system to categorize web content as soon as ProReach is installed and running on a particular web site. In one embodiment, the turnkey categories are provided from a central host system that is in communication with a particular local ProReach system installation The host ProReach system provides a comprehensive set of categories that target the practical information needs of e-businesses, and it provides sample data for these categories.

As an optional capability, ProReach system users can modify categories, or create their own. In this way, a web site using the ProReach system can categorize the viewing habits of its prospects and customers in a custom fashion. They can create new kinds of categories. This customization is optional. They are not required to do this. ProReach is a turnkey system that is customizable. It is not a system that requires customization to be used. ProReach also provides other tools to assist in the process of category creation and maintenance.

The data about a web visitor's activities is valuable, but ProReach can distill more meaning from this data. Electronic commerce decision makers are interested in the psychographic and demographic profile of the user. They do not want every single detail of the user's activities, but rather a summary of the user's interests which is abstracted from the details of the user's activities. It therefore becomes very desirable that all the detailed data of the user's activities can be compressed into a highly meaningful summary. Accordingly, the present invention further processes this information to develop detailed Internet profiles of each user, and of different user groups and categories of information.

The ProReach system of the present invention creates summaries of a web visitor's activities via a process of web activity aggregation. Through this process, the ProReach system automatically takes the previous history of a visitor's activities and integrates this with data collected from new visits. This process of taking new visits and integrating them with previous visits is performed on an as-needed basis. In this way, the profile of a web visitor is always kept up to date, reflecting that web visitor's interests.

More specifically, ProReach aggregates web visitor's web activity data on three dimensions —on who they are (identity), what they did (content categorization) and when they did it (time). This process is called dimensional combining. Along these three dimensions, ProReach provides sophisticated, statistical-based aggregation.

Another strength of the ProReach system is its flexible approach to aggregating a visitor's activities. Different kinds of e-commerce businesses will want to summarize their visitor's activities in different ways. This is because different companies have different needs for understanding the nature of their customers. Accordingly, aggregation may be tuned to the needs of a particular business.

Hence the ProReach system provides excellent aggregation capabilities that can then be tuned by ProReach system administrators. It allows parameters to be set that control the aggregation process. Power and flexibility are combined. These parameters control what information is maintained and the amount of storage allowed for its maintenance.

In this aspect of the invention then, the web event records accumulated at a given web server are first aggregated into a set of aggregated results for each web user at the site, preferably on a periodic, fixed basis, such as a daily basis. Thus, a user may visit a particular web site several times a day, each time generating dozens of individual web event records. The same is true for many different users. Accordingly, for each user, the web event records are combined to collect all of the categorization information for that user together. In addition, the category score information in each web event record is processed to reflect the duration of the web activity. This processing results in a set of category weights.

The combined category weighting information for the collected period, such as a day, describes in detail the user's degree of interest across a number of categories. However, further processing is beneficial to obtain a more summarized model of the user's interests. Thus, from the weighted category information various statistical measures are derived such as the mean category weight over the period, maximum and minimum weights, standard deviation, and the like. In addition, a trend pattern is also extracted which described whether the user's interest in the category is increasing, decreasing, or constant, or some combination of these, over the time period. This summarized representation of the category weights for the time period can be stored, and best captures the changes in the user's interest, across a number of categories, over the time period. As a result, the underlying raw data of the web event records deleted, so that storage efficiency is achieved.

First, the period information may be aggregated for each user with respect to each of the categories across a longer time period. For example, the daily aggregated information for a user may be further aggregated for a week's time period, a month, a quarter, a year and so forth. This forms what is termed a user-category complex, wherein the statistical information for a single category from many different days is combined by an aggregation function. One exemplary aggregation function is mean, and thus the mean of the category weights for this particular category over the time period is obtain, along with trend pattern and other statistical measures.

Second, dimensional combining may be used to form category complexes. A category complex summarizes a large number of users' interests in a particular category over a selected time period. This complex describes the level of interest, over time, for a population of users in a particular category.

Another type of dimensional combining now makes use the user-category complexes. First, the many user-category complexes for an individual user may be combined for a selected time period, to form an aggregated view of the user's overall interests. That is, the category information from many different categories is aggregated and describes the user's interests overall.

Additionally, the user-category complexes may be combined for an individual category and across selected users who form a user group, to create user group-category complexes. The user group members are selected by having meet certain membership tests based on their category interests and optionally demographics. This gives a summary of the user group's interest in that category over time.

The user complexes can be further combined into user group complexes to describe overall group interest across all categories. Finally, the group complexes may be aggregated to form an overall total complex which describes the total population's interest across all categories for the selected time period.

In addition to the various complexes that may be aggregated, individual profiles of the users can be further augmented with the user group information. A number of user groups may be defined, each having particular membership criteria. Marketers can define groups of users that share interests, buying propensities or demographics. The criteria are preferably based on a user having (or not having) particular levels or ranges of category weights for one or more categories. A user may be member of multiple user groups. The group membership is automatically updated, as the users interacts with web content over time, and as their interests change as expressed by the changing levels of categories weights. The ProReach system will automatically classify a user into the right user groups based on his or her profile. If the definition of the user groups changes, then the ProReach system will automatically re-classify users into the right user groups. Similarly, as the interests of user change, they will automatically be put into the right visitor segments based on their new interests. In this way, a marketer has immediate access to market segments on demand, and can swiftly apply electronic sales campaigns.

The visitor profile information that ProReach systems generate can be retained for the sole use and benefit of the web site that created it. It also possible for ProReach systems to share their user profile information. To facilitate this sharing, ProReach provides a centralized service that helps ProReach systems define policies for the transfer of information between each other. For ProReach customers that want a deeper relationship with each other, the present invention provides for an alliances. An alliance is a group of ProReach systems who have decided to contribute their user profiles into a database of profiles. All members of the alliance contribute profiles, and all members of the alliance benefit by getting a degree of access to the alliance profiles. In particular, alliances are useful to vertical markets where companies may want to work together on the world wide web. Such groups of businesses may benefit from combining their information, but they need the infrastructure to facilitate this sharing, regulate it and make it safe. ProReach provides this enabling infrastructure. In an alliance, each member contributes visitor profiles created for visitors to the member's web sites. These contributed profiles are aggregated together in a database of profiles maintained by the alliance. All members to the alliance get controlled access to these profiles. A system of sharing rules controls this whole sharing process, so that companies only share selected information. ProReach supports the formation of multiple alliances. An ProReach-enabled system can belong to more than one alliance.

A very large amount of visitor activity data will be generated by web sites using ProReach systems. The existence of this data raises privacy concerns. It also raises issues about how ProReach Systems themselves share data amongst themselves. ProReach has an architecture that addresses privacy concerns. ProReach ensures the privacy of web visitors via what it calls an identity firewall. The purpose of an identity firewall is to establish a boundary. Inside the boundary of the identity firewall, the identity of a web visitor is accessible to authorized personnel or processes. Other personal information is also available, such as e-mail address, home address and age.

Outside the boundary of the identity firewall, no data is provided that could be used to identify a web visitor. Instead, any person or process requesting information outside an identity firewall, only gets an opaque visitor identifier. The ProReach System that issues the opaque visitor identifier can use it to uniquely identify the web visitor. Hence, an opaque visitor identifier is an externalizable reference to ProReach visitors.

A person or process with an opaque visitor identifier can present the opaque visitor identifier to that ProReach System. The ProReach System can then map that opaque visitor identifier back to the actual visitor. Using this method, it is possible for a web marketer, for example, to be given a large amount of information about the interests of a web visitor but the marketer doesn't know the visitor's identity or contact information. The web marketer is simply given an opaque visitor identifier (or a set of such identifiers). The marketer gets the data he needs, but the privacy of the visitor's data is maintained. So outside the identity firewall, a web visitor being tracked by ProReach is anonymous.

The web marketer may have the ProReach system contact the web visitor on his behalf using IPro's Visitor Contact Service. Given an opaque visitor identifier and a message, the Visitor Contract Service looks up the e-mail address (or other necessary information). It then sends the message to the web visitor. The web marketer gets his message delivered to the web visitor, but the web marketer does not know the web visitor's identity.

Identity firewalls can be flexibly configured. They can be configured so that the identity firewall encloses a single ProReach System. They can be configured so that an identity firewall encloses a group of ProReach systems. The latter configuration would make sense when there are multiple ProReach servers working as a group (e.g., for a portal with multiple servers) and data should be shared between the servers.

DETAILED DESCRIPTION OF THE PREFERRED EMBODIMENTS

TABLE OF CONTENTS

Figure 1:
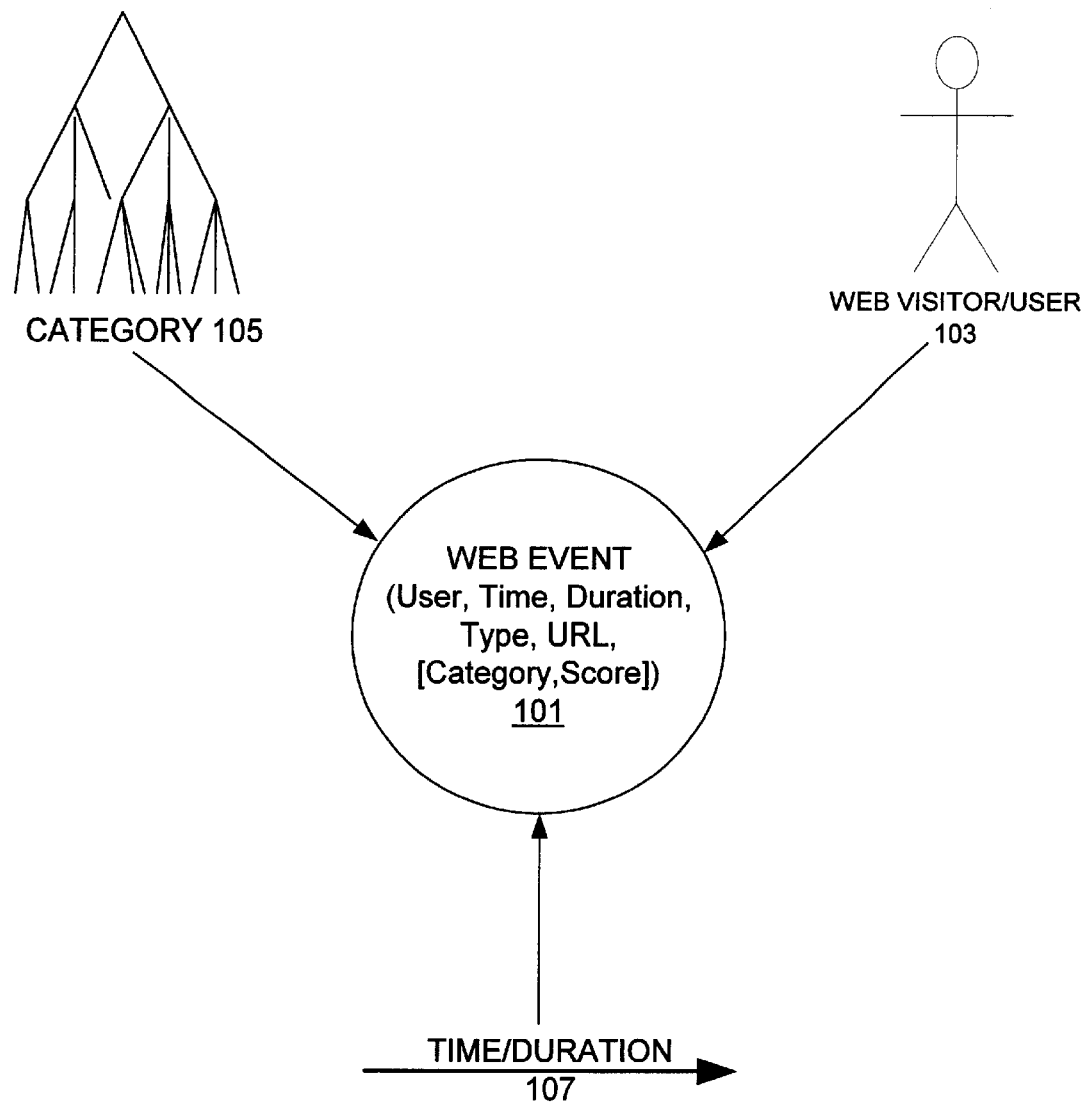
FIG. 1 illustrates the features of a web event.

I. WEB EVENTS AND AGGREGATION
   A. WEB EVENT RECORDS
II. OVERVIEW OF PROREACH SYSTEM ARCHITECTURE
   A. GLOBAL SERVICES
III. BASIC SYSTEM PROCESSING
   A. PROREACH FUNCTIONAL OVERVIEW
   B. CATEGORY DISCOVERY AND MAINTENANCE
      1. Category Discovery
      2. Category Maintenance IV. PROREACH SYSTEMS WITH ALLIANCES
V. AGGREGATION
   A. AGGREGATING DAILY WEB EVENTS
      1. Transform Category Scores to Weights
      2. Restructure Web Event Records to Collate Category Weights by User
      3. Create Category Interest Time Model Information
   B. DIMENSIONAL COMBINING
   C. USER GROUP SYSTEM
   D. DAILY AGGREGATION
   E. AFFINITY GROUP MANAGER
   F. THE UPDATE OBJECT
   G. SCHEDULER
   H. EVENT DISPATCHER
   I. PROFILE SYSTEM
   J. AQL SYSTEM
      1. AQL Language
      2. AQL Interpreter
VI. CATEGORIES AND CATEGORIZATION
   A. OVERVIEW OF CATEGORIZATION
   B. CATEGORIES AND HIERARCHIES ORGANIZE DATA
      1. Building and Maintaining Category Hierarchies
   C. CATEGORY NAMES AND ID'S
      1. Default Unalterable User Category Structure
      2. Similarities and Differences Between Categories and Groups
   D. USING SOURCE OR LOCATION IN CATEGORIZATION
   E. THE CONTENT CATEGORY LIFECYCLE:FORMATION, TUNING, AND CHANGE
      1. The Standard Category Tree and Additions by ProReach System Administrators
         a) Adding Categories At ProReach systems
         b) Updating the Standard Category Tree
         c) Building the Standard Category Tree
         d) Discovery, Refinement, and Editing of Categories
   F. CATEGORIZATION MODEL OF THE CONTENT RECOGNITION ENGINE
      1. Category Creation
      2. Document Categorization
      3. Multiple Dictionary Categorization
      4. Category Cache
VII. GLOBAL SERVICES
   A. GLOBAL IDENTIFIER SERVICE
      1. Requests For GIDs.
      2. Individual Identification via PIDs
   B. GLOBAL UPLOAD SERVICE
   C. GLOBAL CLIENT MANAGEMENT SERVICE
   D. YELLOW PAGES
   E. GLOBAL EXCHANGE POLICY
VIII. PROREACH CLIENT SIDE WEB USAGE DATA COLLECTION
   A. WEB ACTIVITY MONITORING
   B. PROREACH CLIENT WEB USAGE DATA FILTRATION AND AGGREGATION
      1. Time-based consolidation
         a) Adjust web event record time stamps
         b) Ignore short-term activities
         c) Aggregate Web activities
      2. Other Filtration of Data
      3. Privacy Control C. FILTRATION BASED ON PRIVACY SETTINGS (USER MODIFIABLE)
  1. URL pattern-based filtration
  2. Keyword-based filtration
D. DEFAULT PRIVACY-RELATED FILTRATION
E. PROREACH CLIENT DATA UPLOAD
  1. ProReach client upload queue
  2. ProReach Upload Stream and Upload Record
  3. Data upload
    a) Web Event Record upload
    b) Homepage URL upload
  4. Upload time and upload stages
    a) Pre-upload stage
    b) Upload stage
    c) Post-upload stage
  5. ProReach Upload Service and upload
IX. CONTENT TARGETING
  A. ACCESS TO PROFILE BY A CGI
    1. Access to page Metadata by CGI
      a) Handling dynamic content categorization of multipart pages at runtime I. Web Events and Aggregation Referring now to FIG. 1, there is shown an illustration of the concept of a web event, which is used as a basic modeling unit for measuring the interests of web visitors in web content. A web event 101 is the combination of three different types of information. First, a web event 101 contains information which uniquely identifies the particular web visitor 103, or generically a "user." This user can be an individual person, or any group of persons to which the user is deemed to belong. Second, a web event 101 includes information which describes or measure 107 the amount of time spent by the web visitor in viewing or interacting with the web content.

Finally, the web event 101 includes information that identify one or more categories 105 into which the web content visited by the web visitor belongs and a measure of the user's interest in each of the one or more category. The categories used to describe the web content preferably form a hierarchy of categories, with parent categories (e.g., "Sports") having multiple child categories (e.g., "Soccer" and "Golf").

These three pieces of data are used model the basic idea that a user viewing or interacting with an item of web content is expressing an "interest" in whatever category or categories that web content is about. The longer the visitor views or interacts with the content, the greater the visitor's interest is presumed to be (other factors may also be used to scale the level of interest, such as the type of interaction, e.g., a simple viewing of a page versus a purchase).

This measure of interest in of a user in a category at a particular time or duration is expressed as a weight. A weight is a function of the amount of time spent by the visitor interacting with an item of web content, and the degree to which the category is deemed to describe the content. In a preferred embodiment where there are a number of categories available, a web event includes a weight for each category. This reflects the fact that a given item of web content may relate to many different categories in different degrees.

To provide a meaningful scale of interpretation of these weights, and hence a level of interest in a category, the weights are scaled to a standard unit called an interaction unit. An interaction unit is interpreted to mean 1 minute of attention paid by a user to an item of content. By scaling web events using interaction units, it becomes possible to meaningfully compare the interests of any variety of different users and categories of web content.

These three types of information are collected for each item of web content viewed by a web visitor at a particular web site, and by extension by multiple different visitors across many web sites. For example, as the visitor moves from one web page to another on a given web site, a web event is generated which encapsulates the information identifying the visitor, the category description of the page, and the amount of time spent by the visitor on the page. As the same visitor visits different web sites, they are identified and web events which capture the category of content and time spent viewing such content are generated.

In themselves, web events are merely individual data items, and do not directly describe the overall patterns of interest of any individual user or groups of users, or patterns relatives to categories or time. This level of abstraction is provided by a second aspect of the present invention, aggregation. Most generally, aggregation is the process of summarizing the weights of different groups of web events to establish patterns of interest. Generally, web events can be combined with respect to time periods, individuals users, groups of users, categories, or groups of categories, or any combinations of these. When considered together, there are six different ways to combine web events:

1) Combine all web events between two dates: This combination approach combines web events related to all categories and all users over a given time period to provide a model of the global interests of the population of users.

2) Combine all web events for a category between two dates: This combination combines the web events for a specific category (or group of categories) for all users over a given time period to provide a model of the user's level and pattern of interest in the specified category.

3) Combine web events for a user and a category between two dates: This combination combines the web events of specific user and a specific category over a time period to provide a model of the user's level and pattern of interest in the specified category.

4) Combine web events for a user group and a category between two dates: This combination provides a model of the group's interest in the specified category.

5) Combine web events for a specific user between two dates, across all categories. This combination provides a description of how the overall distribution of a user's interests for all categories, whether narrowly interested in one or a few categories maintained a web site narrow or broadly interested in many of the categories at the web site.

6) Combine web events for a user group between two dates, across all categories.

In one embodiment, when performing these various types of combinations, the events selected during a given time period are thus which start during the time period, even if they end after the selected time period.

Figure 2:
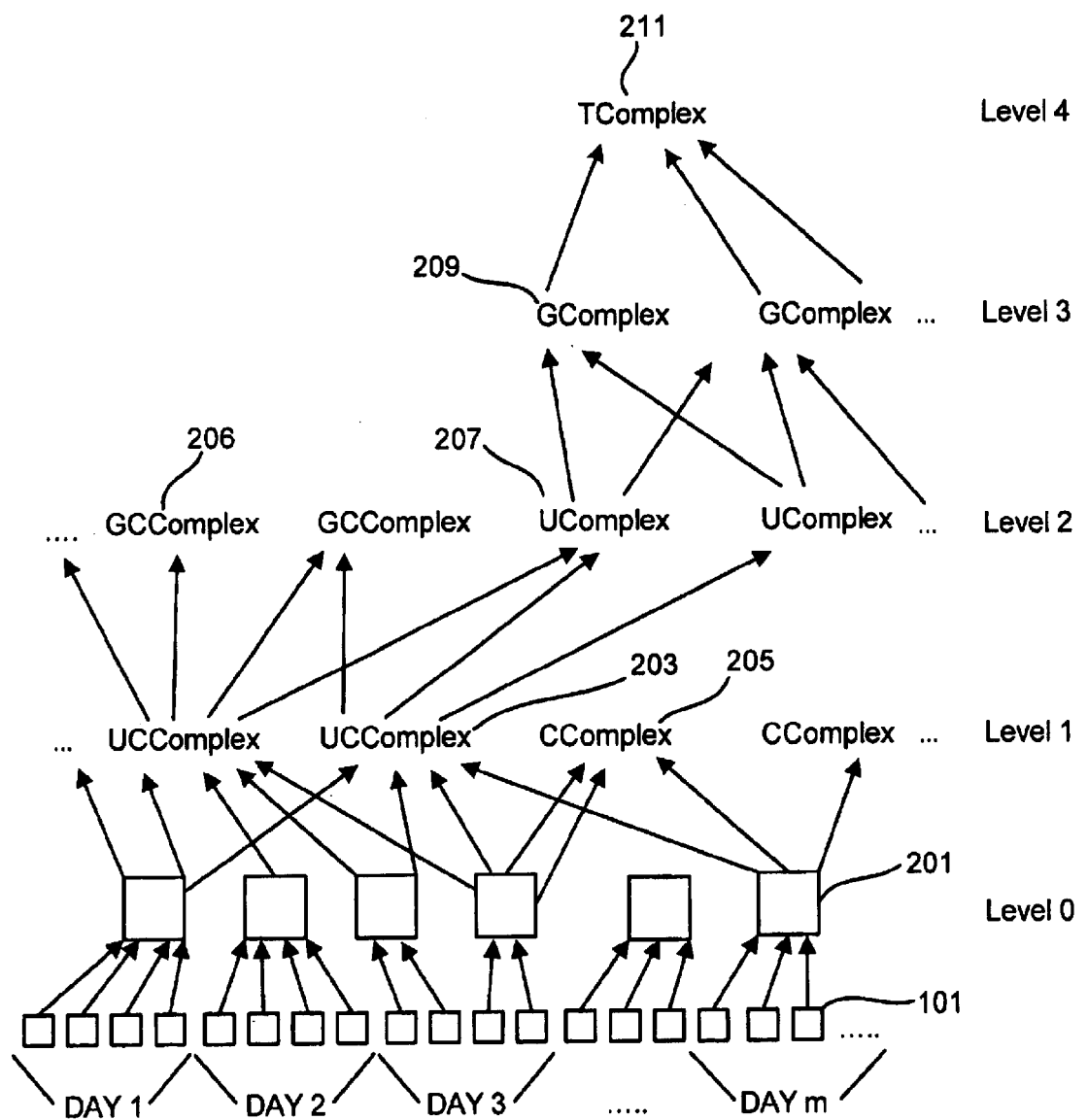
FIG. 2 illustrates data flow in the process of aggregating web events and creating user profiles.

We call the process of combining web events in these various ways "dimensional combining", since there are six "dimensions" in the data along which web events may be combined. These possible combinations can be used to provide an analysis of any user's or group's interest in any category or categories over any time period. Referring now to FIG. 2, there is shown an illustration of these various ways of combining web events.

In FIG. 2 there is shown a number of discrete web events 101, occurring over some period of time, such as a number of days. All of the web events 101 for each day are aggregated into user specific, daily aggregated results 201. These daily aggregated results 201 form what is labeled as Level 0 of the figure. To obtain an understanding of the web visitors' interests, the web events over some number of days (e.g., week, month, quarter, year, etc.) are combined in different ways, as discussed above.

First, in Level 1, the daily aggregates can be combined per (3) above into "UC" or User-Category complexes 203, or per (2) above into individual "C" or Category complexes 205. Note that a single daily aggregated result 101 may contribute to either of these complexes; that is, the results of a particular web visitor's web activity contributes to both the Category complexes 205 for all categories effected by that visitor's activity, as well as to that user's specific user-category complexes 203 describing that user's level of interest in the various categories.

Next in Level 2, the individual UC complexes can themselves be combined. First, per (4) above, the particular UC complex for certain users who form a user group can be combined into "GC" or Group-Category complex 206. This complex 206 describes the group's interest in the particular category for the data. Second, per (5) above, all of the User-Category complexes for a particular user can be combined to form a single "U" or User complex 207, summarizing the user's interests across all of the categories. The User complex 207 is particularly useful to gauge the breadth or narrowness of user's interest. For example, a web site may have a limited number of categories of content. For one user of this web site, the user complex 207 may show a high level of interest in a just one or two categories, whereas another user's user complex 207 may show a high level of interest in a majority of the categories; this second user is like to be more valuable to the web site for purposes of marketing or other value driven activities.

Next in Level 3, the complexes 207 for individual users can be combined per (6) into "G" or Group complex 209 across all categories.

Finally, in Level 4, the complexes 209 from the many groups can be combined per (1) above into Total complex 211, describing the interests of all users across all categories.

This web event modeling and aggregation framework provides many advantageous features. First, it allows a system administrator (or a member of ProReach System) to arbitrarily select the time period over which any of these aggregations to obtain broader or narrow analyses of the time pattern of the users' interests. This is useful to identify very short term interest trends or longer term trends in users' interest. Second, because each level of aggregation fully captures the information of the level below it, the underlying web event data may be selectively discarded to improve storage efficiency. For example, web events for categories which have a very low level of interest (identified by a low weight) may be discarded after their data has been summarized into UC or C data. Web events with greater weight may be stored longer to allow them to be used for more analysis or marketing.

A. Web Event Records

When a web visitor performs a web activity, such as viewing the contents of a uniform resource locator, or clicking on a submit button that initiates a web transaction, this web activity is recorded by client-side or server-side trackers, which record this web event. The data of each web event is stored in a web event record. Web event records are then aggregated into the daily aggregated results 101, and from there into the various complexes. The basic features of a web event record are as follows:

| \multicolumn{2}{c}{Web Event Record} | |
|---|---|
| Field | Explanation |
| User ID | Uniquely identifies the visitor |
| Location | The URL or URI of the web content. |
| Start time | Onset of activity in Greenwich Mean Time for a single event. If there are multiple events at this URL, then the time of the earliest download. |
| End time | Last recorded activity in Greenwich Mean Time for a single event. If there are multiple events at this URL, then the time of the last download. If unknown, a default 1 minute from the start time is used. |
| Event type | Stores a value indicating the type of web activity, such as view, clickthrough, purchase, and so forth. |
| Event count | The number of times this URL/URI was downloaded |
| Category Score | The category scores for the content. |

For example, assume that a user's web activity is as follows:

| Activity | Start Time–End Time | URL | Duration |
|---|---|---|---|
| 1 | 10:05 am–10:10 am | <URL A> | 5 min |
| 2 | 10:10 am–10:12 am | <URL B> | 2 min |
| 3 | 10:12 am–10:14 am | idle | |
| 4 | 10:14 am–10:15 am | <URL C> | 1 min |
| 5 | 10:15 am–10:15:03 am | <URL B> | 3 sec |
| 6 | 10:15:03 am–10:16 am | <URL A> | 57 sec |
| 7 | 10:16 am–10:16:06 am | <URL D> | 6 sec |
| 8 | 10:16:06 am–10:16:10 am | <URL A> | 4 sec |
| 9 | 10:16:10 am–10:22:30 am | <URL E> | 6 min 20 sec |
| 10 | 10:22:30 am–10:30 am | idle | |

The web event records may be generated by either the web client 108 or the web server 102. If generated on the web client 108, the corresponding web event records would be as follows (note that the user ID and category score information is not shown here).

| URL | Start-time | End-time | Duration | Occurence |
|---|---|---|---|---|
| <URL A> | 10:05 am | 10:16:10 am | 5 min 57 sec | 2 |
| <URL B> | 10:10 am | 10:12 am | 4 min *(see Note 2) | 1 |
| <URL C> | 10:14 am | 10:15 am | 1 min | 1 |
| <URL E> | 10:16:10 am | 10:22:30 am | 5 min *(see Note 3) | 1 |

Note 1. When a URL is captured, the current time is stored in the Start-time timestamp field in web event record. The difference between the current time and the time in the timestamp of the previous record is calculated and stored in the previous record's "duration" field.

Note 2: Duration may or may not equal (End-time —Start-time). This is because there may be other events between the earliest download at this URL and the last download. For example, there is a gap of 2 minutes between visits to <URL B> and <URL C>. The "duration" in the activity table shows the actual time a user spends on browsing a particular URL, while the "duration" in web event record is an approximation of that time. Where the web event record is created by the web client 108, then the client software may only approximate the real "duration" by taking the Start-time of the next URL as the End-time of the current URL. There is no way for the software to know about idle gaps in between URL visits without user intervention. Where the web event record is generated by the web server 102 that is tracking the user, then the duration can be estimated.

Note 3. Here too, the duration for <URL E> can only be calculated by the web client 108 as 13 min 50 sec (10:30—

10:16:10=00:13:50). The web client 108 will not know of the idle time after the access to <URL E>. However, the web client 108 (or the web server 102) may keep a pre-set max time for the duration of a single URL access, for example, 5 minutes. This is to normalize the "duration" factor so that no one single URL access can have abnormally large "duration". A user may be tied with other activities for a while between the two URL accesses, and this may result in some abnormally large duration numbers. Those abnormally large duration numbers will incorrectly affect a user's Web usage pattern and profile. Note that the cumulative duration, however, is not limited to that max duration number. For example, the duration for <URL A> is an aggregation of two separate URL accesses; therefore, it is not confined to the 5 minutes limitation.

Note 4. Activities 5, 7, and 8 were not included in the total duration of any web event since they were filtered out for being two short of a period of time. This is done to help reduce the data collection requirements and because such short duration views are not likely to be indicative of the user's actual interests.

The next sections we describe the architecture and functionality of a system which records web events and provides the various capabilities to aggregate data as described.

II. Overview of ProReach System Architecture

The present invention may be embodied in a system which we call "ProReach". We begin with a very high-level overview of the ProReach architecture, and describe the high-level components involved in this architecture, and show the high-level relationships between these components. We will also describe some typical configurations of ProReach, and show how ProReach supports one or more web servers, both behind and across firewalls. A discussion of the basic elements of alliances is included.

Figure 3:
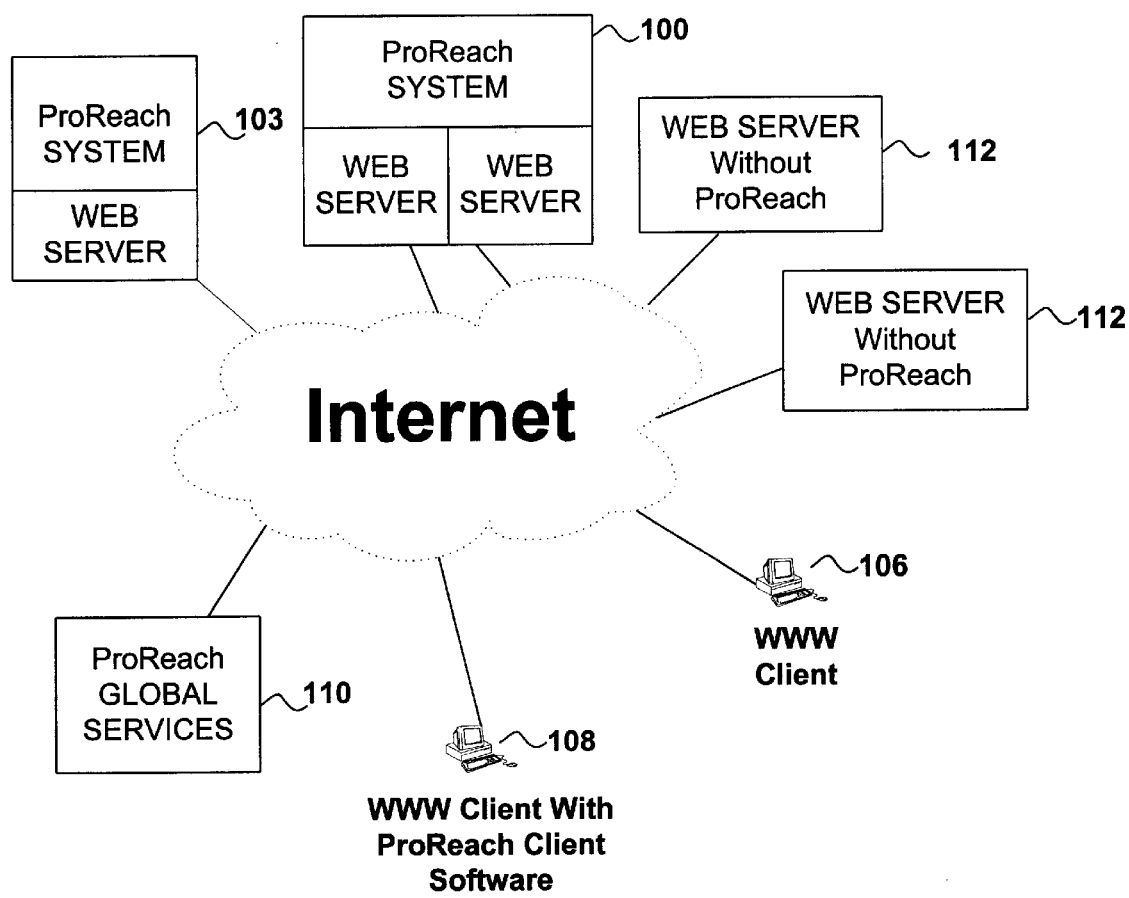
FIG. 3 illustrates a top level system architecture of various ProReach systems.

Referring to FIG. 3, there is shown various ProReach systems 100 operating over the Internet. Each ProReach system 100 handles one or more web servers 102. These web servers 102 can all belong to the same domain, or they can be belong to different domain. FIG. 1 depicts two ProReach systems 100. One ProReach system 100 supports a single web server 102, while the other ProReach system 100 supports two web servers 102. In all, there are three ProReach-enabled web servers 102 in this figure.

Each ProReach-enabled web server 102 of a ProReach system 100 tracks 20 the web visits of individual web visitors at the web site that the web server 102 serves. The web server 102 tracks and identifies the web visitor, obtains category information for the viewed content, and logs the visit, including its time or duration. Once this data is gathered, the ProReach system 100 architecture, and show the high-level relationships between these components. We will also describe some typical configurations of ProReach, and show how ProReach supports one or more web servers, both behind and across firewalls. A discussion of the basic elements of alliances is included.

Referring to FIG. 3, there is shown various ProReach systems 100 operating over the Internet. Each ProReach system 100 handles one or more web servers 102. These web servers 102 can all belong to the same domain, or they can be belong to different domain. FIG. 1 depicts two ProReach systems 100. One ProReach system 100 supports a single web server 102, while the other ProReach system 100 supports two web servers 102. In all, there are three ProReach-enabled web servers 102 in this figure.

Each ProReach-enabled web server 102 of a ProReach system 100 tracks the web visits of individual web visitors at the web site that the web server 102 serves. The web server 102 tracks and identifies the web visitor, obtains category information for the viewed content, and logs the visit, including its time or duration. Once this data is gathered, the ProReach system 100 analyzes the data in order to evaluate the web visitor, and create or update a profile of the web visitor. The resulting profile of the user (or other profiles that are effected by the user's visits) can be used for marketing purposes, for page composition or for driving banner ads.

The various ProReach system make use of ProReach Global Services 110. These global services 110 perform various tasks that are best centralized for purposes of efficiency and integrity of information. These global service 110, which are further discussed below, including identification of web visitors, maintenance and distribution of standardized categories to the various systems 100, and mechanisms for exchanging information between systems 100.

FIG. 1 further depicts two web clients 106, 108. A web client is a conventional computer that includes a web browser, such as Netscape Communicator® or Microsoft Internet Explorer®. ProReach integrates with existing web browsers, and a special browser is not necessary to obtain the features or benefits of the invention. As an optional enhancement however, certain web clients 108 may be ProReach-enabled. That means that these clients 108 executes client-side tracking software. On a periodic basis, ProReach-enabled clients 108 automatically use ProReach Global Services 110 to upload the data of their web activities, particularly to track web events of the users of the web client on web sites that are do not have a ProReach system 100. This feature allows a more complete view of a user's interest, since it allows for integration of information about all web activity of the user, not just that activity at the ProReach systems 100 and servers 102. ProReach Global Services 110 is then responsible for sending this client data to various ProReach systems 100.

Figure 4:
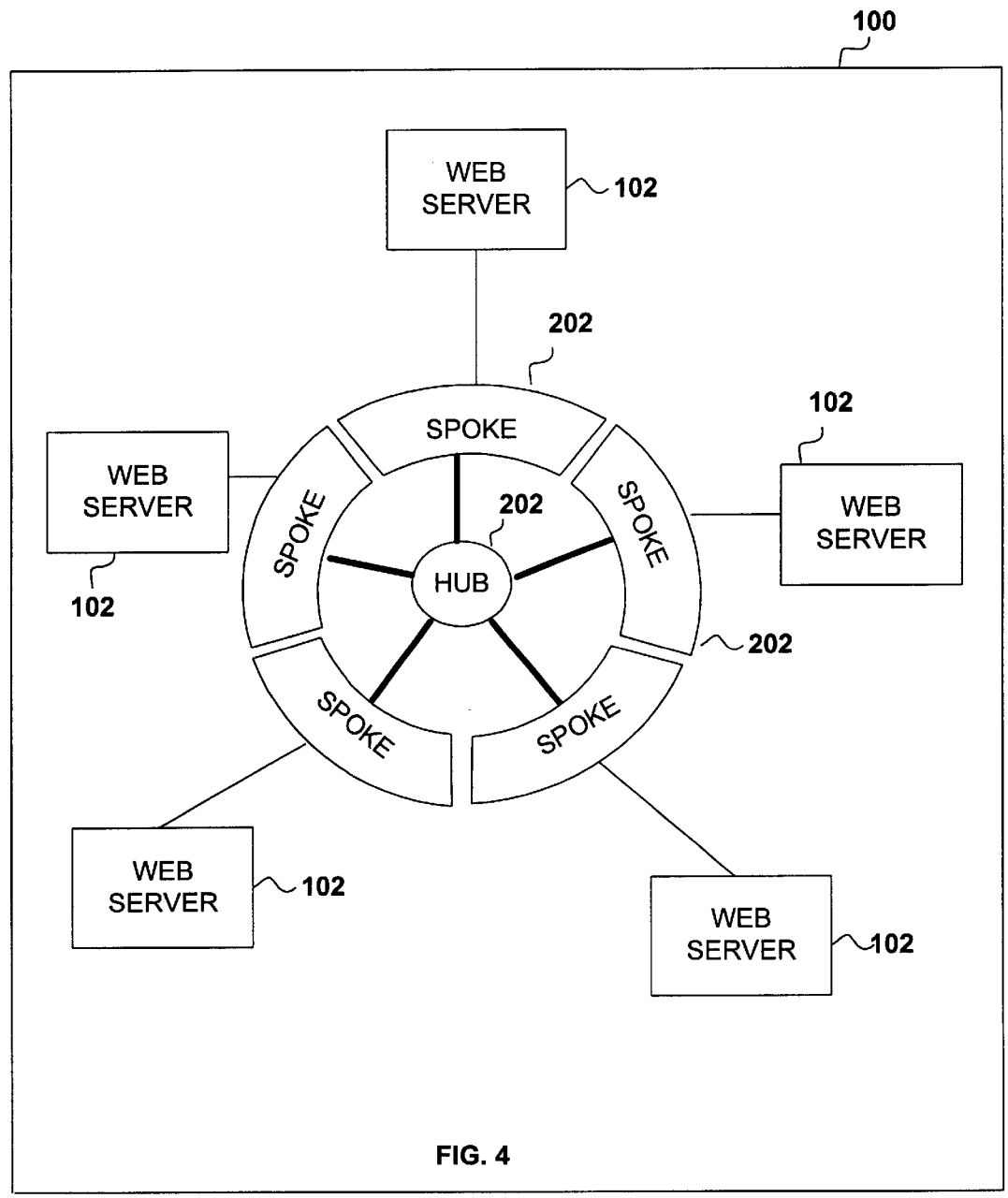
FIG. 4 illustrates the hub and spoke architecture of a ProReach system.

Referring now to FIG. 4, to support multiple web servers 102, each ProReach system 100 is configured in a hub and spoke topology, that includes a hub 204 and one or more spokes 202. Each hub and spoke is a collection of executable software modules. Overall, a ProReach system 100 executes on enterprise server-class hardware, such as a Fujitsu teamserver M800i series server, which is a large scale web-hosting server with 4 Pentium® II Xeon™ processors and 8 GB of memory. The software environment preferably includes Microsoft Windows NT 4.0 as the operating system, including Microsoft® Internet Information Server® 4.0 (IIS) for web site management, Microsoft Proxy Server 2.0 for firewall management, Microsoft Site Server 3.0 for content management and delivery based on user and group profiles.

More particularly, each spoke 202 is dedicated to collecting and categorizing the visitor data from a web server 102. Once the data is collected from the web server 102, it is partially processed on the spoke 204. The partially processed data is then moved from the spoke 202 to the hub 204. At the hub 204, the data is aggregated and further analyzed to produce up-to-date visitor profiles. Note that data from the same web visitor might stream in from different spokes 202, where the hub 204 aggregate this data into the appropriate user profile.

Figure 5:
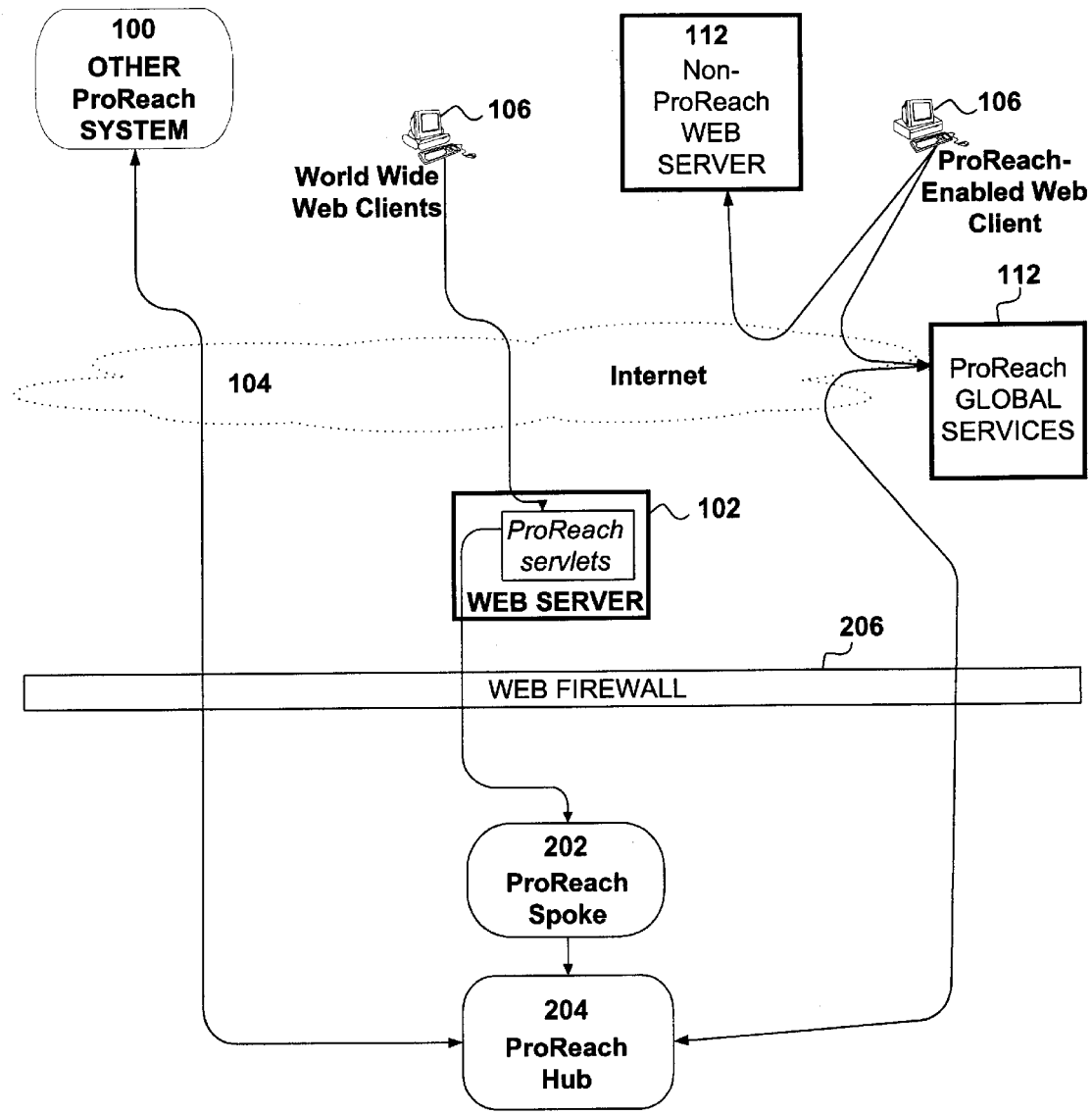
FIG. 5 illustrates an embodiment of a ProReach system operating with a firewall.

ProReach is architected so that most ProReach services are within company firewalls. Web servers 102 themselves are outside the firewall. A typical ProReach configuration including a ProReach system 100 for a single web server is depicted in FIG. 5. Here, the ProReach-enabled web server 102 is outside the firewall 206. An ProReach spoke 202 is connected to the web server 102, with communication taking place using server-side plug-ins, such as Java servlets. The ProReach spoke 202 itself is connected to a ProReach hub 204, as previously described. In FIG. 5, only one spoke 202 is shown, but as described, multiple spokes 202 may be used, each supporting it own web server 102. ProReach-enabled clients 108, having tracked user visits at non-ProReach web servers 113, send their accumulated usage data to the ProReach Global Services 112. In turn, ProReach Global Services 112 routes the usage data to the appropriate ProReach systems 100. FIG. 5 also illustrates how a ProReach system 100 can partner with other ProReach systems 100. Note how the hub 204 of one ProReach system 100 communicates with other ProReach systems 100. Such communication can involve sharing of data between the systems 100.

ProReach also works across web firewalls 206. For example, suppose a company had two web servers 102, each with its own domain name and firewall 206. It might be desirable to track all the web visitors at these web sites. In this case, a different configuration of ProReach is used, in which one of the spokes 202 attached to a local hub 204, and the other spoke 204 is remote and behind another firewall 206. The ability for ProReach to work across firewalls is desirable, particularly when web sites belonging to different organizations or companies are to be grouped together as logical unit, with the data of their web visitors shared.

A. Global Services

Figure 6:
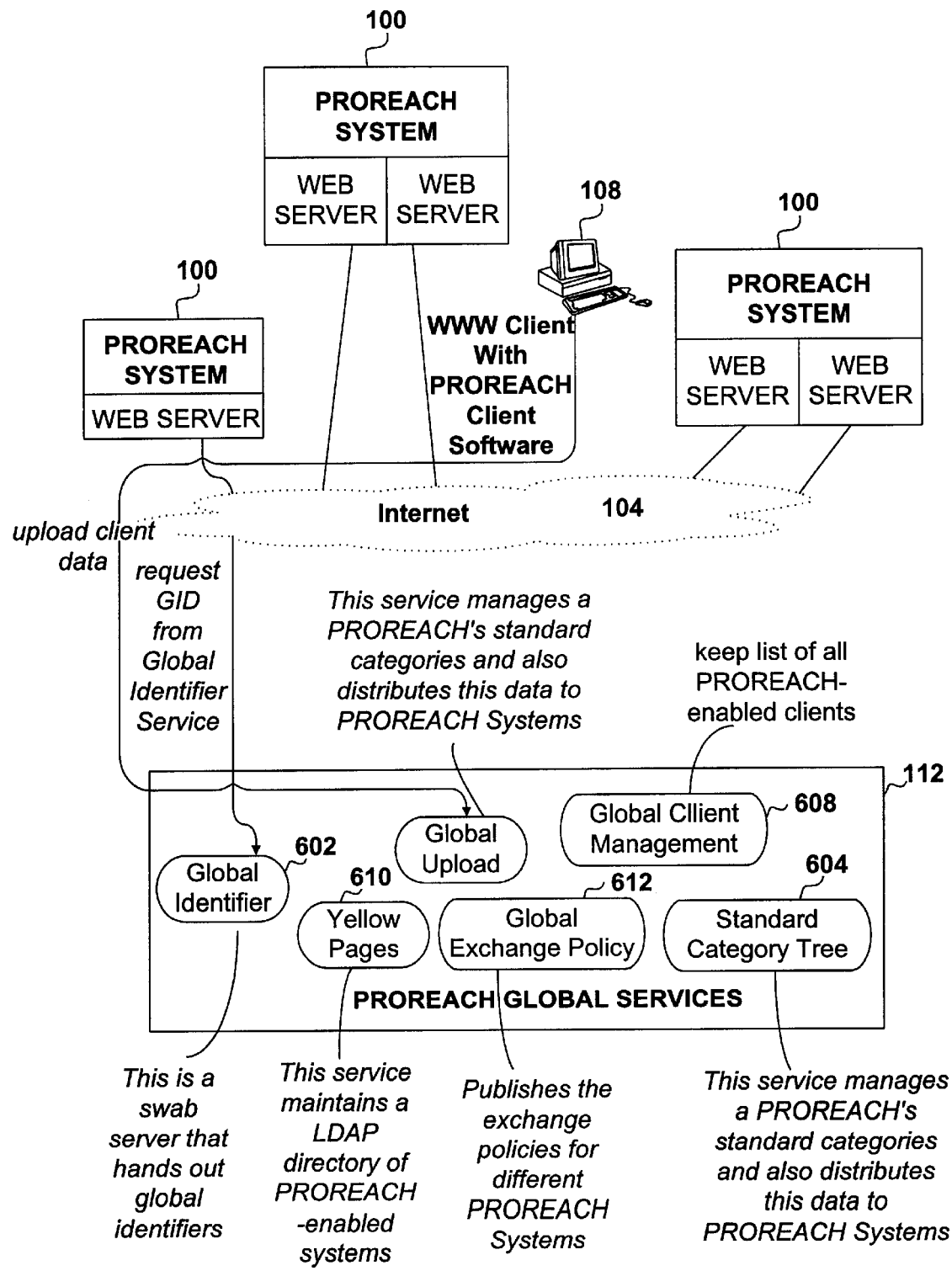
FIG. 6 illustrates the Global Services server.

In one embodiment, ProReach provides a number of global services 112. These services are provides by a master host system and server, such as may be provided by an overall provider of ProReach systems 100. The global services are shown in FIG. 6.

Global Identifier Service 502. This global service allocates global identifiers [GIDs] and provides other functionality related to visitor identification. A GID is used to globally identify a web visitor, so that the visitor's web events and other usage data can be properly collated when received from many different ProReach systems 100 or ProReach enabled web clients 108.

Global Category Tree Service 504. This global service maintains and distributes a standard collection of categories. This allow the different ProReach systems 100 to use a common set of categories for describing and categorizing web content. In this manner, interest information from many different web site can be measured and evaluated against a common framework of categories.

Global Upload Service 506. This global service works with the client tracking software to received uploaded web activity data from the various ProReach enabled web clients 108. This global service then distributed this web activity data to the appropriate ProReach systems 100.

Global Client Management Service 508. This global service helps manage ProReach-enabled ProReach enabled web clients 108, by keeping a list of all such clients, and by maintaining this list (e.g., adding new ProReach enabled web clients 108 and deleting those no longer in operation).

Global Yellow Pages 510. This global service maintains an LDAP directory of ProReach systems 100.

Global Exchange Policy Service 512. This global service allows individual ProReach system 100 to describe the business rules under which it will exchange web visitor information with other ProReach-enabled systems 100.

III. Basic System Processing

ProReach's job is to capture user data, subject it to analysis and produce a visitor profile summary for any individual visitor or groups of visitors collectively. The visitor profile summary describes the interests of that given web visitor or group. There are many different processes involved in producing this web profile summary. These generally are as follows:

tracking visitor web visitor activity on the web server;
tracking visitor web visitor activity from the web client;
categorizing the documents that the web visitor views and determining their weights;
aggregating web events by time, by user and by category;
identifying the same web visitor when he visits different web sites;
aggregating the data —at different web sites —for the same web visitor, so that a global profile of the web visitor results;
category discovery and maintenance In the first of the next two sections, we will summarize through some ProReach's key applications processes. Following that section, we will look at category discovery and optimization.

A. ProReach Functional Overview

In this section, we describe the basic processing steps that take place, in order to show how data flows through a basic ProReach system 100. We will also view in more detail the structural features of a ProReach system 100.

Because we want to concentrate on these basic processing steps, we will make some simplifications and only explores a specific scenario. We will explore a scenario where the ProReach-enabled web server 102 only tracks web visits based on cookies resident on web clients 106. So while ProReach also tracks web visitors based on their login name and other information, this tracking is not shown below. We also assume here that the web client 106 allows cookies, which is true for most web clients.

In general, the overall process of tracking web activity is as follows:

A web client 106 visits a ProReach-enabled site 100.

The ProReach-enabled web server 102 redirects the web client 106 to a global service web server 112. This web server 112 is responsible for allocating global identifiers (GID) that identify web visitors. Web visitors are identified as specifically as is possible. Sometimes the identification pinpoints the actual person; sometimes it can only identify the web client 106 being used.

The global service web server 112 redirects the web client 100 back to the original ProReach-enabled web site 100 with extra data. That identifies the web visitor.

The ProReach-enabled web server 102 takes this identifier and logs the web hit on a log. The entry on the log contains this identifier.

The web server 102 reads from this log of web hits and sends the data to a ProReach spoke 202. Processing of each entry on this log begins on the spoke 202. The category of the web pages viewed by the visitor is computed. At this point the ProReach system 100 has determined who has accessed the web page and what the content of the web page is about.

Over time, a visitor's repeat visits to a web site 100 will result in a history of web events associated with that web visitor. ProReach manages this data by subjecting the data to an aggregation process. This process both keeps the data compact as possible, but while retaining useful analytical properties. In particular, the aggregation process summarizes web events into more generalized descriptions of web activity, including summaries across users and or categories.

After the aggregation step is completed, a profiling step takes place. This profiling step identifies the interests of a web visitor. The result is a web visitor profile summary of his or her interests.

The above steps demonstrate basic processing steps used to track, categorize and aggregate web visitor data. The result of these steps is a database of web visitor profiles that can be explored by web marketers, as well as being used for other purposed (selecting banner ads, personalizing content or services). Alternatively, a web marketer can then explore the population of his web visitors by using query tools.

These steps will now be explored in detail in the remainder of this section.

Figure 7A:
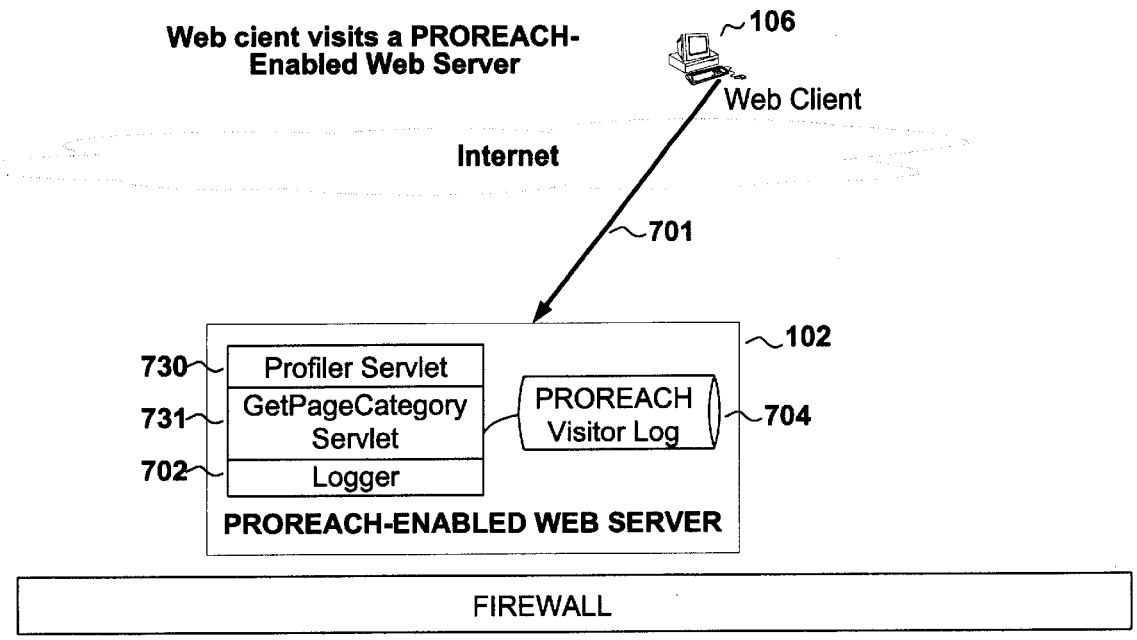
FIGS. 7a–7f illustrate the overall processing flow of a ProReach system.
Figure 7B:
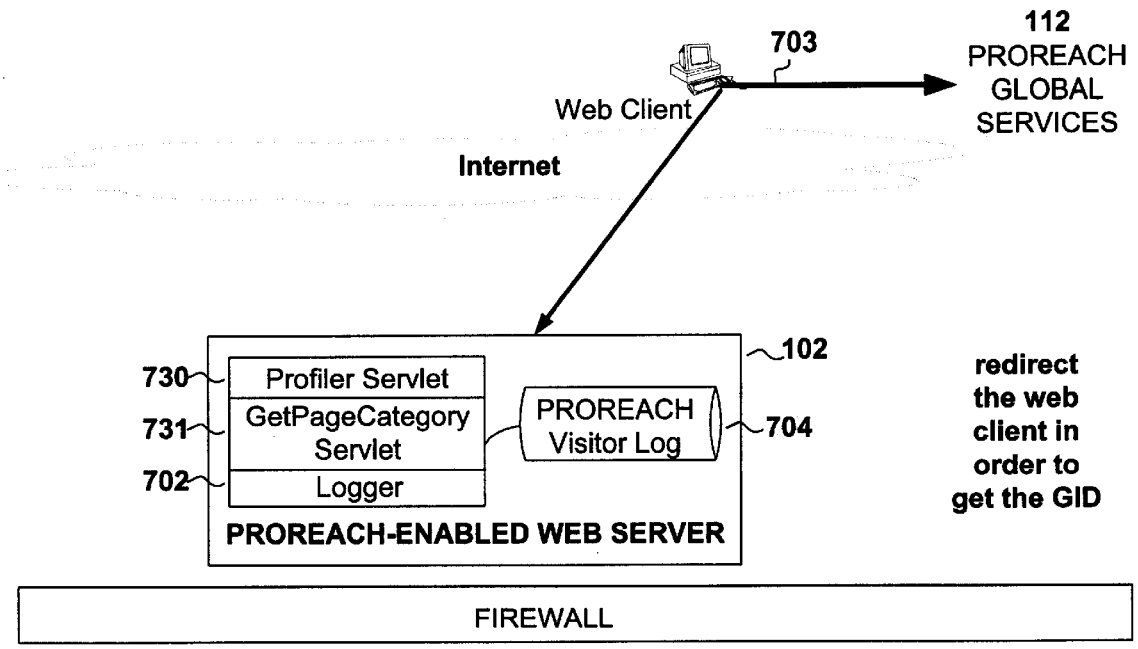
Figure 7C:
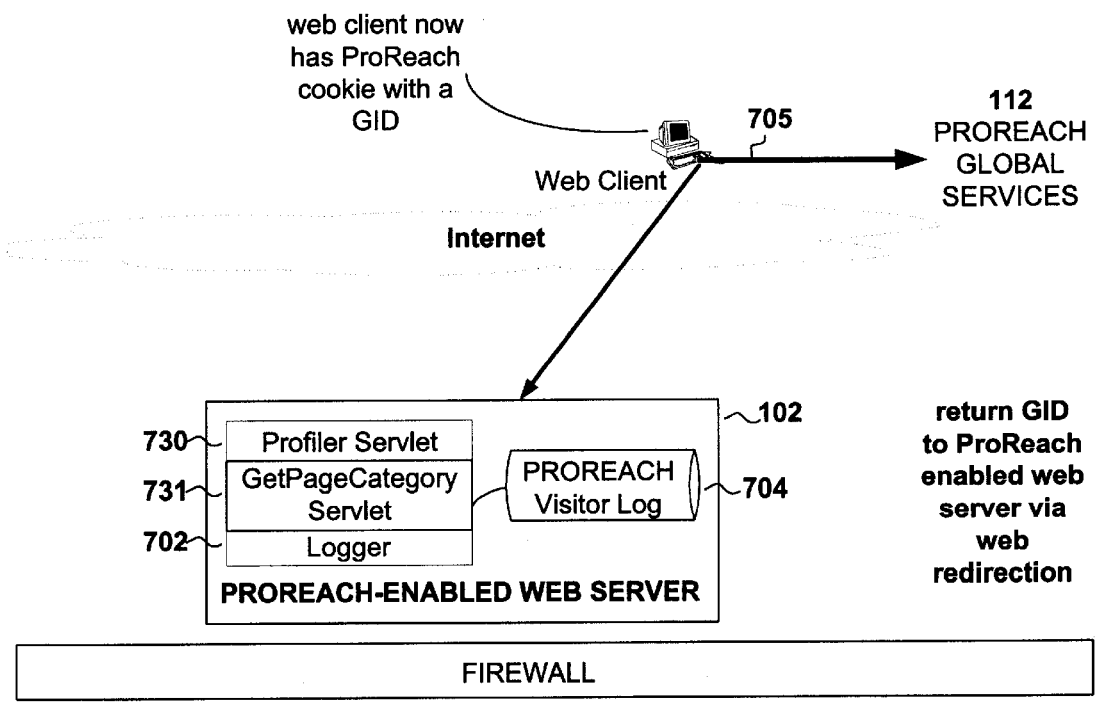

Referring to FIGS. 7a–7c, there is shown the web server 102 portion of a ProReach system 100. The web server 102 include a profile servlet 730, a category servlet 731, a logger 702, and a visitor log 704.

We begin our processing with a visit from a web client 106. The web client 106 accesses 701 a web page hosted by the web server 102. The Logger 702 requests a GID for the web client. To get this GID, the Logger 702 makes a request to the global identifier service 602 of the global ProReach service 112. This request is initiated by redirecting 703 the web client to a ProReach web server that is part of ProReach global services 612, via the HTTP protocol. In FIG. 7c, this web server can check whether the request from the web client 106 includes a ProReach cookie. If the ProReach cookie shows up in the request, the GID is extracted from the cookie. This is the GID that identifies this web client 106.

If the request does not include the ProReach cookie, and hence if the web client does not have a GID, then a new GID is generated by the global identifier 612. This GID is guaranteed to be globally unique. The GID that the global service has computed is now returned 707 to ProReach-enabled web server 102 via web redirection. The actual GID is encoded in the URL, so that the ProReach-enabled web client 106 can receive 705 this URL and extract the GID from it, storing the GID in a cookie. Other information is also encoded in the URL so that the web client 106 will be sent back to the page he originally requested.

If a web visitor has configured their browser not to accept cookies, the global identifier service 602 can detect this, and will still allocate a GID for this web visitor which is returned via the redirect as a GID in the usual way. However, the value of this GID tells the ProReach-enabled web server 102 not to try and issue a session cookie and to log the events of this web visitor as an unknown or anonymous user.

Figure 7D:
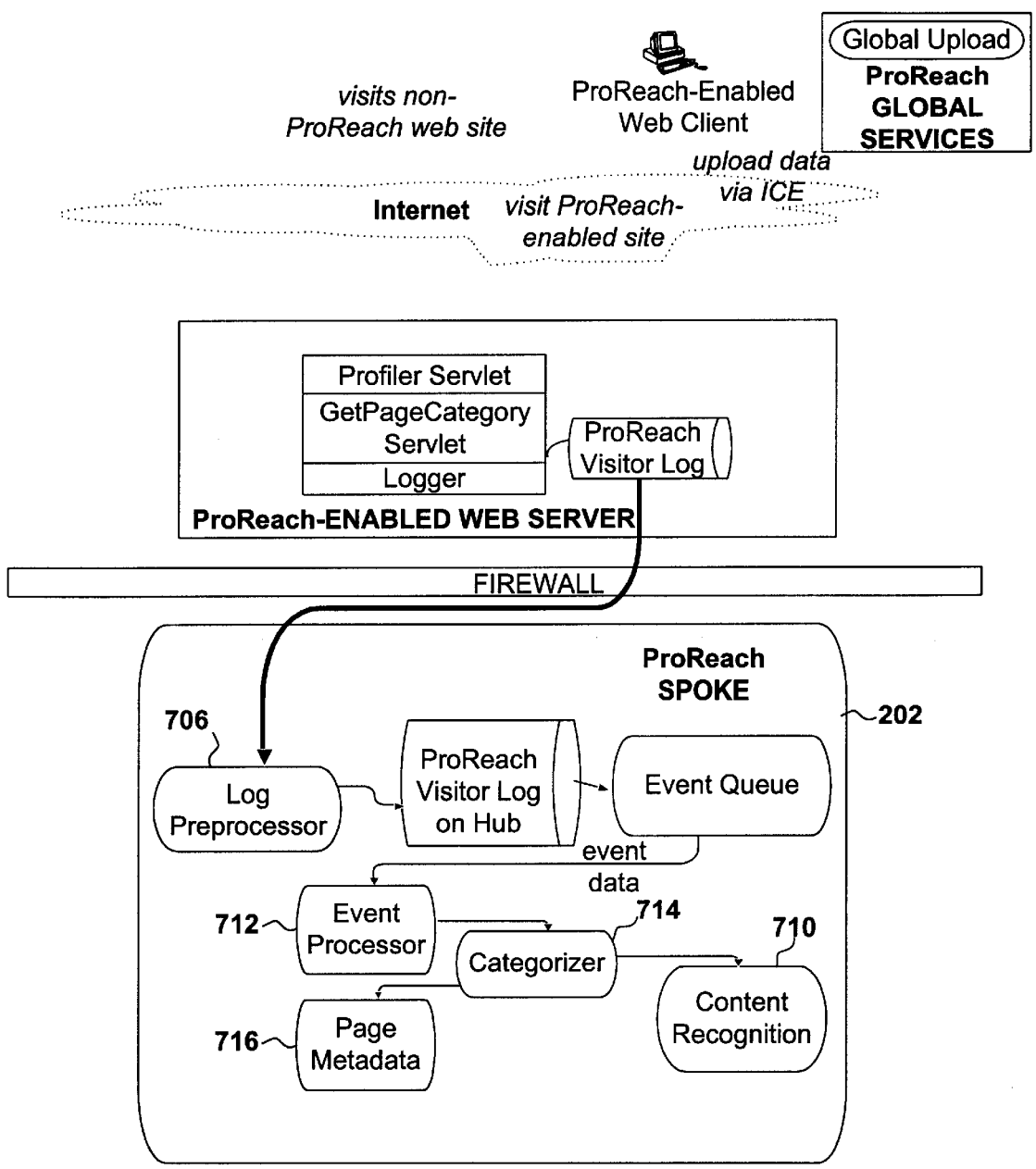

In FIG. 7d, once this GID is returned to the web server 102, the Logger 702 can uniquely identify the web client, and thus Logger logs 709 a web event record to the ProReach Visitor Log 704. This entry contains information on when the web access occurred, the GID, the URL of the web page that was accessed, and it has some other information as well. This sequence of operations is repeated for each web page or other web activity that the visitor generates.

As shown in FIG. 7d, the contents of the log 704 are periodically transferred from the web server 102 to a ProReach Spoke 202, which is inside the firewall. The spoke 204 includes various other processing modules, including a log pre-processor 706, a hub visitor log 708, an event queue 710, an event processor 712, a categorizer 714, a page metadata cache 716, and a content recognition engine 718.

Once the data reaches the spoke 204, it is pre-processed 706 for inclusion in the Visitor Log 708. The preprocessing turns the data —no matter its specific format —into web events of the standard form (e.g., an object representation of that data).

The Event Queue 710 monitors this log 708, and when new web event data is available, it fetches the data and also sorts the web entries by GID. The Event Queue 710 then calls on the Event Processor 712 to process each web event in the log 708. The Event Processor 712 ensures that the web event is categorized by making a request to the categorizer 714. It is possible that the web page has already been categorized, and that this categorization information has been entered as entries into the Page Metadata 716. Prior categorization occurs since ProReach spiders web sites in order to categorize their web pages as early as possible, as to avoid doing categorization at runtime. However, since some web sites produce web content dynamically, ProReach cannot pre-categorize all web pages, and must be prepared to categorized web pages on a just-in-time basis.

If the URL visited by the web visitor has already been categorized, then this data can be fetched from the Page Metadata cache 716. If this is not true, then the categorizer 714 then makes calls on a content recognition engine 718. The content recognition engine 718 manages a database of categories. Each category represents some kind of topic, such as "sports" or "news." A web page can be matched against any number of categories. The matched categories describe what a web page is about, and provide a means by which the visitor's interests can be identified.

The content recognition engine 718 provides a score for a number of categories, each score measuring the degree to which the page may be said to be about the category. Preferably, a score is provided by the content recognition engine 718 for each category in the category database; alternatively a score is provided only for a selected number of top scoring categories (e.g., top 10 highest scoring categories).

When the content recognition engine 718 completes its categorization process of a given web event, it updates the Page Metadata cache 916 for the web event to include a list of the scored categories and their respective scores. Once the cache is updated, the categories of the web event and their respective scores are returned to the Event Processor 712. The Event Processor 712 modifies the web event record to include the results of the categorization for that web event. Alternatively, the categorization information may be stored separately from the web event, and accessed from the web event by some other means, such as a URL. Once the web event record has been categorized, the web event is ready to be sent off to the next stage of processing. That next stage of processing is on the ProReach Hub 204. More generally, the categorized web events are streamed from the ProReach spoke 202 or spokes to the hub 204.

Figure 7E:
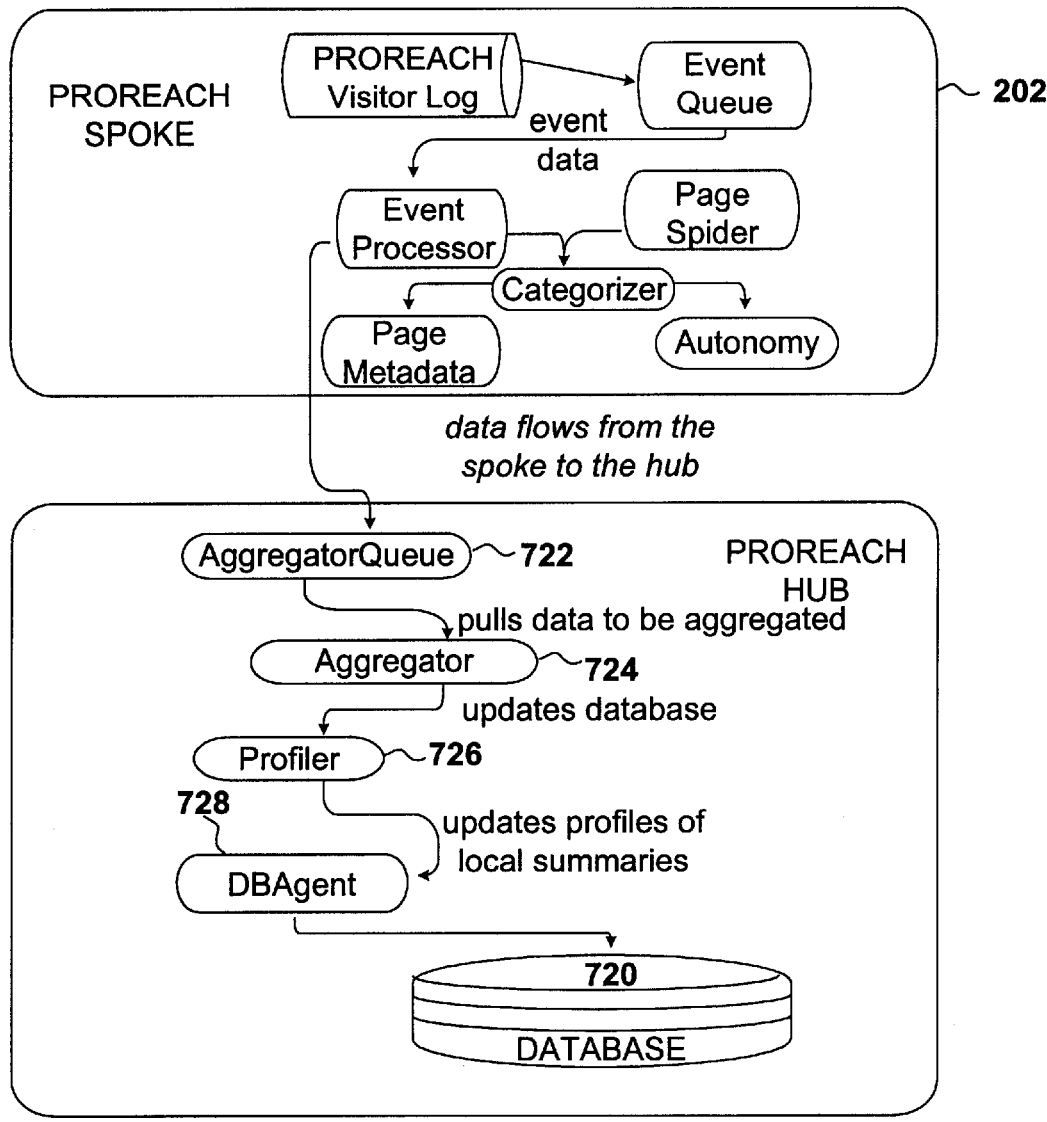
Figure 7F:
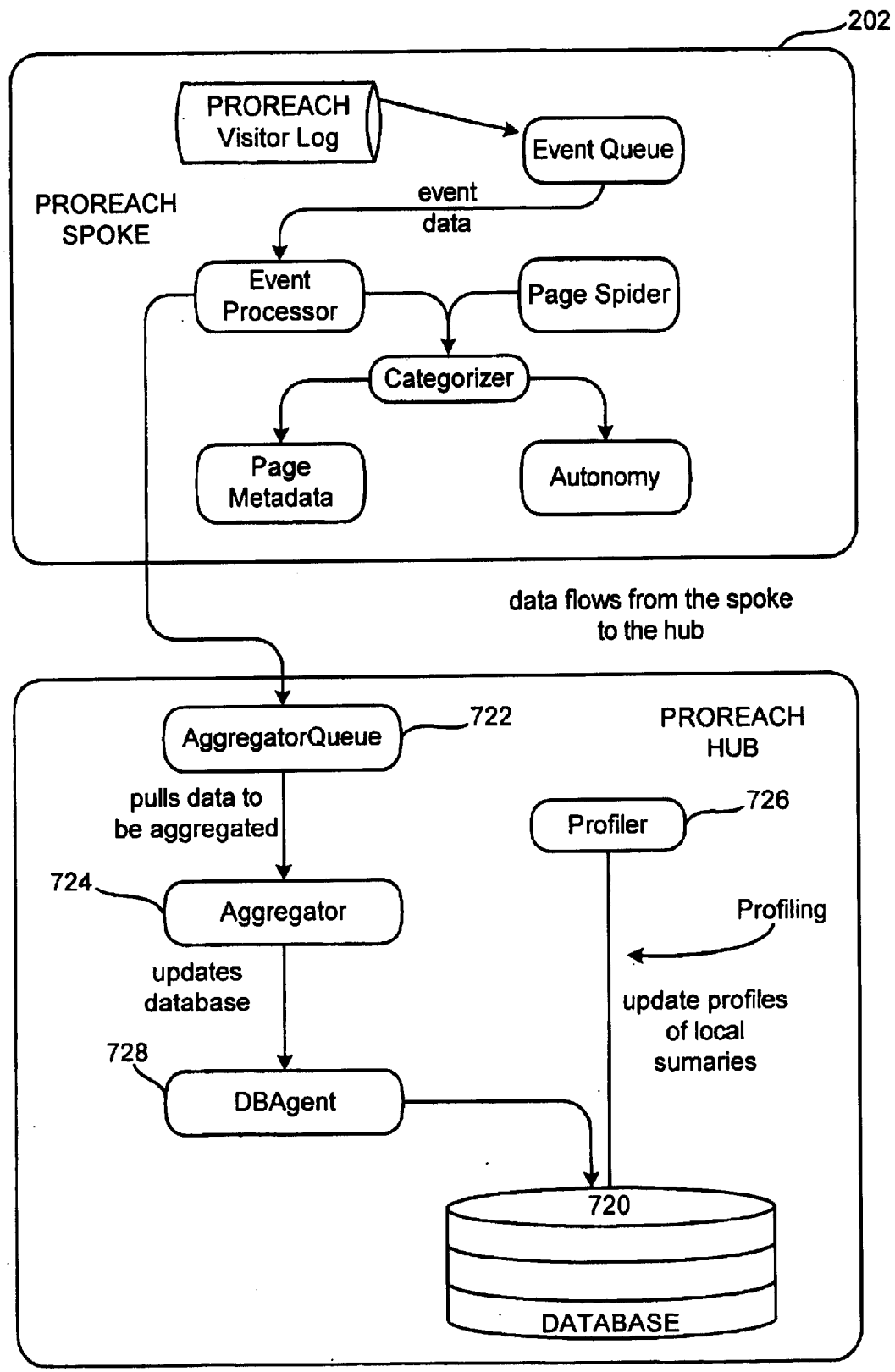

In FIG. 7e, there is shown the features of a ProReach hub 204. The hub 204 includes an aggregator queue 722, an aggregation system 724, a profiler 726, a database agent 728, and a profile database 720.

The hub 204 maintains a database 720 of web profiles. Each profile in this database 720 is uniquely identified by a GID. In each web profile, the web events of the web visitor are maintained by category. A exemplary web profile will describe a individual (or group's) interest in each of number of categories included in the category database.

The ProReach hub 204 takes newly categorized web events and integrates this data with the data of an existing web profile; this updates the profile of the visitor with the most current information about their interests, as captured in the web events generated from their web activity. If a web profile does not exist for the web visitor, then one is created.

The first step of this aggregation process is to fetch the needed web profile from the database 720, using the web visitor's GID to select the web profile. When an web event record or a set of event records are aggregated, they are processed in groups where each web event has the same GID.

Once the web profile for a GID is retrieved, the Aggregator System 724 performs an aggregation operation for all categories of documents that this web visitor has accessed. In one preferred embodiment, a threshold value for is updating category weights is established, and only those categories for which the document scored higher than the threshold are updated.

Generally, the aggregator 726 updates the various user, group, and category summaries as described with respect to FIG. 2. Each of these summaries is held in its own web event record, which identifies both the user or user group or the category to which it applies, and the appropriate other aggregated weight values. Because of this approach, ProReach can retain large amounts of visitor data at lower cost and this data is of higher quality, because it is designed to support the kind of operations needed by web marketers, that is, analysis of user interests and trends.

When the aggregation process is completed, the next step is to update the visitor's profile. Profiling 726 is a task that identifies the interests of a web visitor. To understand how this works, we first explore a brief example. Suppose there is a web marketer who wants to identify "sports enthusiasts" using visiting the web site. The web marketer first defines what he means when by "Sports Enthusiasts". There are many ways that this term could be defined:

Absolute Interest Magnitude Definition: A sports enthusiast is someone who looks at sports-related web pages at least twenty times every year;

Relative Interest Frequency Definition: A sports enthusiast is someone who looks at sports-related web pages more frequently than he looks at other web pages. For example, a sports enthusiast is someone who, if they look at 100 web pages, tends to look at least ten sports-related web pages.

Comparative Interest Frequency Definition: A sports enthusiast is someone who looks at sports-related documents much more often than other web visitors Each of these three candidate definitions for the term Sports Enthusiast describe the interest as a function of the weight or weights of a "sports" category or categories, as determined from the web activity of the user.

Any of these types of definitions (or others) may be used to define an interest with respect to any set of categories. Logically, an interest may be understood as a query, such as one uses in SQL, against the profile database 720 that determines if a web visitor does not or does not have that interest. The query can be defined to evaluate the weights of any combination of categories. With ProReach, a web marketer can name and define such interests using a simple query tool, such as a query by example tool, that operates on the database 720 via database agent 728, Once an interest is defined, the new interest is added into a given ProReach system 100 and activated. Once an interest is activated, it is the responsibility of the profiler 726 to take each interest and test whether a given web visitor has that interest or does not. When profiling takes place, each activated interest is applied to the web visitor's data to determine if the visitor has that interest. The result is profile which identifies which interests are applicable to the visitor.

For example, imagine that there were five active interests in the database 720, such as Sports Enthusiast, Conservative, Hobbyist, Recent Divorcee and Planning For Retirement, each of which has been previously defined by a set of criteria, such as described above, with respect to various categories. Thus, the Conservative interest may be defined by a relative frequency of accessing pages which are categorized in categories deemed to be associated with conservative ideas or beliefs; the Recent Divorcee interest may be defined by comparative frequency (to identify most current behaviors) of viewing web content related to divorce attorneys.

Such a set of interests are stored in the database 720 and applied by the profiler 726 to a web visitor's data. The query associated with each interest is applied (as a predicate) and the result of this predicate evaluation is a boolean value. From this processing, a set of results would flow, for example:

| INTEREST | Sports Enthusiast | Conservative | Hobbyist | Recent Divorcee | Planning For Retirement |
|---|---|---|---|---|---|
| RESULT | YES | YES | NO | NO | YES |

Note there, the results are Boolean values, indicating whether or not the visitor had the interest. In an alternative embodiment using fuzzy set membership, each interest result may be expressed as a measure of the degree to which the user has the interest (e.g., a scaled value between 0.0 and 1.0).

Based on a result such as this example, the web profile of this web visitor is then updated 723. Preferably, a web profile summary record in the database 720 lists the interests of the web visitor. In one embodiment, the web profile summary record contains an interest field which list the interests of the web visitor, as determined by the profiler 726. After profiling completes, this interests field is updated. Each interest is associated with an interest identifier, and so it is actually a sequence of integers that is assigned to this interest field, such as

{101,321,19}

For example, if the SportsEnthusiast interest has an ID of 101, and the Conservative interest has an ID of 321, and the PlanningForRetirement interest has an ID of 19, then this means the same thing as:

{SportsEnthusiast, Conservative, PlanningForRetirement}.

Each such interest ID thus concisely identifies an interest for that web visitor.

Interests are useful because they help categorize web visitors. However, interests are distinct from categories, in several ways. First, interests describe users or groups of users, whereas categories describe web content. Second, interests are formed from combinations of multiple factors, including category scoring of visited web content, demographics, and the like and thus interests are not easily constrained to hierarchical parent-child relationship, as typified by the categories of the content recognition engine 718.

As ProReach profiles web visitors, it computes the interests of each web visitor, and then recomputes them as needed. When this computation is performed, the updated profile summary is then stored 722 back in the database 720 via database agent 728. The result is an updated web profile, with all the data relating to categories, and with all the interests of that web visitor updated as well.

Other ProReach tools, such as the query tools, can use this data to quickly pinpoint groups of ProReach web visitors. For example, a query can be made to identify all web visitors who are both "sports enthusiasts" and "conservative." Alternatively, a query could be made to identify all web visitors who are "sports enthusiasts" but who are not "conservative."

At this point, we have shown how interests are defined and how profiles are updated to reflect the web visitor's current set of interests. FIG. 7c indicates how the web server 102 can access web profile for any web visitor. The profile servlet 730 on the web server 102 fetchs 731 the web profile of any known web visitor based on a GID, which is obtained either from a cookie resident on the web client 106, or from the global identifier service. It is this ability that makes it desirable to identify the GID of the web visitor. Once the web server 102 has access to the visitor's GID, it can use it to selectively fetch data from the web visitor's corresponding profile. Given the interests in the profile, the web server 102 can dynamically compose a web page so as to maximize the content that would be of greatest interest to the web visitor, for example, by selecting content that most closely matches the categories that the visitor is interested in.

ProReach has many other capabilities, such as the tracking of web activities from the web client; it supports the exchange of web profile data between ProReach systems. It supports facilities helping web marketers identify and contact prospects. It supports advanced categorization techniques that allow businesses in vertical markets to create categories suited to their business. It also supports categorization techniques that automate the process of developing and maintaining categories.

B. Category Discovery And Maintenance

This section introduces ProReach's processes for category discovery and category maintenance. We will describe these processes by example.

1. Category Discovery

Suppose a ProReach system 100 has the following categories for computer peripherals, as managed by its content recognition engine 718:

| Category | Number of Documents |
| --- | --- |
| Storage device | 500 |
| CD Rom | 80 |
| Hard drives | 200 |
| Zip drives | 40 |
| Floppy drives | 100 |

The Storage Device category is the parent category for the other categories. First, it should be noted that the total number of documents in the subcategories is 430, whereas there are 500 documents categorized as Storage Device documents. This suggests that there is some other category in these documents that is related to storage, but which is distinct from the existing subcategories.

The category discovery process uses statistical analysis to look for the hidden categories in some existing category. As will be further described below, category discovery identifies categories based on frequency and relationships between words appearing in a set of documents. In the example above, this category discovery process might find that many storage documents were about DVDs. It would then identify "DVDs" as a potential new category. In one embodiment, the category discovery process does not automatically create a new category. Instead, any category change suggested by the category discovery process is checked and confirmed by an operator. This interaction with the operator is desirable for a number of reasons. First of all, the category discovery process may make many valuable suggestions, but it may not always be right. Some degree of human guidance is useful to ensure that only meaningful categories get added.

Suppose in the above case that the operator confirmed that a new DVD category should be added. Once confirmation is given, the rest of the process is automatic; the category can then be used immediately by the content recognition engine 718 to categorize documents. Existing documents may also be re-evaluated to determine their category score.

One issue in determining when to apply the category discovery process is when should a search take place for new categories. In one embodiment a search for new categories takes place when any of the following are true:

There are a large number of documents categorized within a given category (e.g., more than a predetermined number or percentage of all categorized documents); or There are signs of a missing category (e.g., parent category having more than a predetermined number or percentage of documents relative to its subcategories); or There are a large number of web visitors accessing the documents with a given category (e.g., more than a predetermined number or percentage of visitors within a selected time period).

Also some branches of the category tree will likely exhibit more volatility over time (e.g., high technology). Hence, the historic volatility of that section of the category tree may also be a factor.

2. Category Maintenance

Category discovery pertains to discovering new categories. Category maintenance pertains to maintaining and improving existing categories. As with category discovery, the process of category maintenance is preferably an advisory process, which suggests changes to the categories. It does not execute those change unless confirmation is given; alternatively the changes may automatically implemented.

In particular, category maintenance provides suggestions for:

Removing a category; and

Altering the training documents related to a category;

Like category discovery, category maintenance involves statistical analysis. For example, a suggestion to remove a category might be made if there are very few web pages concerning this topic and there are very few people looking at such documents. Few documents and few viewers of them suggests that the category is a candidate for deletion.

For example, training documents are selected based on scoring; if the category scores are below a threshold the training documents are reselected. Categories are moved when the keywords associated with the category are not scoring sufficiently high.

To create category:

Select category

Select training documents

Score training documents, to generate keywords

Human judgment as to whether the keywords are reflective of the category.

IV. ProReach Systems With Alliances

FIGS. 1–6 show how ProReach spokes 202 feed web activity data to a central hub 204 of the ProReach system 100. This hub-and-spoke topology handles one or more web servers 102 in a flexible and scalable fashion. ProReach however, goes beyond this local accumulation of web events. Profiles of visitors maintained on a hub 204 are valuable, but the value of the information increases via aggregation across multiple hubs and ProReach systems 100. This aggregation can be accomplished by the merging of profiles from multiple sources, even when these sources of information belong to separate companies.

In existing systems, companies that might benefit from the sharing of visitor profile information are reluctant to do so for several reasons. There is no infrastructure to facilitate this sharing, so sharing the information would require a huge initial outlay of software support. There are also ownership and use issues in respect to the profile information itself: which companies own the profile information, and who decides?

Figure 8:
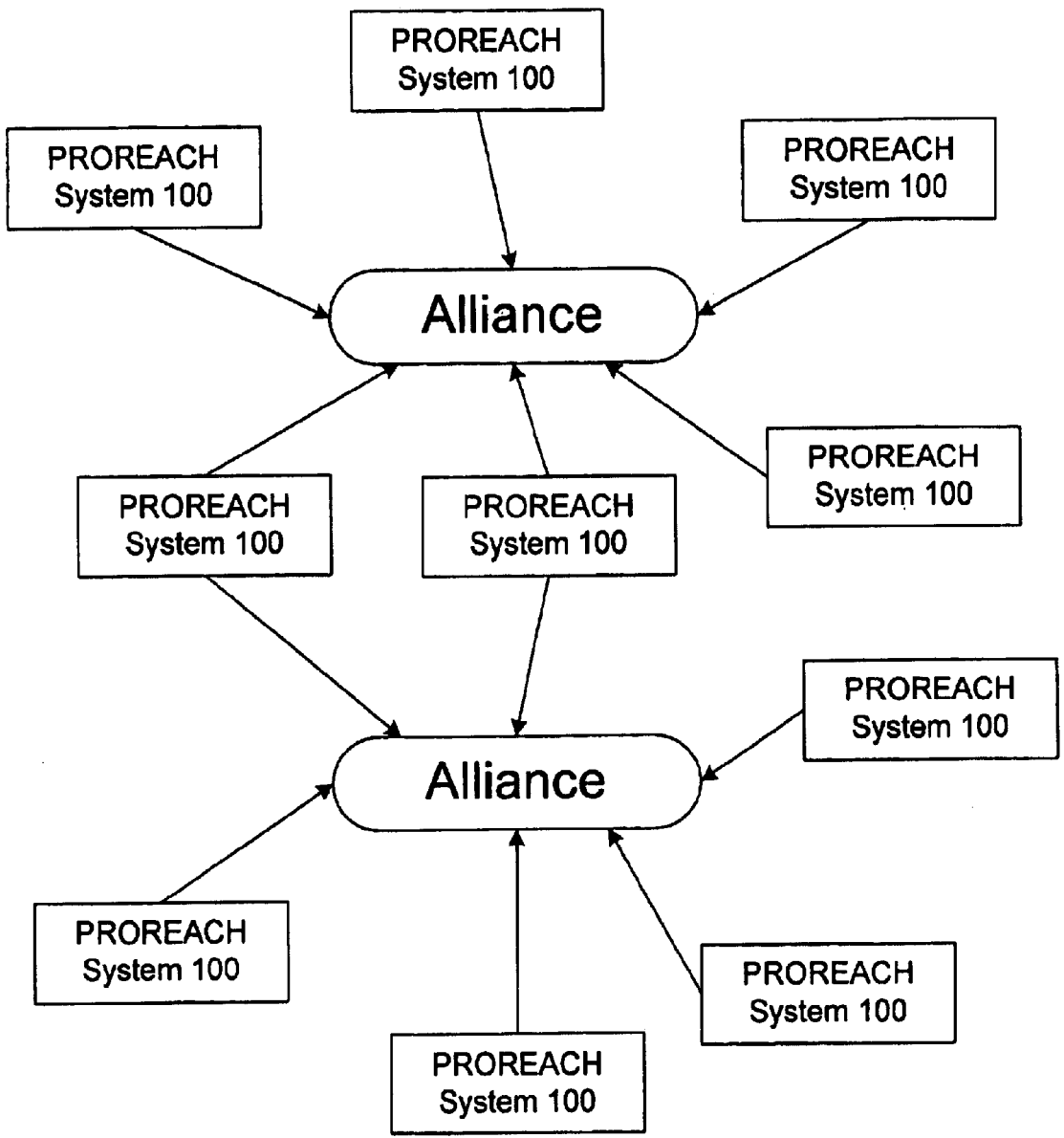
FIG. 8 illustrates an alliance of ProReach systems.

In the present invention, alliances are a means of facilitating the sharing of profile information between businesses, and overcoming these barriers to sharing. By doing so, ProReach enables business-to-business sharing of data that is mutually beneficial to the business parties. In many cases, alliances are formed to service the businesses clustered around some vertical market. For example, there might an alliance for pharmaceuticals, or there might be an alliance for oil-related businesses. Referring to FIG. 8, each ProReach system 100 would be a member of zero, one or more alliances 800. Membership in an alliance is voluntary. The members of those alliance 800 send copies of their profile data to alliance 800. This data is then aggregated into an alliance profile. An alliance profile is an aggregation of the profiles collected from the alliance members.

Of course, the same web visitor may visit multiple ProReach systems 100 that are members of the same alliance 700. When different local hubs send profiles for the same web visitor, the alliance 700 can take these separate local profiles and assemble them together into a single alliance profile for that web visitor. Using the GID, the alliance can easily compute which profiles belong to the same web visitor, and correctly merge the information in these profiles to avoid duplication.

In exchange for providing their local profile information to the alliance, the members of the alliance 700 get some degree of access to the alliance profiles. An ProReach system 100 can be a full access, limited access or minimum access member of an alliance 800. The responsibilities and rewards of each membership level vary.

A full access member gets the maximum allowed access to vertical profiles. Full access members must also provide a maximum amount of information from its local profiles.

A limited access member gets a moderate degree of access. It must provide a moderate amount of information from its local profiles.

A minimum access member gets the least amount of access to vertical profiles. It is required to provide a minimal amount of profile information from its local profiles.

Participation in a vertical alliance allows each member controlled access to the jointly produced alliance profiles. Rewards and responsibilities are rationalized through the small number of membership levels. Memberships have to specify what categories of information they will provide and in what volume, and for what kind of web visitor. Hence this scheme provides a credible incentive for individual ProReach systems 100 to participate in various alliances.

ProReach systems 100 benefit from being members of alliance by having access to the alliance profiles of the web visitors. Because the alliance profiles are aggregated over multiple web sites and ProReach systems 100, they provide a more accurate and comprehensive assessment of the interests of the web visitor. This in turns allows a given ProReach system 100 to more accurately target web content to the w web visitor when the visitor visits the ProReach system 100 that is an alliance member.

V. Aggregation

In this section we describe in detail one embodiment of the process by which web events are aggregated by aggregation system 724 in conjunction with the aggregation queue 722. The aggregation queue 722 stores a set of web event records that are unconverted. These records are updated to the queue 722 by the event processor 712 on the spoke 204, in the order in which they are received, that is, as they come in from one or more spokes. Overall, the queue will store the web events generated by many different users over some time period.

Figure 9:
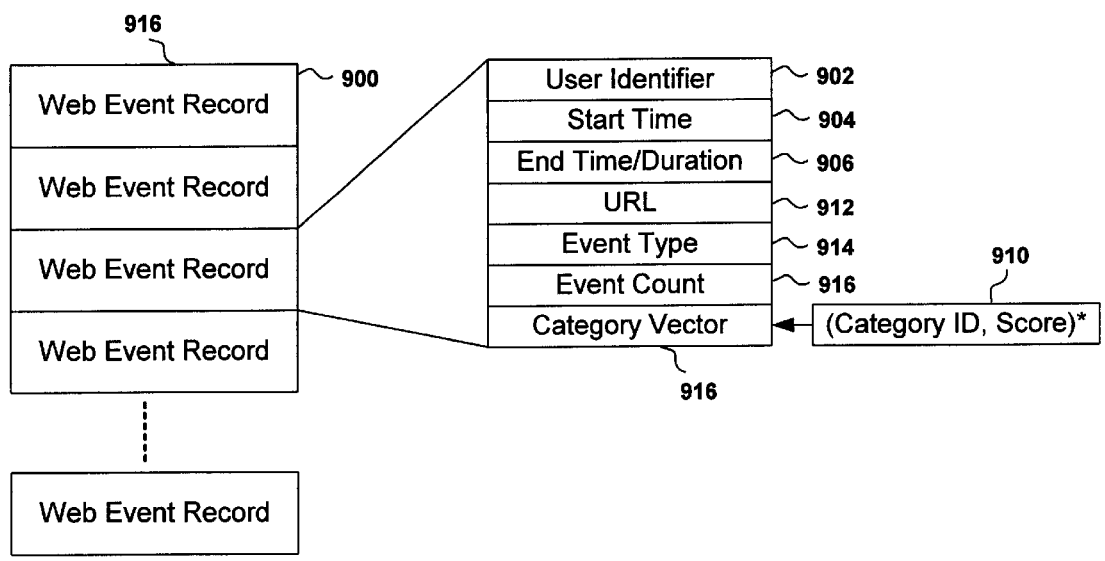
FIG. 9 illustrates the aggregator queue used to store web event records.

Referring to FIG. 9, there is shown the logical structure of the aggregation queue 722. The aggregation queue 722 stores a collection of web events 900, each of which represents an instance of some visitor interacting with an item of web content. Each web event 900 contains a user identifier 902 (preferably the GID), a start time 904 of when the web activity began, a duration (in seconds) 906 of the activity (if the duration is not provided, the default is 1 minute), a type (representing either a transaction, a click-through or a page view), a URL (the domain name of the web site) and a category vector 908. The category vector 908 includes a list 910 of category identifiers, and respective category scores. Each category score indicates the degree to which the web content is evaluated by the content recognition engine 718 to be about the category. Preferably, there is a category score for each category stored in by the content recognition engine 718. Thus, for example, if there are 1,000 categories used by the content recognition engine 718, then the vector 908 contains 1,000<category ID, score> tuples. In one embodiment, the category scores are in a range from 0 to 1,000,000, but any useful range can be used with the appropriate scaling factors.

Figure 10:
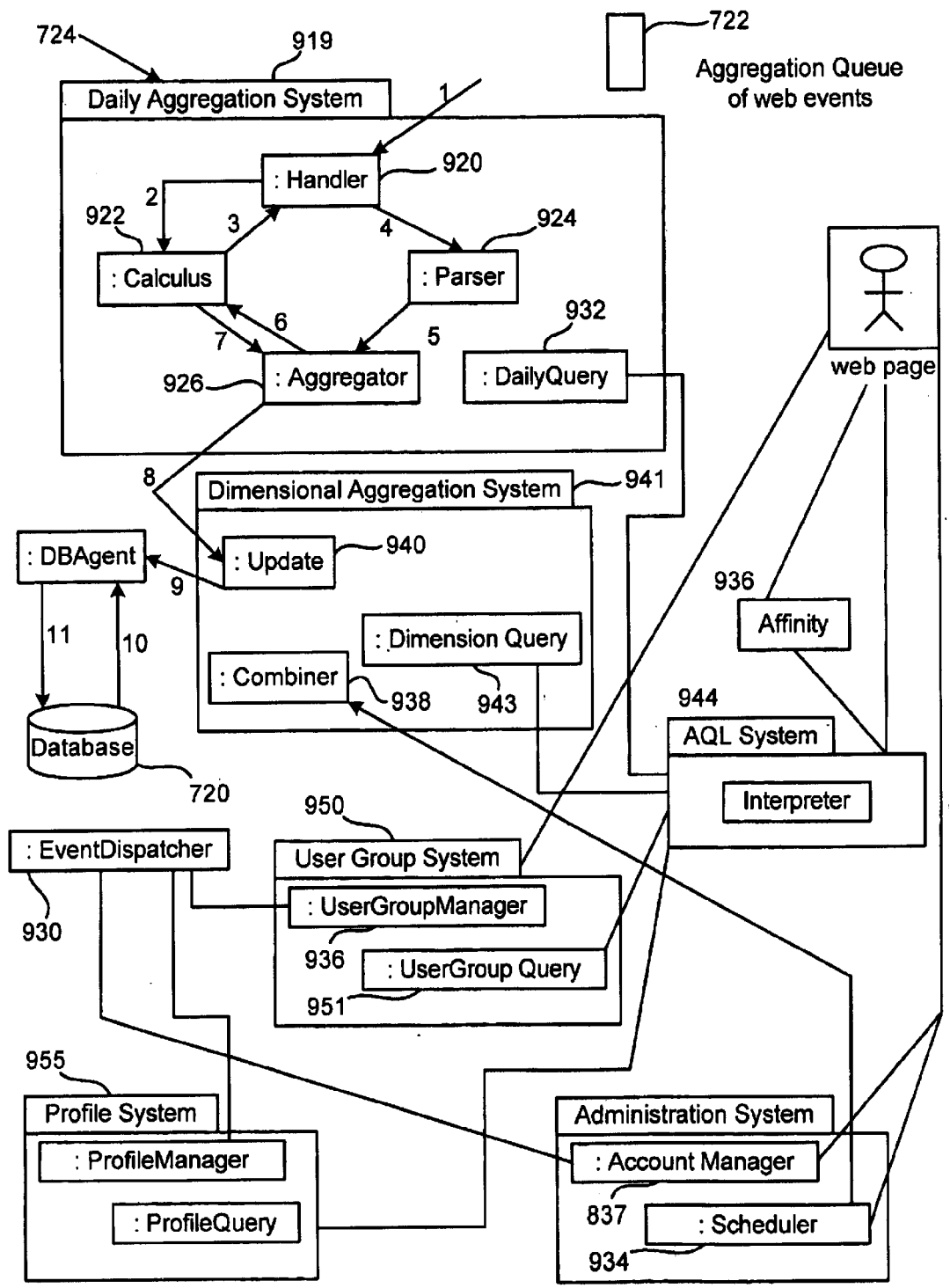
FIG. 10 illustrates the features of the aggregator service.

Referring now to FIG. 10 there is shown an illustration of the components of the aggregation system 724. The aggregation system 724 is generally responsible for various types of services. First, a Daily Aggregation System 919 is responsible for generating daily aggregates from the web events that occur on the web server 102. Second, a Dimensional Aggregation System 941 is responsible for combining the daily aggregates by dimensional combining into the various User and Category complexes illustrated in FIG. 2. Third, a User Group System 950 is responsible for defining and maintaining definitions of user groups. A Profile Service 955 is responsible for maintaining individual user profiles, and responding to queries regarding these aspects. All these services are within the scope of the aggregation system 724.

The Daily Aggregation System comprises a Handler object 920, a Calculus object 922, a Parser object 924, an Aggregator object 926. The aggregation queue 722 is also best understood as being a entry point to the Daily Aggregation System 724 (and was illustrated separately in FIGS. 7a–7d for convenience).

An Event Dispatcher 930 monitors all the activities within all the services of the Aggregation System, and fires events to whoever is interested in listening to them. The Event Dispatcher is not part of the services within the Aggregation System. It simply monitors and overlook and watches all the activities going on inside the Aggregation System like a camera.

The Daily Query object 932 is part of the Daily Aggregation System and is responsible for all queries concerning daily aggregates. The Daily Query object handles all types of queries regarding interests of users, as described above, including defining interests, and identifying users having particular interests (on daily basis). Queries are processed by a query language interpreter 944, which uses a query language 946. The handler 920 exports the interface of the Daily Aggregation System, and manages the remaining components of the daily aggregation service during the daily aggregation process of packets of web events.

The Combiner 938 is part of the Dimensional Aggregation System and is responsible for doing dimensional aggregation as scheduled by member of ProReach. More particularly, the Combiner 938 is responsible for the dimensional combining of the daily aggregated web events (or of the complexes) into higher level summaries (e.g., across times, users, group, and categories), such as illustrated in Levels 1–4 of FIG. 2, according to scheduled tasks done by some members.

The update object 940 is responsible for updating the Daily Aggregate whenever the Daily Aggregation System processes a packet of web events.

The database 720 stores the aggregated information from the web events in a number of different tables. These are as follows:

User Table: This table stores information identifying and describing each user. The fields of this table include: userID, last name, first name, this table is indexed by userID.

UserID Contact Table: This table contains the following columns regarding the contact address: userID, address, address2, city, state_prov, zipcode, country, and e-mail.

Demographic Table: This table contains demographic information about users. It contains the following columns: userID, gender, age, education, job.

Members Table: This table contains information about the members of ProReach System, that is the people (or companies) that have an account with ProReach System. This table contains the following columns: ID#, lastname, firstname, e-mail, login, password, URL, account type. The URL represents the domain name of the web site owned by the member. If the member does not own a web site, the URL column will be empty. The account_type represents the type of account the member has. According to this type, the member will have access to certain services and other services might be denied.

Categories Table: This table stores all of the categories used by the content recognition engine 718. The table includes the fields: categoryID, category name, and parent categoryID. The table is indexed by categoryID, and secondary indices on name and parent. The parent categoryID is used to construct a hierarchy of categories, and is further used to aggregate low level category information into higher categories.

Daily Aggregate Table: Each row in this tables stores daily aggregate objects for a specific user-category combination that occurred on a given day. This information corresponds to the data at Level 0 of the Aggregation Tree shown in FIG. 2. The fields include: userID, categoryID, weight, Deviation, Day, and Trend.

Deviation stores a standard deviation of the category weight over the given time period for the specified (by category ID) category.

Day stores a date or day number.

Trend stores a string or encoded value that describes the shape or slope of a curve of the user's interest of the time period. For example, and as will be further explained below, the trend may describe the curve as "increasing then decreasing", or as "constant then increasing".

User Group Table: This table identifies each of the user groups, along with their size and a description of what the user group is about, or what are the rules for defining membership. The fields include: user groupID, group name, description, and size. Size indicates the number of group members.

Criterion Table: This table stores the rules which may be used define various membership tests for any of the user groups. Used in conjunction with the user group criterion table, below. The fields include:

Criterion ID: identifies the rule number.

CategoryID: identifies the category to which the criterion is applied.

Minimum: defines the minimum weight a user can have to satisfy the rule

Maximum: defines the maximum weight that satisfies the rule.

Negation: specifies whether satisfying the rule results in group inclusion or exclusion.

Example: Assume that a rule had minimum=20 and maximum=80 and that negation="No." This membership rule means:

"for a user to satisfy the membership test, his/her weight for the category must be between 20 and 80"

If negation=Yes, then this means that the weight must not be between 20 and 80 in order to be a member of the group for this rule.

User Group Criterion Table: This table associates each user group with one or more of the membership rules defined in the criterion table. The field include: user group ID, and criterion ID.

Maintained Categories Table: This table contains the set of categories for which information (such as weight, user groups, profiles, and so forth) will be maintained. The field include: Category ID, CurrentValue, Permanent, LowInterested, MediumInterested, HighInterested, and VeryHighInterested.

This table allows the system administrator or a marketer to chose which categories will be maintained and which categories will be disregarded. This choice can be either absolute or dynamic. In the absolute case, the marketer simply chose a collection of categories one and for all and maintain information only about these categories. In the dynamic case, the marketer consider all categories on the same foot and giving each category a certain rank in the CurrentValue field. The CurrentValue rank can change dynamically according to how many users are interested in the category. If for example, the CurrentValue drops under a certain level, then the category will be disregarded and removed from the table. If a new category acquires a degree of importance, then it can be added to the table. This is the dynamic case.

The marketer can even combine both the dynamic and absolute case. For example, the marketer can chose a certain number of categories to be Permanent (Boolean flag), and other categories to be rather dynamic than permanent. The permanent categories will always stay in the table, and information related to them (through user groups, profiles, etc.) will always be maintained. The dynamic categories are categories that can be removed from this table whenever their CurrentValue is under a certain level. The threshold is preferably defined by a configuration file for the aggregation system 724 or by a system administrator.

The other columns of the table such as LowInterested, MediumInterested, HighInterested, VeryHighInterested contain the number of users whose interest in the category is low, medium, high, and very high, as determined by their weights. In one embodiment, these interest grouping are associated with weight quartiles: if the weight is between 1 and 24 the interest is low (hence the user is counted under "LowInterested"); if the interest is between 25 and 49, the interest is medium; if the interest is between 50 and 74, the interest is high, and between 75 and 100, very high interest.

Maintained Users Table: This table lists all of the users for which profiles will be maintained. The field include user ID, Rank, and HotCategoryID. The Rank field is a value that can change according to the importance of the user. If this value is under a certain level (e.g., below the $100^{th}$ or $1000^{th}$ rank), the user will be removed from the table and no profile will be maintained on this user. If however, a new user become very important, then this user will be added to this table and a profile will be maintained for the user.

HotCategoryID identifies the category which has the highest category weight for this user.

Profile Table: This table describes each user's profile in terms of which user groups the user is a member. The fields include: user ID, user group ID, Member Since, Membership Ended, Current Member, and Last Update.

Member Since: identifies the date that the user A user can be a member of many user groups and this membership is also dynamic and changes over time. The profile table keeps a history record of user group membership. For every user group, the profile table indicates when the first time the user became a member (Member Since), whether he/she is still member (Current Member) and when the membership ended (Membership Ended). From this history record of changes between different user groups, one can derive a certain behavior and pattern that can be used to predict user reactions in the future, and use this information for marketing purposes.

User-Category Complex Table: This table stores the data for the UC (User-Category) complexes 203 described for FIG. 2. The fields include: user ID, category ID, weight, deviation, weight against categories, weight against population, trend, from and to.

User ID and category ID define the respective user-category combination.

Weight: describes the average weight of the user's interest in the category specified by category ID.

Deviation: the standard deviation for this average.

Weight against categories: stores a measure of how important the specified category is for the user relative to other categories. In one embodiment, the value of WeightAgainstCategories is the percentage of the totaled categories weights for the specified category. That is, WeightAgainstCategories for category j is equal to the weight of category j divided by the sum of all category weights, and then multiplied by 100 to create a percentage (though raw decimal value may also be used).

Weight against population: stores a measure of how important the specified category is for the user relative to all other users. In one embodiment, the value of WeightAgainstPopulation is the percentage of the totaled categories weights for the specified category relative to all other users. That is, WeightAgainstPopulation for category j and user k is equal to the weight of category j for user k divided by the sum of category weights for category j for all users, and then multiplied by 100 to create a percentage (though raw decimal value may also be used).

Trend: describes the shape or slope of the user's interest in the category over the time period defined by From and To.

From and To: define the earliest and latest start time of web activity used to generate this complex.

User Complex Table: This table stores the contents of the U (User Category) complexes 205. The fields include user ID, weight, deviation, trend, from and to, and categories Count. Since a user complex summarizes the user's interest over many categories, Categories Count tracks the number of categories that interest the user. The number also is the number of children of the user complex object in the aggregation tree.

The Categories Count value is used in incremental updating of the weights. When a new user-category complex 207 is formed (i.e., a new child of a user-complex) with a new weight w, then the new weight of the User complex is incremented as follows:

new weight (UComplex)=([categoriesCount*old weight(UComplex)]+w)/(categoriesCount+1)

Category Complex Table: This table stores the data for the C (Category) complexes 205 described in FIG. 2. The fields include: category ID, Weight, Deviation, Trend, From and To As this complex summarizes over multiple users, thus the weight and deviation are with respect to all users with respect to the time period defined by From and To.

Group Category Complex Table: This table stores the contents of the GC (Group Category) complexes 207. The fields include user group ID, category ID, weight, deviation, trend, from and to, and users Count. Users Count tracks the number of users in this group with respect to the selected category.

Group Complex Table: This table stores the contents of Group complexes 209, that is group summaries across all categories. The fields include user group ID, Weight, Deviation, Trend, From and To, and user Count.

The user count is used to update the weight for a group during incremental aggregation as follows:

new weight(GComplex)=((usersCount*old weight(GComplex))+w)/(usersCount+1)

where w is the weight of the new added member to the user group.

Total Complex Table: Finally, this table stores the overall Total complex 211. Every row corresponds to a total complex 211 for a defined period of time. The fields include: Start Date, LengthDays, LengthWeeks, LengthMonths, LengthYears, weight, deviation, trend, and usergroup Count. The various length fields define the time interval over which the aggregation is performed for a particular complex. The user group count contains the total number of user groups over which the total is aggregated. As with the other counts, this is used during incremental aggregation:

new weight(TComplex)=((usergroupCount*old weight(TComplex))+w)/(usergroupCount+1)

where w is the weight of a new user group complex 209 being added to the total complex.

We now describe the process of aggregating web events.

A. Aggregating Daily Web Events

The scheduler 934 is responsible for initiating various processes for aggregating web events into aggregated information for various periods of time. Accordingly, on at least a daily basis, the scheduler 934 invokes the handler 920 to aggregate web events from the aggregation queue 722 into daily aggregated events, as shown in Level 0 of FIG. 2. Accordingly, The handler 920 requests and receives a set of web events from the aggregation queue 722 for a given day. The queue 722 keeps tracks of which events have been retrieved, and provides, in response to a handler request, those events which have not been processed, assembling the events that correspond to the desired day.

The Aggregation System does the combining using two subsystems. A first subsystem is responsible for generating the daily aggregates from the web events (the web events are called user hits in the terminology of the Aggregation System). The second subsystem is responsible for generating the higher level of aggregation (aggregation over weeks, months, quarters, or years, across categories, across users, across user groups), that is the dimensional combining.

The Daily Aggregation Service operates as follows:
1. The Handler object takes a packet of web events from the Aggregation Queue.
2. The Handler sends the packet to the Calculus object to compute the weights of the web events and to scale them from 0 to 100.

Let's give a very simple example. Suppose that the packet contains only two web events A and B. Web event A contains only one category C1 with a score 200 and a duration 4 minutes. Web event B contains one category C2 with a score 300 and duration 2 minutes. First, the Calculus object computes the weight for the category C1 in the web event A:

weight (C1)=score(C1) *duration=200*4=800.

Since there is no other categories in the web event A, we go to the next 20 web event B to compute the weight for the category C2 (in the second web event B):

weight(C2)=score(C2)* duration=300*4=600

Since there is no other categories in the web event B, we have finished computing the weights. Now we need to scale the numbers we have just computed, namely 800 and 600. Scaling consists of replacing 800 by:

[800/(800+600)]*100=57.14% and replacing 600 by:

[600/(800+600)]*100 42.8%

Now, if the userID in web event A and in web event B are the same, and category C1 and category C2 are also the same, then in this case, The Aggregator object will average the two weights:

(57.14%+42.8%)/2 and keep the average. If the two web events A and B have different userID or different categories, then we do not average, and we keep the two weights 57.14% and 42.8%.

In any case, inside the DailyAggregate object, every pair (userID, category) has only one number between 0 and 100 (a percentage number) that we call the weight of the pair (userID, category). If (within a single packet of web events) one (userID, category) pair has many percentage numbers (i.e. many weights), then we average them (this is done by the Aggregator object when the Parser gives the hash map to the Aggregator, as described next).
1. The Calculus object returns the packet (of web events, where the scores are now weights that are scaled) to the Handler object and the Handler gives it to the Parser object. The Parser object transforms the data structure of the packet (from a vector to a hash map) and gives the hash map to the Aggregator object.
2. The Aggregator object computes certain quantities such as the mean, the deviation, trend and the time interval (from, to). The Aggregator object uses the services of the Calculus object to compute these quantities. After computing these quantities, the Aggregator object calls the update methods of the Update object. The Update object has many methods (that all start with the word update). Every method has its special purpose: For example, the method updateDailyAggregate( ) will update the values in the DailyAggregate object using incremental aggregation from the new hash map that was produced by the Aggregator. The method updateUCComplexo updates the values of all UCComplex objects using incremental aggregation from what has changed in level 0 of the aggregation tree, etc. That is, the dimensional aggregation is automatically done (incrementally) just after the Aggregator finishes processing one packet of web events.

So the Update object provides data access between the two systems, Daily Aggregation System and Dimensional Aggregation System. Whenever the Daily Aggregation System finishes processing a packet of web events, the Update object starts the Dimensional Aggregation (incrementally) based on what have changed at level 0 of the aggregation tree due to the processing a new packet of web events.

There is another aspect of the dimensional aggregation that is scheduled. We have just said that the dimensional aggregation starts automatically (and incrementally) each time the daily aggregation system finishes processing a single packet of web events. Let us explain why we also use a scheduled dimensional aggregation:

When the ProReach System is be running, it will have some members. A member is a person or a company that has an account with the central ProReach System. Let's say User A is a member. User A will have a login name and a password, and ID number that is assigned to User A by ProReach System (when you subscribed for the first time). When User A wants to use the services offered by ProReach System, he first to goes the web page of the central ProReach System and logs in using his login name and password. Once he logs in, he can use the services. Here is a short list of the services that he can use:
  a. Issue queries (on the web page) and the answer to the queries will show on the web page.
     Queries can be on profiles, user groups, on interest for some categories, etc.
  b. Create user group and set the membership rules to be satisfied in order that a user be added to the user group User A has created. User A can schedule when to update the members of each user group, when to add new members, and how long he would like to keep each user group in the database.
  C. If User A owns a web site, he can have the web traffic of your web site be sent to the central ProReach system, so that ProReach can do aggregation for the web events of his site and keep the results of the analysis in the ProReach's database ready for him to query it anytime.

These are only examples of the services that can be offered by ProReach System through the web. Each service has a certain fee. There are different types of accounts. Some accounts provide users with a certain set of services, and other accounts may provide users with larger set of services. For example, consider the case of a person (or company) that owns a web site and uses the last service of the list above (that is, service c.). Such a person has the right to chose when to do dimensional aggregation (for the web events of his/her web site) and for what time interval. Such a person can schedule these tasks from his/her account. This is what we call the scheduled dimensional aggregation tasks. This is different from the dimensional aggregation that is done automatically each time the Daily Aggregation System finishes processing a single packet of web events.
  1. Transform Category Scores to Weights The handler 920 first invokes the math package 922 to transform the category scores in each web event 900 (within a single packet of web events) into duration adjusted scores. This step normalizes the scores, and removes the need to separately store both the category scores and the duration of the event. Normalization further allows different web events to be compared as to their overall significance with respect to any category or user.

The Calculus object 922 operates as follows to support this function. As noted, each web event 900 includes a vector of categories and scores. The Calculus object 922 process each web event 900 in turn (inside a packet of web events). For each category in the category vector of a single web event 900, the math package 922 scales each category score by the duration of the web event, and with respect to all other category scores for that web event. In one embodiment, the scaling process is as follows:

First, the Calculus object 922 adjusts each score by the duration of the web event and the type of the web event:

NewScore=Score*Duration*type where NewScore is the adjusted category score (that we will call weight after it will be scaled from 0 to 100), Score is the original category score, Duration is the time between the start time and end time (or the duration value if directly provided. If it is not provided, the duration's default value is 1 minute) and type is the a number that depends on the type of the web event. For example, if the web event is a transaction, the type would be higher than just a click-through or a page view. The type of a page view is higher than the type of a clickthrough.

Next, the Calculus object 922 scales the adjusted scores relative to all of the adjusted scores:

$$TotalScore = \sum_{i=1}^{n} NewScore_i$$

$$Weight_i = 100 * \frac{NewScore_i}{TotalScore}$$

where n is the number of categories (all the categories inside the packet of web events. A packet of web events might contain 10 web events. And each web event might contain 20 categories. So the total number of categories might be 200), and i iterates over each category.

The result of this process is that each web event 900 now contains a list of weights in place of the original category scores. The weights succinctly describe the significance of the category with respect to all other categories for that particular web event; more particularly, the weights describe as each category's score as a percentage of all of the time-adjusted scores.

2. Restructure Web Event Records to Collate Category Weights by User

The handler 920 next calls the parser 924, and passes in the updated packet of web events 900. The parser 924 restructures the packet for input into the Aggregator object 926. More particularly, the parser 924 collates the category weights of a number of web event records 900 first by user, and then by category.

Figure 11:
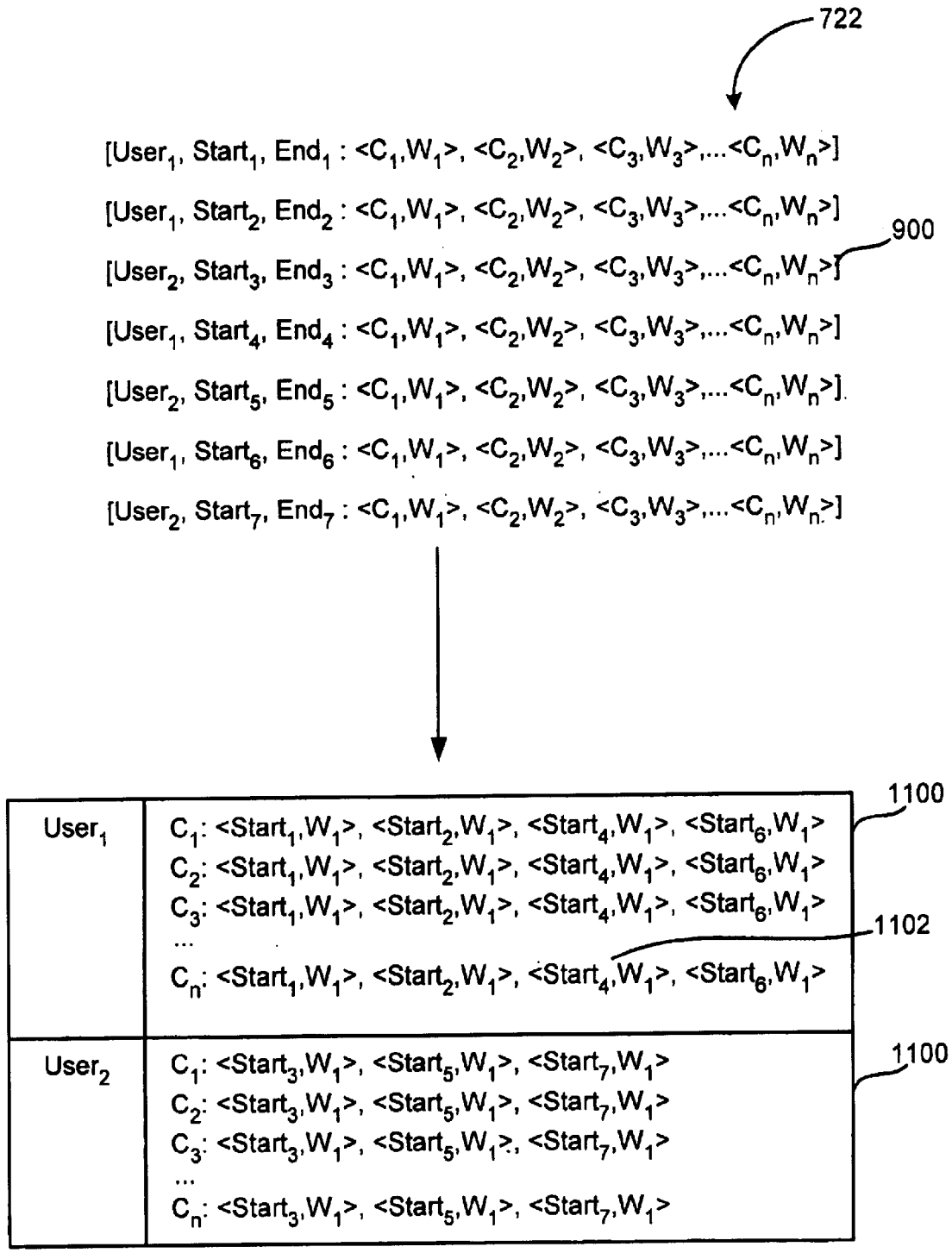
FIG. 11 illustrates the processing function of the parser.

Referring to FIG. 11, there is an example illustration of the processing function of the parser 924. As inputs, the parser takes a packet 900, each web event inside the packet includes, in part, the category vector 908. As described above, the web event includes a user ID 902, start time, duration, type (that is transaction, clickthrough or page view), URL (domain name of the visited web site) and N<category, weight> pairs, where N is the number of categories. The various web events correspond to different users, and there are likely to be many web events for the same user, since each clickthrough, transaction, page view, etc. may generate a web event.

Let us explain the task of the Parser object by a very simple example. Suppose that the packet of web events contains only 5 web events that we may call for example: we1, we2, we3, we4, and we5. (we is an abbreviation for Web Event). Assume that the first, third and last web events (we1, we3, we5) all have the same userID (let's call this userID by Jack). Assume further that a category C exists inside the three web events we1, we3, we5. We have three weights for the pair (Jack, C): w1, w3, w5. The first weight w1, is the weight of the category C inside the first web event we1:

w1=weightaack, C) inside web event we1

The second weight w3 is the weight of the same category C for the same user Jack, but inside the third web event we3:

w3=weight(Jack, C) inside web event we3

The third weight w5 is the weight of the same category C for the same user Jack but inside the last web event we5 of the packet:

w5 weight(Jack, C) inside web event we5

The Parser object associates the sequence (w1, w3, w5) to the pair (Jack, C). The sequence (w1, w3, w5) is a sequence of weights for different instant of time and it represents a curve (a function of time that measures the interest of the user Jack for the category C). This function is given only by this sequence (w1, w3, w5), and is thus a discrete function. Ideally, we would like to have a continuous function because a continuous function can shows us clearly what the shape of the graph is. If we know the shape of this graph (as a curve) than we know how the interest of Jack to the category C is changing with time. Since the sequence (w1, w3, w5) represents a discrete function and not a continuous function, we apply the rules of Probability theory to this discrete function in order to get some information about it.

The first thing we do about this discrete function is to compute what in Probability theory is called the expectation of the random variable. In our case, this expectation is simply the average of the weights in the sequence (w1, w3, w5). This average is called the mean and it is computed by the Aggregator object (with the help of the Calculus object). The second thing the Aggregator does, is to compute the "error", or what Probability theory calls the variance of the random variable. This "error" is called deviation. The third thing that the Aggregator object does is to determine what is roughly the shape of the graph of the discrete function represented by the values (w1, w3, w5). Is the shape of an increasing curve, or a decreasing curve or some sort of combination of the two? The shape of this curve is called the trend. Once this is done, the Aggregator object associates the data (mean, deviation, trend) to the pair (Jack, C) in some data structure (like a hash map, or a hash table, or the like . . . ). The Aggregator does all this for every pair (user, category).

When the Aggregator finishes the processing, the result (which is a hash map, or hash table, . . . ) forms an object that we call DailyAggregate. Therefore, a Daily Aggregate is an object that contains may pairs (user, category), and for every pair (user, category) there is associated to it a data of the sort (mean, deviation, trend). There is also a time stamp which is the time interval that was covered by the packet of web events.

In conclusion, the Daily Aggregation System processes a single packet of web events, and produces a result object that we call DailyAggregate.

When the Daily Aggregation System finishes processing a packet of web events (by producing a DailyAggregate object), it goes again to the Aggregation Queue to pick up another packet of web events. The Daily Aggregation System keeps processing web events from the Aggregation Queue by packets.

Now assume that we start the Daily Aggregation Service for the first time. The Daily Aggregation System goes to the Aggregation Queue and picks up the first packet of web events (packet1). After processing packet1, it produces an object (called daily aggregate, or just aggregate for short). Let us call this aggregate by agg1. Now the Daily Aggregation System goes again to the Aggregation Queue and takes the second packet of web events (packet2) and process it. After processing packet 2, it produces a second aggregate, that we can call agg2 for example. This aggregate agg2 is merged with agg1 to form only one aggregate object that we can call agg12, for example. After fusion, the aggregate agg1 and agg2 both cease to exit, and only the aggregate agg12 exists in the database. This fusion between agg1 and agg2 is an incremental aggregation that is carried out by the Update object (through its updateDailyAggregate( ) method). The new aggregate object agg12 represents the outcome of processing a single packet of web events that is the union of the first two packets, packet1 and packet2.

Daily Aggregate objects (or aggregates for shorts) are the data at level 0 of the Aggregation Tree illustrated in FIG. 2. Each day is represented by a single Daily Aggregate object.

The result is that for a given user associated with a number of web event records—as will typically occur during a visit to a web site, perhaps generating 20 to 100 or more web events the category weights from the many different records are collected and collated in a single category hash table 1100, so that for each category, all of the weights and start times are packaged together. This allows all of the relevant information about the user's web activity during the day the web event records were collected to be easily accessed from a single data source.

3. Create Category Interest Time Model Information

Figure 12:
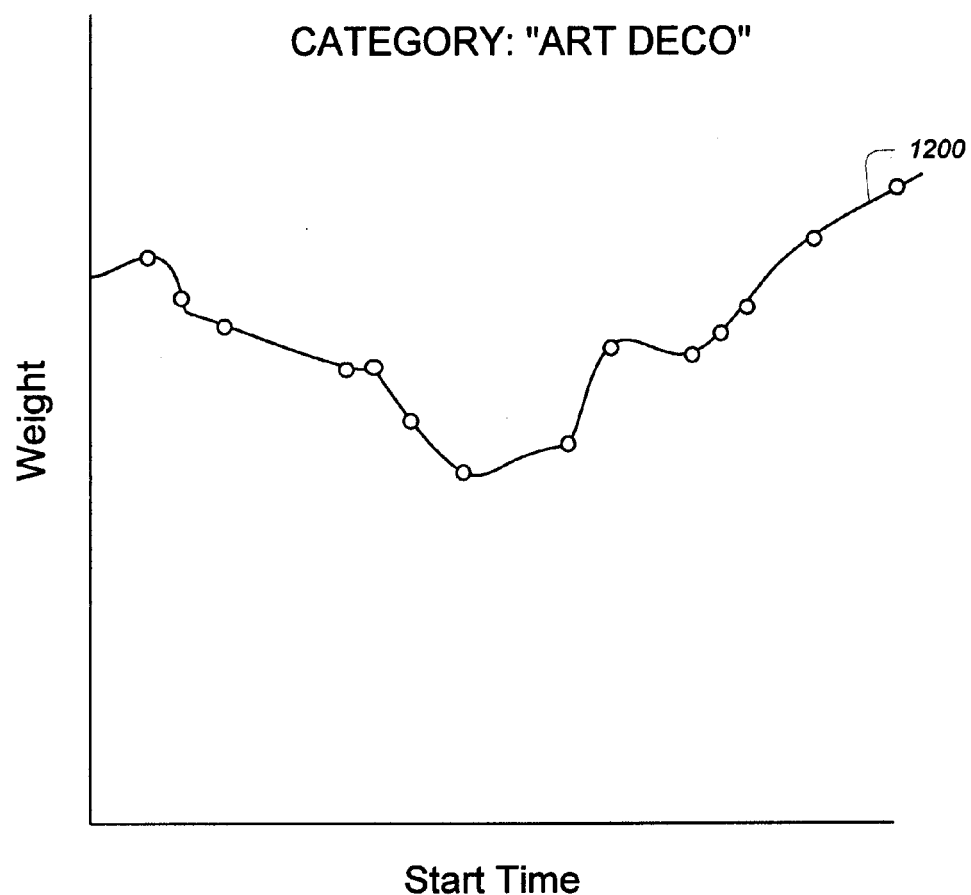
FIG. 12 illustrates the concept of a category interest curve.

The result of the prior step is one user-category table 1100 for each user that appeared on the web server 102 on the day being processed. With each of these user-category hash table 1100, the handler 920 next calls the aggregation engine 926. The aggregation engine 926 processes these tables into a category interest time model information for each user. The summarized information describes the particular user's interests in the various categories over the day for the collected web event records. The aggregation engine 926 operates as follows on each received user-category hash table:

First, for each category table 1100 the aggregation engine 926 sorts the category's weight list 1102 by the start times. The aggregation engine 926 preferably does this by call a sorting routing in the math package 922. The result is a set of data points, essentially a curve, which describes the user's level of interest in the category over the time period from the earliest start time to the latest start time. FIG. 12 illustrates such a category interest curve 1200, for a hypothetical "Art Deco" category. The graph shows the data of 14 web events related to this category, sorted by their starting time, and shows that the user's interest was initially very high, then declined, and then rose again.

The goal at this next stage is then to capture each category interest curve 1200 mathematically, and eliminate the need to store the underlying weight and time data of the weight list. More particularly, for each category, the aggregation engine 926 determines the expected value of the category interest curve 1200 over the time period (e.g.,, one day). In one embodiment, the aggregation engine 926 determines the mean weight and the standard deviation of the weights in the category for the time period. The mean weight is simply the total of all weights in the weight list 1102 for the category divided by the number of weights, which will be the number of web events for this user during the time period. The standard deviation is computed normally. Again, these computations are preferably performed by the math package 922, as requested by the aggregation engine 926.

The aggregation engine 926 then creates a trend description for the category interest curve. The trend description describes the changes in the user's level of interest in the category over the time period represented by the curve. Preferably, this trend description is a string description (or its coded equivalent).

To obtain this trend in one embodiment, the aggregation engine 926 first takes the difference between the weight of the earliest start time and the mean weight. This describes whether the curve is increasing, decreasing, or constant relative to the earliest start time. Next, the aggregation engine 926 takes the difference between the mean weight and the latest start time, and again, determine if the curve is decreasing, increasing or constant. Thus, there are nine possible trends:

1. Increasing, decreasing
2. Increasing, constant
3. Increasing, increasing
4. Constant, decreasing
5. Constant, constant
6. Constant, increasing
7. Decreasing, decreasing
8. Decreasing, constant
9. Decreasing, increasing.

The aggregation engine 926 determines the appropriate time trend, and stores information for this time trend for the category. The stored information may be the strings themselves ("increasing," "constant," and "decreasing"), or code value for these (e.g., 1=increasing, and so forth). Obviously, more than three times/two segments can be selected to result in more complex time trend descriptions.

The aggregation engine 926 may apply other methods to determine the time trend of the category interest curve. In another embodiment, the aggregation engine 926 selects a number of sample times in the interest, including a point at or near the earliest start time, a point at or near the latest start time, and a number of times between these two times. Then beginning with the first selected time, the aggregation engine 926 determines whether the curve is increasing or decreasing, or constant to the next selected time, and assigned a string or code equivalent to that portion of the curve. For example, in one embodiment, three times are selected: the earliest start time, the middle start time, and the last start time. With these three times, there are two curve segments, and, the aggregation engine 926 determines whether the curve is increasing, decreasing or constant in each segment.

In yet another embodiment, the aggregation engine 926 determines the time trend, by identifying the times at which the slope of the category interest curve changes from positive to negative, and storing both the start time, and the appropriate descriptive information about the time period being described.

With the time trend information, the aggregation engine 926 now has a complete description of the user's category interest for the given day. More specifically, it can store the following category time pattern model for subsequent use:

{User ID, Category ID, Mean Category Weight, Category Weight Standard Deviation, From, To, Trend} where "From" is the earliest start time, and "To" is the latest start time in the sorted weight list 1102, and Trend is the description of the curve changes (either string or encoded).

The underlying category weight information from the raw web events can now be deleted, and the category time pattern model stored in the database 720 in the User-Category table. This process is repeated for each category weight list in the user-category hash table 1100.

B. Dimensional Combining.

The combiner 938 is the component that is responsible for combining the daily aggregated information summarized complex information of the various complexes of The dimensional aggregation tasks carried out by the Combiner object correspond to scheduling tasks make by some members. The automatic (incremental) dimensional aggregation that occurs all the time is carried out by the Update object.

Referring again to FIG. 2, there is shown the various levels of aggregated information that are provided by ProReach, specifically which are computed by the combiner 938. The combiner 938 is designed to combine any provided set of category interest time pattern information with respect to any combination of user, category, or time period. We describe the operation of the combiner 938 with respect to the various levels of aggregated information in FIG. 2.

Generally, each of the aggregate complexes in FIG. 2 contains a weight value, as described with respect to each of the tables of the database 720. The weight value is computed by an aggregation function which operates on the weight values of all of the complexes which contribute to the complex being evaluated. For example, if particular user group has 100 members, then the weight for the user group complex is a function of the weight of all of the group members' user complexes. Likewise, the weight for a user complex (user's overall interest relative to all categories) is a function of the weight of all of the user-category complexes for the user (each of the specific user-category interests).

In one embodiment, the aggregation function is the average weight value. Other embodiment use different aggregation functions, and preferably the aggregation function can be selected on demand. Thus, for clarity of explanation, we will refer to the aggregation function generally and provide specific examples using an average weight aggregation function.

In Level 1, there are two types of aggregated data: User-Category complexes 203, and Category complexes 205. A Category complex 205 is computed by an aggregation function of the category weight for all users and a particular category over the selected time period, such as a week, month, quarter, etc. The category ID of the desired category, and the start and end dates are passed into the combiner 938. The combiner 938 retrieves the appropriate category interest time models from the database 720, by providing the category ID and time period, and obtaining the matching records from the User-Category table. The category weight means for the retrieved records are then processed by the aggregation function to produce the final value for the complex. If the aggregation function is the average function, the mean weight is the sum of the weights taken over the number of days being aggregated divided by this number of days. The resulting aggregated weight value is stored in new record in the Category Complex table, along with the category ID, deviation, trend, and From and To dates. For this complex, the trend is determined by whether the aggregated weight value has increased, decreased, or is constant relative to a prior value.

For the User-Category complex 203, the process is similar, but restricted to a particular user for the given time period. The result is stored in the User Category Complex table.

In Level 2, there the Group-Category complexes 205 and the User complexes 207. To obtain a Group-Category complex 205, the combiner 938 retrieves from the User-Category complex table all of the User-Category complexes 205 for a specified user group. User group membership information is stored in the database in the profile table, which identifies for each user ID the groups that the user is a member of Given the group ID then, the combiner 938 can identify the users in this group, and then retrieve the User-Category complexes 205 for each of these users. The weights of the retrieved complexes are then aggregated by the appropriate aggregation function, and the result stored in the Group-Category Complex table.

To create a User Complex 207 for a specific user, the combiner 938 retrieves the User Category complexes from the User-Category Complex table given the user's userID and a desired From and To interval, and aggregates their weights. The result is stored in the User Complex table.

In Level 3 there are Group Complexes 209. To create a Group complex the combiner 938 retrieves all of the User complexes 207 from the User-Complex table, using the user group ID for the desired user group, and a desired From and To interval. The result is stored in the Group Complex table. Preferably, when retrieving user complexes 207 for a given group, the combiner 938 queries the User Group Criterion table and verifies that each user is currently a member of the desired user group, and includes only those users who are members at the time the aggregation occurs.

Finally, the Total Complex 211 is shown in Level 4 of FIG. 2. To create this complex, the combiner 938 retrieves all available Group Complexes 209 for a specified time interval from the Group Complex table and aggregates their weights. The result is stored in the Total Complex table.

As noted, in one embodiment the aggregation function for weight is an average function, and thus, for any desired complex, the weight value is the average of the weight values of complexes that contribute to the desired complex.

More particularly, the aggregation service stores a configuration file which defines for each type of complex, the aggregation function to be used for that complex. In addition, the configuration files stores for each complex a lifetime value that defines how long the complex is to be stored in the database before being deleted.

C. User Group System

The user group manager 936 is responsible for defining and maintaining the user groups, and for responding to queries about the membership of users in particular groups. As explained above, each user group has one or more membership rules, which are stored in the criterion table. The user group manager 936 provides the following functions:

Get List of User Groups: returns the list of user groups from the user group table.

Get Group Size(User Group): returns the size of the specified user group.

Get Which Group User Belongs To(User): returns a list of groups of which the specified user is member.

Get Group Description(User Group): returns the description of the specified user group from the user group table.

Get Users of Group(User Group): returns the list of users currently members of this user group by reviewing the profile table.

Add User to Group(User, User Group): tests whether the specified user meets the membership rule(s) for the specified group; if so the user is added to the group in the profile table.

This function is also executed whenever a new user is added to the user table; the user group manager 938 tests the new user against each of the existing defined groups in the user group criterion table, and updates the profile table for each user group for which the user satisfies the membership rules.

Remove User from Group(User, User Group): removes the specified user from the specified user group in the profile table.

Define Membership Rule(Category, Minimum, Maximum, Negation): adds a new membership rule to the criterion table. For example, to define a category of "Auto Racing Enthusiasts" a criterion may be defined as:

AUTO_RACING_GROUP=user.category(auto racing)> 80 meaning that the weight in an "Auto Racing" category for a particular user is greater the 80.

Thus the call would pass in the "auto racing" category, minimum=0, and negation=No.

Delete Rule(Criterion): Removes the specified membership rule from the criterion table.

Define Rule for Group(User Group, Criterion): Adds the specified criterion to the specified user group in the user group criterion table.

Delete Rule from Group(User Group, Criterion): Removes the specified criterion from the specified group in the user group criterion table.

Any of the foregoing functions can be scheduled with the scheduler 934 to be performed on a periodic basis for automatically updating the users and the user group tables.

D. Daily Aggregation

The DailyQuery object 932 (part of the Daily Aggregation System) is responsible for responding to queries about user interest levels as expressed in the various category weights for the daily aggregates. Each day is represented by a single DailyAggregate object. The DailyQuery object allows one to acquire all kind of information about these daily aggregate objects, such as to what day they correspond, what are the users there, the most active of them, what are the categories there, and the most important categories of them (category(ies) with highest weight(s) for user).

E. Affinity Group Manager

The affinity group manager 936 is responsible for identify users groups that are related to each other. An affinity group is defined by criteria related to interests and other customer profile information (such as from legacy databases) combined by Boolean logic. For example, using age, income, and education demographics, one could define an affinity group "yuppie sportsters" by the following membership qualification:

age<=35 AND (income> 60,000 OR education>=undergraduate) AND interest(sports)> 1.5

In this case, legacy data would be combined with relative interest ProReach data. The affinity group "yuppie sportsters" could then be queried in the same way that regular user groups can be queried. In this case, the calculation of group membership is an expensive operation, so an affinity group has a recalculateMembership( ) command and keeps track of its last recalculation.

Once an affinity group is created, the event records for individual user aggregate into the affinity group, but the affinity group itself does not aggregate into other groups or complexes. Thus, it becomes more usable after having remained defined during several aggregation cycles, but administrators are free to remove it.

The affinity group manager 936 provides the following functions:

1. Automatic creation of affinity-groups, as well as marketer-custom-made affinity-groups 2. Automatic adding/removing users to/from the affinity-groups.

3. Methods for inquiring and manipulating the affinity-groups. These include:

getListOfAffinityGroups: returns the list of all the affinity-groups.

howManyUsersIn(AffinityGroup group): returns the number of users in the specified affinity-group.

toWhichAffinityGroupsBelong(String user): returns a list of all the affinity-groups to which the specified user belongs.

getUsersIn(AffinityGroup group): returns a list of all the users in the the specified affinity-group.

add(AffinityGroup, user): This adds the specified user to the specified affinity-group.

remove(AffinityGroup, user): This removes the specified user from the specified affinity-group.

F. The Update object

The update object 940 is responsible for incrementally updating the daily aggregate and for updating the complexes of the Aggregation Tree as described with respect to FIG. 2. Incremental updating occurs each time when the Daily Aggregation System finishes processing a single packet of web events. The incremental update is applied to each complex that is effected, starting with Level 1 complexes, and continuing up the aggregation tree. The formulas for incremental updating are specified above with respect to the various complex tables. This incremental update is done automatically and all the time (each time the daily aggregation system finishes processing a packet). This is different from the task carried out by the Combiner object. The Combiner object does dimensional aggregation upon the request of a member (for certain specific objects). The Update object is part of the Dimensional Aggregation System. The Update object is a door between the Daily Aggregation System and the Dimensional Aggregation System.

G. Scheduler

The scheduler 934 is responsible for scheduling executing various tasks related to the maintenance of the database 720. The scheduler 934 can execute any of the following tasks on user defined periodic basis:

1. For any given category, aggregation over users and over a time interval (the category being fixed during the aggregation). The result of this aggregation is a category complex.

2. For any given user and category, aggregation over a time interval (the user and the category are both being fixed during the aggregation). The result of this aggregation is a user-category complex.

3. For any given category and user group, aggregation over users in the given user group and over a time interval (the category and the user group are both being fixed during the aggregation). The result of this aggregation is a group category complex.

4. For any given user, aggregation over all categories and over a time interval (the user being fixed during the aggregation). The result of this aggregation is a user category complex.

5. For any given user group, aggregation over the users in the given user group, over all categories, and over a time interval (the user group being fixed during the aggregation). The result of this aggregation is a group complex.

6. Aggregation over-all user groups, over all categories, and over a time interval.

The result of this aggregation is a total complex 211, representing the total aggregation of all the web activity.

7. Deletion of the daily results.
8. Deletion of category complex objects.
9. Deletion of user category complex objects.
10. Deletion of group category complex objects.
11. Deletion of us er complex objects.
12. Deletion of group complex objects.
13. Deletion of the total complex object.
14. The frequency for picking up the web event record from the aggregation queue. The frequency can be scheduled, so that the handler picks up an event record every 15 minutes, or every hour, or every minute, and so forth.

Each of these tasks is identified by its corresponding task number within the scheduler 934. To schedule a task, the schedule provides the following function:

Schedule(task, startTime, maxDuration, frequency, timeInterval): Task identifies one of the above tasks by number. StartTime identifies a time at which the task is executed. MaxDuration specifies the maximum amount of time for the task to take to complete. If the task is not completed after the maximum duration has elapsed then the process is stopped. TimeInterval is a time interval over which the task should execute, such as day, week month, etc. Frequency is a number of time the task should run in the defined time interval.

H. Event Dispatcher

The event dispatcher 930 provides for event driven management of the aggregation service, and particularly for management of the various complex tables, user tables, and category tables in the database. The event dispatcher 930 can dispatch the following events:

1. CComplexBeginEvent: This event by the event dispatcher 930 at the start of the aggregation over users and over many days (in order to produce a CComplex object).
2. CComplexEndEvent: This event by the event dispatcher 930 at the end of the aggregation over users (i.e. after a CComplex object is constructed).
3. UCComplexBeginEvent: This event by the event dispatcher 930 at the start of the aggregation over daily results (in order to produce a UCComplex object).
4. UCComplexEndEvent: This event by the event dispatcher 930 at the end of the aggregation over daily results (i.e. after a UCComplex object is constructed).
5. GCComplexBeginEvent: This event by the event dispatcher 930 at the start of the aggregation over UCComplex objects (in order to produce a GCComplex object).
6. GCComplexEndEvent: This event by the event dispatcher 930 at the end of the aggregation over UCComplex objects (i.e. after a GCComplex object is constructed).
7. UComplexBeginEvent: This event by the event dispatcher 930 at the start of the aggregation over UCComplex objects (in order to produce a UComplex object).
8. UComplexEndEvent: This event by the event dispatcher 930 at the end of the aggregation over UCComplex objects (i.e. after a UComplex object is constructed).
9. GComplexBeginEvent: This event by the event dispatcher 930 at the start of the aggregation over UComplex objects (in order to produce a GComplex object).
10. GComplexEndEvent: This event by the event dispatcher 930 at the end of the aggregation over UComplex objects (i.e. after a GComplex object is constructed).
11. TcomplexBeginEvent: This event by the event dispatcher 930 at the start of the aggregation over GComplex objects (in order to produce the TComplex object).
12. TComplexEndEvent: This event by the event dispatcher 930 at the end of the aggregation over GComplex objects (i.e. after the TComplex object is constructed).
13. UserGroupAddEvent: This event by the event dispatcher 930 whenever a user becomes a member of a user group (i.e. whenever a user is added to a user group).
14. UserGroupRemoveEvent: This event by the event dispatcher 930 whenever a member of a user group is removed from the user group.
15. UserGroupCreatedEvent: This event by the event dispatcher 930 whenever a new user group is created.
16. UserGroupDeletedEvent: This event by the event dispatcher 930 whenever a user group is deleted.
17. UserGroupTestBeginEvent:This event by the event dispatcher 930 whenever user group manager starts testing whether the members of a user group still satisfy the user group membership test or not.
18. UserGroupTestEndEvent: This event by the event dispatcher 930 whenever the com.fujitsu.proreach.agg.UserGroupManager class finishes the user group membership testing.
19. CComplexDeletedEvent: This event by the event dispatcher 930 whenever a CComplex object is deleted
20. UCComplexDeletedEvent: This event by the event dispatcher 930 whenever a UCComplex object is deleted.
21. GCComplexDeletedEvent: This event by the event dispatcher 930 whenever a GCComplex object is deleted.
22. UComplexDeletedEvent: This event by the event dispatcher 930 whenever a UComplex object is deleted.
23. GComplexDeletedEvent: This event by the event dispatcher 930 whenever a GComplex object is deleted.
24. TComplexDeletedEvent: This event by the event dispatcher 930 whenever the TComplex object is deleted.
25. DailyResultCreatedEvent: This event by the event dispatcher 930 whenever a daily result is created.
26. DailyResultsDeletedEvent: This event object is fired by the event dispatcher 930 whenever the daily results are deleted.

The event dispatcher 930 can dispatch these events to any of the other components of the aggregation service to allow such components to appropriately respond to the event. For example, the update manager may respond to a DailyResultsAddedEvent to perform an incremental update of the appropriate complexes.

I. Profile System

The Profile System 955 provides an object called Profile Query that is responsible for all queries about profiles. The service also includes a Profile Manager object that is responsible for the management of profiles. Such management includes for example, profile sharing: Say that a member A maintains profiles for his/her web site within the central ProReach System database. Another member B would like to have some of these profiles (more specifically those profiles that show a high interest in electronics). Member B does not own these profiles, but nevertheless, member B would like to receive some of these profiles. Handling such requests and keeping records of what profiles were shared is all done by the Profile Manager object.

More particularly, the Profile Query is responsible for handling queries about user profiles. The Profile Query receives a query specifying a user's ID, and retrieves from the profile table the user's group membership information, and retrieves from the user-category table the user's interest information in the categories (e.g., weights, deviations, or trend information). The Query object constructs from the retrieved information a user profile. The user profile includes at one of the following items: a current user group list of the user groups of which the user is current member; a group change history list of which identifies the groups of which the user is a new member over some time period, and from which groups the user has been dropped as a member; and a list of the top N categories of interest, based on the category weight, such as the top 10 categories of interest.

The category list may be further refined to include only categories which show an increasing trend, so as to predict the user's future interests for marketing purposes.

In a preferred embodiment, two types of user profiles are maintained, local and global. A local user profile is maintained at each ProReach enabled web site 100 using web event information that is gathered at the site from user visits there. The global user profiles are maintained by the host system 103 or the global server 112, and are created from the local user profiles for each user.

J. AQL System

The UserGroup Manager 936, the Daily Query 932, and the Profiler 726 objects need a mechanism by which system administrators (and various members of ProReach System) can form queries about users' interest, categories, groups and so forth. In one embodiment this mechanism is provided by a flexible query language called Aggregation Query Language (AQL), which is processed by the AQL system 944 to form query objects which are executed by the various managers.

1. AOL Language

AQL is a predicate query language, which means that it is a language that is mainly based on predicates alone. There is no data type declarations. Every predicate has a certain number of arguments (its arity) and the data types the arguments are supposed to have. When a predicate is used in a query, it is implicitly assumed that the data types of the arguments of the predicate are used, and there is no need for declaring the data types of the variables. AQL has the following features:

1. A rich collection of primitive data types and primitive predicates.
2. The possibility of constructing new predicates from old or primitive ones, and very simple syntax for doing it.
3. A very simple syntax for constructing queries, using predicates.
4. A simple interface between a marketer and the predicates, so that the marketer does not need to learn the query language.

There are two kind of statements in AQL (Aggregation Query Language):

1. A Query statement (a statement which inquires some information).
2. A Predicate definition statement (a statement which constructs a new predicate).

A query statement has the following form:

\query x, y, . . . , z [P(x, y, . . . , z)]

the sentence means that we are interested in all tuples (x, y, . . . , z) such that the sentence P(x, y, . . . z) is true. For example, if P(x) means "the user x is very interested in Fishing", then, the query: \query x [P(x) \] will return all the users that are very interested in "Fishing".

More formally, the syntax of the a query statement always starts with the keyword \query followed by an identifier (possibly many identifiers separated by commas) and then a predicate.

A predicate can be either a composite predicate or a built-in predicate. A built-in predicate is a predicate that is already provided by the aggregation service. A composite predicate is a predicate that one can build by combining built-in predicates with logical connectors (conjunction, disjunction, negation, etc . . . ). One can also build a composite predicate by combining other composite predicates. In conclusion, a composite predicate is a predicate that is built by the marketer, while a built-in predicate is a predicate that already exists and ready to use (already provided by the aggregation service). When we use the word predicate, this can be a built-in predicate or a composite predicate. The syntax for writing predicates is follows:

A composite predicate can either be a conjunction, a disjunction, or a negation as follows:

If the predicates are separated by comas, then it is a conjunction. For example, the following sentence represents the conjunction of three predicates P, Q and R: [P, Q, R]

If the predicates are separated by a colon, then it is a disjunction. The following sentence represents the disjunction of three predicates P, Q, and R:

[P:Q:R]

If the predicate is enclosed by curly braces, then it is a negation. The following sentence represents the negation of the predicate P: {P}

One can build a new predicate from existing (i.e. primitive or already defined) predicates, by composing two predicates or more via these logical connectors for conjunction, disjunction, and negation. To define a new predicate, one uses a predicate definition statement, as follows:

\predicate identifier predicate

Let's give an example: Suppose we have a predicate P(x) that means "the category x interests more than half of the population", and a predicate Q(y) that means "The user y has interest in medicine" and a third predicate R(y, z) that means "the user y is strongly interested in the category z alone". We can build a new predicate K(y, x) as follows:

\predicate K(y, x) [P(x), Q(y), R(y, x)]

Now we can use the new predicate K(y, x) to make a query like this:

\query y, x [K(y, x)]

This query will return all users y and categories x such that the user y has interest in Medicine and is strongly interested in the category x alone and the category x interests more than half of the population.

In AQL, we can express a quantified statement (i.e. a statement with a logical quantifier). Suppose we have a predicate P(x, y) that means "the user x has a medium interest in the category y". And we would like to express a sentence such as: "There exists a category for which user x has a medium interest". In Predicate calculus, this is done via the existential quantifier:

∃y P(x, y)

In AQL this can be written as follows: P(x,X)

The upper-case letter X always means that it is a quantified variable. If we make the following query:

\query z [P(z,X)]

it will return all users z having a medium interest in some category.

AQL can also express the universal quantifier. According to the rules of first order logic, the universal quantifier can be expressed by combining the negation and the existential quantifier. For example, suppose we would like to express this sentence:

"for every category, the interest of the user z is higher than 70%".

This new predicate P(z) tells us that the user z is interested in every category with an interest that is always higher than 70% whatever the category is.

Suppose we have a predicate Q(x, y) that means:

"the interest of the user x in the category y is higher than 70%"

We can express the predicate P in terms of the predicate Q as follows:

\predicate R(x, y) [{Q(x,y)}]

\predicate P(z) [{R(z,X)}]

2. AQL Interpreter

The AQL system 944 includes an interpreter that is responsible for interpreting the AQL language into executable objects (e.g., Java objects) and returning the results. The components of the interpreter include a Statement Analyzer, a Predicate Definition Processor, a Recorder, a Tree Builder, a Factory, a Predicate Tree Builder, a Predicate Builder, and an Evaluator.

Given an AQL statement, the first component that gets the statement is the Statement Analyzer component. This component simply determines what 10 kind of statement it is, whether it is a query statement and a predicate definition statement. If the statement turns out to be a query statement, then the Statement Analyzer sends the predicate part of the statement to the Tree Builder component. The Tree Builder component builds a tree from the predicate part of the statement. For example, suppose that the original statement was a query statement of the form:

\query x, y [[[P(x), Q(y)]: [R(x, y), P(x)]], Q(y) ]

The predicate part of the above statement is the string that starts with the first bracket "[" and ends with the last bracket "]".
The tree that the Tree Builder will construct from the above query statement is the following:

```
And {
    Q(y)
    Or {
        And {
            P(x)
            Q(y)}
        And {
            R(x,y)
            P(x) }
    }
}
```

Once this tree is constructed by the Tree Builder component, the Factory component constructs a predicate object for each leaf of the tree (i.e., for R(x,y), P(x), and Q(y)). Then the Predicate Tree Builder replaces every leaf of the tree with the corresponding predicate object that was constructed by the Factory component. The Predicate Builder component constructs a predicate object for the whole tree. The Evaluator component takes the predicate object constructed by the Predicate Builder component, supplies the arguments for it and evaluates it, and gets the results of the query statement to the requesting entity. For example, the Evaluator may return its results to the User-Group Manager object or Profiler object or Daily Query object or AggQuery object depending on the type of the query and which object should handle that query.

As noted above, the Statement Analyzer component first determines what is the type of the statement (a query statement, or a predicate definition statement). Now, if the statement turns out to be a predicate statement rather than a query statement, then the Statement Analyzer handles the statement to Predicate Definition Processor component. This component takes the predicate part of the statement and gives it to Tree Builder component, to the Factory component, to the Predicate Tree Builder component, and then to the Predicate Builder. Then the Predicate Definition Processor gets the predicate object constructed by the Predicate Builder component. The Predicate Definition Processor component gives the predicate object to the Recorder component together with the identifier part of the predicate definition statement. The Recorder component puts the pair (identifier, predicate object) in the main HashTable of the interpreter, where it is stored for use in subsequent queries.

VI. Categories and Categorization

A. Overview of Categorization

When a web visitor engages in activity such as by looking at a web pages, a ProReach system analyzes the activity by determining what has happened, i.e. who has done what and when. This section explains how ProReach identifies who and what, namely by categorization. In an alternative embodiment, an additional dimension for categorization is applied: determining where an activity takes place, such as indicating at what company website or division activity occurred.

To categorize documents and other web content, ProReach's content recognition engine 718 builds category "patterns" from sample documents and categorizes documents based on which category's pattern(s) they best match. In one embodiment, the content recognition engine 718 is based on an available engine from Autonomy, Inc. of San Mateo, Calif. The content recognition engine does linguistic analysis on a document to identify keywords.

The content recognition engine includes a library of categories related to e-commerce. These are organized hierarchically to better approach how users might think about web related content. ProReach also provides the content recognition engine with an architecture for adding, refining, and editing categories, both semi-automatically and by human administration.

ProReach includes a standard category tree that system administrators may extend in their areas of expertise or heavy traffic. As documents are categorized and their usage is recorded, ProReach builds two Baysian networks that describe the probabilistic relationships between categories. First, an inheritance tree helps improve the hierarchical category structure and streamline categorization performance. Second, a relationship network is built by both automated and human-driven data mining to document how categories co-occur. Understanding these relationships can be of important benefit to marketers. By integrating selected additions to the standard category tree, it is anticipated that this tree will become an increasingly accurate measure of the content that system administrators use in their web sites.

As described above, all web event records are weighted, as are aggregated complexes of web events, such as user, user groups and category complexes. This weighting optimizes all calculations for relevance to ProReach system owners. For each combination of a content category and a user group, an aggregate complex models the web traffic for this combination.

In one embodiment, each ProReach system 100 has a user group called "systemEveryone", which in combination with a particular content category, the describes the behavior of all visitors to a given ProReach system 100 with respect to the specific category; this is embodied as Group Category complex, where the Group is systemEveryone. Similarly, a content category "everything" summarizes all of the categories and is used with each user in a user category complex 203 to describe the interests of any particular user group with respect to all content categories. Thus, categorization serves as a method for grouping data for further analysis. More globally, central ProReach administration may use the group "everyone" and content category "everything", for all categories and all users known anywhere. Aggregate complexes using these "global" categories may be downloaded by systems as desired.

B. Categories and Hierarchies Organize Data

In the preferred embodiment, all content categories fall into strict hierarchies. Each hierarchy has a root: all users are included in the "everyone" user group, and all content is included in the "everything" category. Any category may subsume child categories, which are children only of that one parent. Classifying an event (or a user) of the parent category into one of the child categories provides additional data. These must be justified by their utility in providing valuable information. They must be meaningful to humans.

Child categories must be different, conceptually as well as in web traffic patterns, form each other and from their parent. In particular, child categories should be easy to distinguish computationally. Child categories are distinguished from each other based on a weighting derived from the amount of visitor views of documents in the categories. Categories which are too "light", i.e., insufficient traffic, to exist on their own are "folded in" to their parent category, with their weighting information aggregated with that of their parent category. The weighting of categories depends in part on how system administrators choose to weight individual web pages and other documents.

The level of detail stored by ProReach for a category can be regulated by setting global options. When these options are adjusted to lower storage, data are compressed both by storing fewer details about time patterns, and by folding smaller categories into parent categories.

1. Building and Maintaining Category Hierarchies As data patterns change, existing categories must be adjusted and new categories created. A category usefulness is preferably measured by its distinguishability from others. The present invention handles category discovery and maintenance by documenting event records for categories. When one unsubdivided category becomes too heavy, four things happen:

Sample documents from the growing category are collected by statistical sample.

Key phrases are identified from sample documents.

An algorithm searches for features (such as key phrases) to identify one or more new subcategories.

Central ProReach administrators are alerted to the new subcategories so as to approve or disapprove of the inclusion.

The second and third steps here automatically by the content recognition engine 718, which determines the appropriate groupings of documents, and suggests potential category names. A human administrator may accept the suggestion, or adjust the category based on refinements to the automated suggestion. For example, the human may choose different representative documents for a category and may choose descriptive names for new categories. The new categories then become part of the standard ProReach distribution and are available for download by ProReach systems, which will subsequently build event records covering the new categories if they have sufficient traffic in this area.

The categories used by a ProReach system are formed from a combination of strict hierarchies and pseudo-hierarchies. A strict hierarchy is defined as directed tree-like structure with single inheritance: each node (except the root) has exactly one parent, so that each child of a parent is a child with 100% probability. The tree structure implies that a given child is never its own ancestor (such as parent's parent's parent) and that there are never two different paths from a child to an ancestor. This structure is clear and convenient to work with. However, strict hierarchies often fail to capture the actual, more complex between categories that documents or users may be associated with. Strict hierarchies also fail to account for uncertainty, that is indeterminacy of which category or groups a particular document or user belongs to.

Pseudo-hierarchies remedy these deficiencies. A pseudo-hierarchy still maintains parent-child relationships, but allows for a document or user to partially belong to multiple categories. For example, document about "dogs" may belong 60% to "pet" category and 30% to a "mammal" category. In one embodiment of the present invention, these pseudo-hierarchies are treated as Baysian networks, to model the probability of classifying documents into content categories, or users in user groups. In this case, there would be one node per category. Say that the relationship between the "sports" category and its child category "football" is (30%, 85%). By this we mean that if we knew only that a given document had been classified as "sports", there would be a 30% chance that the document would also be classified as "football," and conversely that a document classified as "football" with 85% probability would also be classified as "sports." In particular, sports may have another parent category.

ProReach combines the two approaches of hierarchies and pseudo-hierarchies by initially modeling content categorization on a strict hierarchy, even though the actual performance of the content categorization engine is pseudo-hierarchical. In accordance with this doctrine, we consider web traffic that occurs within children categories as also occurring in parent categories.

Simultaneously with this external point of view, ProReach collects statistics on how parent and child categories relate to each other, including the probability that one category is classified into the other category.

C. Category Names and ID's

Categories used in a ProReach system 100 may be created by independent and unrelated companies and organizations. It is essential that categories named by independent entities do not have identical names. More immediately, one would not want a ProReach system 100 to name two of its own categories the same way. Such name collisions could cause considerable confusion and lead to processing errors.

Since alphabetical names are intended primarily for human consumption, and since actual category discrimination is based on the underlying category ID's (both for users and for content), the two identifiers use different approaches. For example, it is easier to enforce uniqueness of category identifiers by encoding in them information that is difficult to duplicate accidentally. On the other hand, textual names must be as brief as possible to convey their meaning. It may make sense to allow for locale-specific rendering of category names.

To enforce unequivocal naming for ID's and to encourage this for text names, each ProReach system 100 carries a unique identifier and a unique text string, which is determined at the time of system installation. Whenever the originating location of a category is uncertain, this must be prepended to the local category ID or name, respectively. Thus, if a ProReach system with the unique identifier "4Q5f4" at SportsWorld were to define a category "Xj542" called "Football", this category would be treated as:

ID: 4Q5f4.Xj542 name:SportsWorld.Football

In case this were clear from context, the prefix "Sports-World" may be taken as a default and either hidden or encoded by color when viewed by users. In the likely case that ProReach had already defined a "Football" category such "H730," a ProReach administrator at SportsWorld would have received a warning message when attempting to name a local category the same as a standard category. If we assume that the central ProReach system at the central system has its own unique identifier, e.g., ID B345, then the central system's corresponding category would be seen as:

ID: B345.H730 name:Central.Football

Note: in these examples, identifiers of systems (like B345 or SportsWorld) are called prefixes.

During the update process, ProReach systems 100 exchange their information with the central system. Depending on their policy, they supply more or less event record information to the central system, which in turn provides upgrade information combined from all ProReach systems 100 and administration at the central system. New categories are added at appropriate places in the hierarchy, and in cases where the category refinement at a ProReach system 100 overlaps substantially with that at the central system, new categories are listed. ProReach systems 100 are given the chance to fold some of their specialized categories into those that the central system has added to the standard category tree (see that section below.)

1. Default Unalterable User Category Structure

Figure 13:
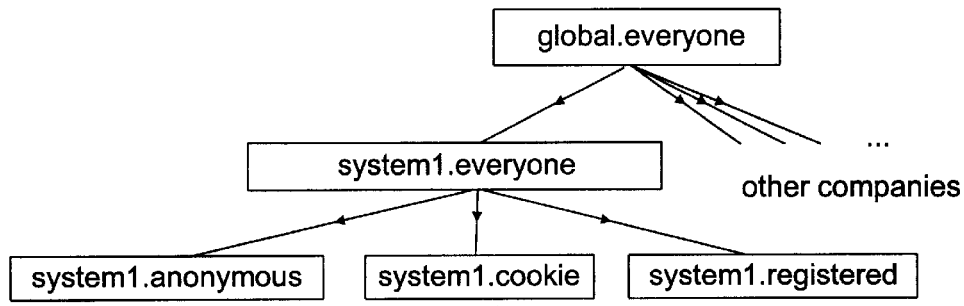
FIG. 13 illustrates the root portion of central category tree.

To facilitate communication between different ProReach systems 100 an initially sparse set of user groups is provided. All ProReach systems 100 share these user groups near the top of their hierarchies, and allow for the inclusion of additional new groups and subgroups. As with content categories (discussed later in this chapter), this is a standard structure, as illustrated FIG. 13.

First, notice that the user group "global.everyone" is the only category built by data collected at the central system. All other categories are specific to each system 100 (indicated by the second level of user groups denominated "system1.everyone" and so forth). Thus, for example, the company SportWorld, one should substitute "system1" with "SportWorld". Remember that these names are merely descriptive, and actual category identifiers are system-assigned numbers.

The categories "everyone" and "global.everyone" are the only ones for which the central system tracks information. There is a separate system.everyone-rooted subhierarchy for each ProReach system 100. As discussed in the section on Aggregation, below, during a system update, a system 100 submits information for its system.everyone to the central system, which responds by sending back information about the central system.everyone. In this way, categories from many different ProReach systems 100 are kept up-to-date.

The categories "anonymous", "cookie", and "registered" are respectively for customers who are unidentified, known by the cookie they have allowed ProReach to store, or who have completed a full registration, usually including such demographics as name and address.

2. Similarities and Differences Between Categories and Groups

Administrators may wish to add subcategories of either kind (users or content), detailing their vertical specializations. These would always be added to one of the existing categories. A system administrator may add categories under his own system's naming convention, i.e. in their own namespace. There are also important differences between the two types of categories. These are highlighted in the table below. These differences will become clearer when content categories are discussed later in this section.

Differences between User Groups and Content Categories

| Content categories | User groups |
|---|---|
| Standard categories are maintained by the central system | Standard categories, while specified by the central system, reflect divisions within system customers. Their definitions do not require maintenance |
| Many standard categories are built; these are often quite specific. | Only a few general standard categories exist. |
| A given document is not expected to change categorization frequently. | A given user may be reclassified as his or her relationship with the system company changes. |
| The category tree is expected to grow relatively monotonically, i.e. category deletion is rare. | While the standard categories are so basic that little change to the tree is needed, specific categories added by a company might be reorganized from time to time. |
| Added categories may be a child of any existing category | Added groups fall under system.systemEveryone in the hierarchy |

D. Using Source or Location in Categorization

Source is another dimension similar to that captured by user groups. For example, the company SportWorld would be very interested in knowing how much its clients visit the competing website SportsOnline.com. If both SportWorld and SportsOnline.com were ProReach systems 100, they could become quite dissatisfied both with each other and with the central system administration if their competitor was able to use ProReach to spy on their customer's behavior at their site. On the other hand, it should matter to SportWorld whether customer activity (say on football) is at their website or somewhere else.

To balance these concerns, ProReach keeps track of the source of events in a way similar to its handling of user groups and content categories, but only distinguishes between inside and outside of a given company at any ProReach system. This means that for any user and category, a system (like SportWorld) may have two extended event records —one for activity within the company, and one for all other activity. An extended event record behaves internally almost like the event records introduced in the next section, except that there is the additional parameter of source used to index extended event records. The central system keeps track of more than two sources, differentiating between different systems and between their "inside" and "outside" sources.

E. The Content Category Lifecycle: Formation, Tuning, And Change

1. The Standard Category Tree and Additions by ProReach System Administrators

Figure 14:
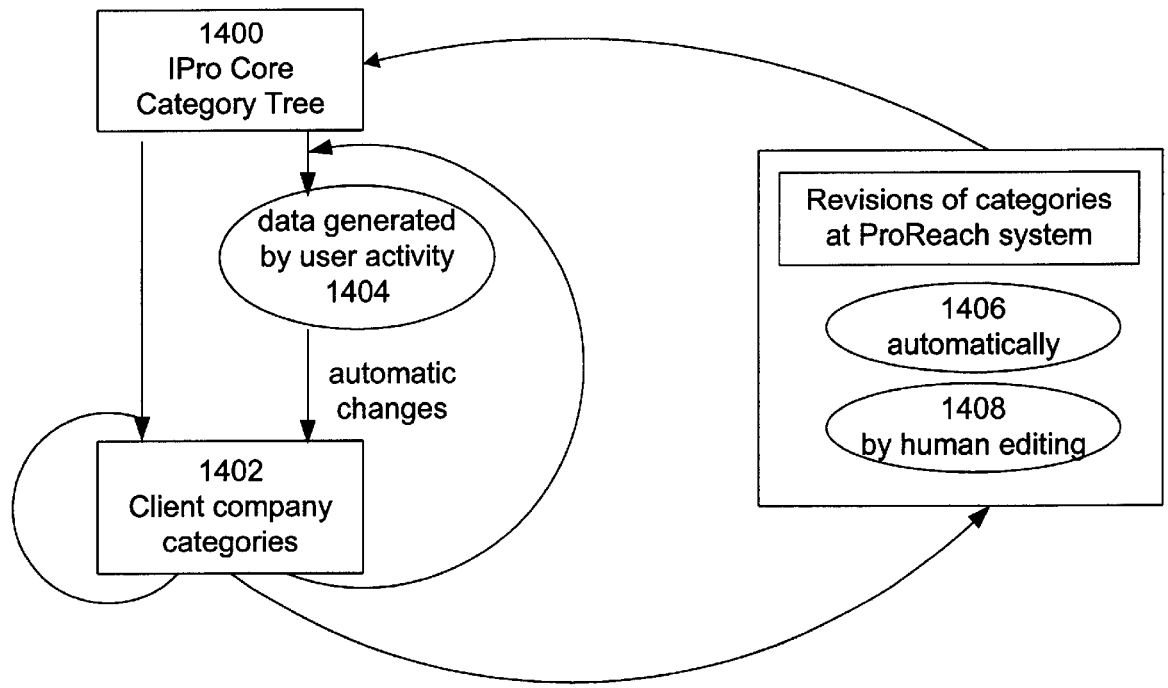
FIG. 14 describes the process of updating the standard category tree.

Referring to FIG. 14, the central system 103 provides a standard content category tree 1400 as an integral part of each ProReach system 100. At its root is the category named "STANDARD.everything," which is also an ancestor of every ProReach systems's 100 own added content categories. All categories in the standard category tree, and preferably only these categories, have the prefix "STANDARD".

Individual ProReach systems 100 are not allowed to modify any of these standard categories. More generally, ProReach systems 100 are only allowed to modify categories 1302 under their own system, namely having the prefix assigned to their system. If they attempt to delete "Standard" categories, this will only be a virtual deletion. In other words, the category will be invisible to them, and any classification they see will not descend into the categories they have made invisible.

a) Adding Categories At ProReach systems

An administrator of a ProReach-system 100 can manually 1408 add new subcategories of existing categories to their local category tree 1402 by creating a set of sample documents and instructing ProReach to use them to create a new category. The categories are preferably added in response to user activity 1404 indicating that certain documents are experiencing significant usage, which may indicate the need to further subcategorize the content in the category of which these documents are categorized. ProReach will first categorize them under the old tree 1402 to determine the parent of the new category. If the parent is not the one intended, this may serve as an indication that either the old parent category does not perform well, or the sample documents do not fit where the administrator intended. In particular, the sample documents may not all belong in a single category, in which case perhaps only a subset or altogether different documents should be used to train the new category.

ProReach monitors category editing activity along with which categories are involved. These data are stored locally and transmitted during upgrades, so if several systems have administrators who attempt similar additions, this indicates which categories to reexamine.

By successively adding categories, a particular ProReach system 100 may accumulate a specialized hierarchy 1402 in its own are of expertise. Since new categories may only be added as subcategories of existing ones, each new category will have an ancestor in the standard category tree. Thus even if the standard category tree never expands in this particular area, event records in these categories contribute to the totals in ancestor categories that are meaningful to every other ProReach system 100.

Specialized expansions of the category tree are particularly interesting to the central system 103, because these capture expertise and leverage the companies specialized experience. As the standard category tree is expanded to include the new third-party subcategories with the heaviest traffic, the standard category tree will be able to reflect content increasingly accurately.

The standard category tree will not become too big for companies to use, because each ProReach system 100 keeps only that level of detail relevant to its own business. Each category that is too light will be considered only as folded in to parent categories.

b) Updating the Standard Category Tree

The central system 103 improves its standard category tree based on incoming data and practical experience. These improvements lead to continual upgrades to the standard interest tree. Each change carries a time stamp, so that ProReach-enabled sites may download only those upgrades they have not already incorporated.

As part of the update, ProReach systems 100 provides summary information about traffic on their own system. The degree of information collected in this way from businesses may vary. However, the data is preferably designed in such a way as to be unobtrusive and not to disclose either information about individual customers or an accurate financial picture of a company. Instead, only summary event record and category performance statistics will be shared. This will foster a symbiotic relationship between the central system 103 and other ProReach systems 100, allowing each to build more precise models of their own data.

c) Building the Standard Category Tree

The ProReach standard category tree 1400 preferably has approximately eight hundred categories. These categories range from cosmetics, sports, board games, stamps, cars, trucks, books, health, real estate, travel and so forth. The standard category tree 1400 is hierarchically structured. The categories are implemented in a database table of categories, each of whose entries contain a field that identifies the parent category.

ProReach constructs its initial standard category tree 1400 based on trees at leading web portal sites, such as AltaVista. These sites have already built categories that are validated by their continuous traffic. ProReach uses a spidering system that collects pages from these sites and builds up a categorization engine trained by pages that link from categories. Several tens of thousands of categories are available from leading portal sites. Spidering starts from the top down and increases knowledge of categories over time.

Categories are revised periodically, since their content may change. It should be noted that many categories may be limited to topics of current interest such as daily news. These highly dynamic categories are recalculated quite often to stay current.

d) Discovery, Refinement, and Editing of Categories

Categories added at ProReach systems 100 do not interfere with standard categories because they always are added as descendants to the standard categories. However, ProReach system administrators have arbitrary freedom to refine standard categories by adding their own child categories. Over time, both the central system 103 and owners of ProReach systems 100 may choose to add categories to the tree 1400. These are always added as children of existing categories and are thus considered to define a specialized subset of their parent category. In addition to manual addition of categories, those categories with heavy traffic seek to be split into smaller, more specific pieces. In order to do this, they store a statistical sample of distilled documents, which can then be categorized into separate subcategories by administrators.

Performance of categories is always measurable, and serves as a basic means to drive (or inhibit) specialization, as appropriate. If a category does not perform well, that information is stored as a warning signal, which leads to monitoring and possible re-training of the category. Refinement is driven strictly by traffic in the standard category tree. Given a high level of traffic 1404, a statistical sample of documents is collected, generating candidate specialized subcategories. After testing, these are added to the standard category tree 1400.

It may also occur that a category gradually loses traffic. If this happens at a ProReach system 100, it de-activates the category and redirects related traffic to the parent category. If the global category performance is found at the central system to be so small that the category is not worth maintaining, the history of the category is archived for possible later revival, and the category is simply folded in to its parent in the standard category tree 1400.

When a category is modified, it may not categorize its original target documents perfectly. As a result, a new category ID is generated (possibly with the same name) and event records for the old pattern are converted to event records for the new category. To make this work, the old category is assigned to redirect its event records to the new category, along with a number indicating what fraction of old content would be classified into the new category. By default, one minus that fraction would be classified into the parent of the old category. If a parent category has changed, the children should be redirected to have the new category as a parent.

F. Categorization Model of the Content Recognition Engine The content recognition engine 718 is able to train categories on training documents so that any other document can be scored against any category. This means that for any document and any trained category, the content recognition engine 718 outputs:

score(document, category)

which ranges from 0 to 1,000,000 (or other suitable maximum), with higher scores hopefully indicating a better fit of the document in the category. (1,000,000 is used as a maximum instead of 1:0 to along for storage of high precision results as long interests instead of floating point values).

Figure 15:
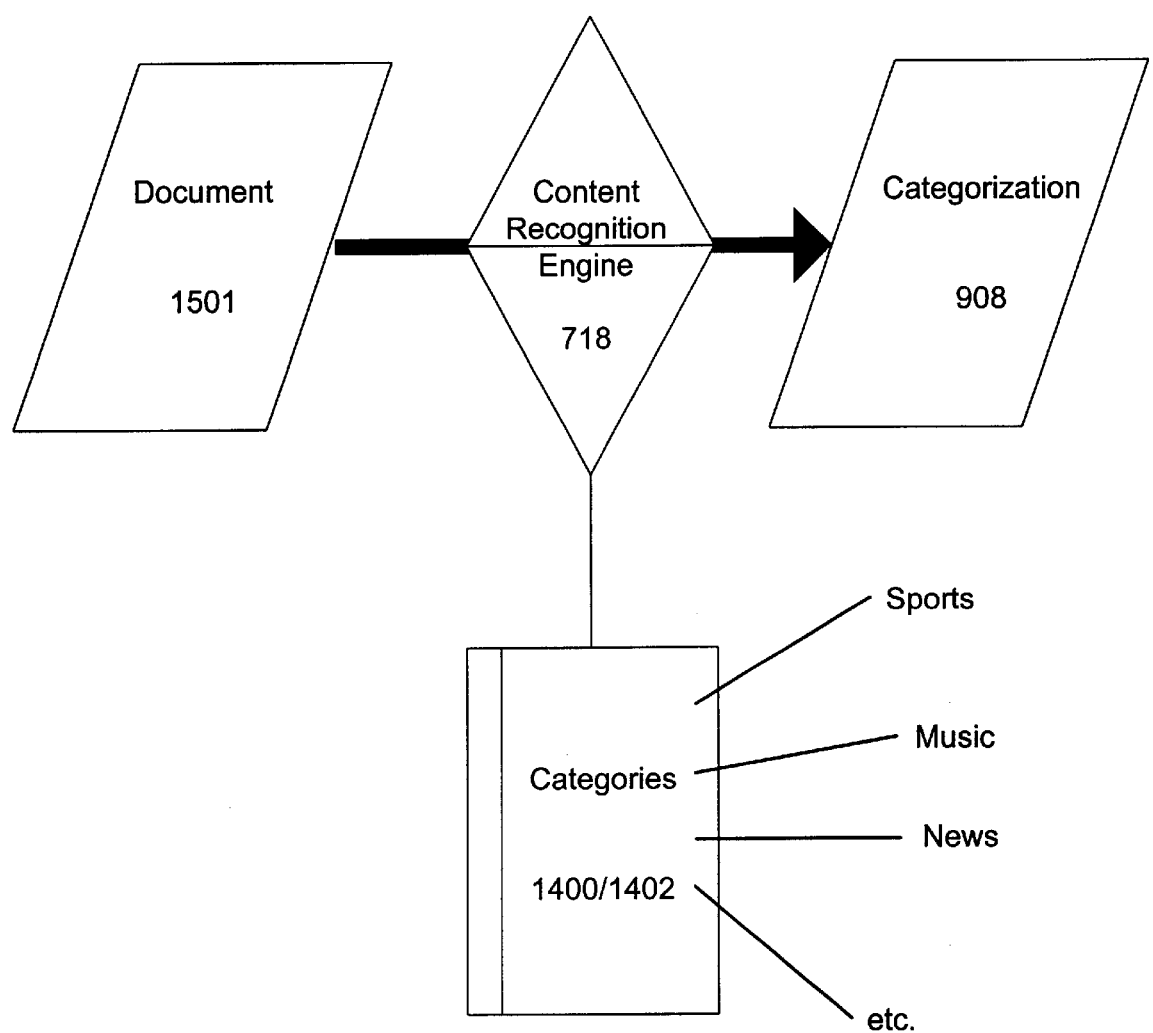
FIG. 15 illustrates the operation of the content recognition engine.

FIG. 15 provides a high level view of the content recognition engine's operation. A suitable content recognition engine is provided by Autonomy, Inc. of San Mateo, Calif. A given document 1501 is fed into the content recognition engine 718, which matches the document with stored patterns-one for each content category in the category tree 1400, 1402. For each category, the content recognition engine 718 outputs a category score.

Many web pages are visited frequently by ProReach system users. It would be inefficient to categorize each document each time it is viewed by a user. Thus, one optimization strategy is to store, rather than recompute, category weights whenever possible. This can be accomplished by two means. For pages on a local ProReach system 100, category identification are stored inside the page as metadata. Alternately, frequently visited pages' categorizations are be cached in the page metadata cache 716. When ProReach sees a record of a visit to a URL, it first checks the cache 716 and then searches for metadata. Only if neither of these yields a categorization are the other procedures here followed.

1. Category Creation

The first step in creating a category is identifying a representative set of documents. Documents for a category are selected by the system administrator or by experts in the category's subject, categorized by the content recognition engine 718, and then the quality is tested on real-world documents by an administrator or other content expert, who validates the categorization results. If the categorization produced is good according to the expert, then a good set of representative documents was used. Otherwise, it was not, and the set of representative documents should be altered, and the testing process repeated.

When testing produces good results with good frequency, then the category is done. This set of documents which is used to train a category is the category's prototype. Using statistical methods, the content recognition engine 718 analyzes the set of representative documents and produces a category pattern. This pattern consists of weighted key phrases, which are stored in a category-defining database table. Each key phrase is a group of words extracted from a sample document and stemmed to standard word forms. For example, a document about football might contain both the terms football players and football player. In this case, both of these would be considered equivalent, and the singular form would be stored as a key phrase in the category pattern.

2. Document Categorization

Once such a pattern exists, the content recognition engine 718 can compare any document to that pattern and compute how closely that documents fits the pattern. When a document is categorized, it is first processed by separating its text into phrases. Linguistic analysis and information theoretic processing then identify the phrases most likely to be important in the document. For example, words like "and", "I", and "or" occur too frequently to distinguish meaning in documents, and are discarded from further consideration. Some of the remaining phrases are identified as key phrases and are weighted in proportion to how much they are thought to define the meaning of the document.

The key phrases derived from the document are then looked up in the category-defining database table and matched against stored category patterns. Only those patterns that contain any of the document's key phrases are considered further as candidates for the document's category. Suppose that only four categories' patterns match any of these key phrases. Then the document's score in each of these categories is computed as shown in FIG. 15.

A document can match a pattern for example 90%, or it might be a 50% match. This match is called a score, and is calibrated to range from 0 to 1,000,000. The highest possible score 1,000,000 is given when a document matches perfectly a predetermined number or percentage of key phrases stored for a pattern. The score 0 means that no match has been found, which occurs for those patterns which have eliminated prior to the step discussed above. In general, the score is calculated by summation of matches between a pattern's key phrases and a document's key phrases. As described above, the set of category scores is a category vector 908 of pattern matching results —one result for each category pattern with a positive match. For categories where there is no pattern match, the category vector stores a 0 for the category.

In one preferred embodiment, the score given a particular category can be a function of category score given to any of the category's subcategories. This results in a "composite score" for the parent category. For example, if "ECOMMERCE" is a subcategory of "BUSINESS" and if a document scores high on ECOMMERCE and low on BUSINESS, the content recognition engine 718 may increase the score for the BUSINESS category. This approach preserves the hierarchical relationship of the categories, and overcomes the counter-intuitive instances in which a document scores high in a subcategory but low in the parent category.

This approach may be implemented as follows: If a parent category has subcategories, the score of that parent category will be the higher of: its own score, or the average of its score and the subcategory with the highest score. Hence assume B,C,D are subcategories of A, and a document has the following raw category scores of A=300000, B=700000, C=10000, D=200000. In this case the composite score for A would be 500000, which is the average of 300000 and 700000 (the maximum subcategory for subcategory B). Those of skill in the art will appreciate that there are various ways to augment a parent category's score by variations of this approach. Thus, in general, composite scoring is a function f such f(parent category score, scores of subcategories) yields a composite score for the parent category.

3. Multiple Dictionary Categorization

The ProReach systems can be tuned to their particular environment by splitting categories across multiple category tables. In one embodiment, this is done wit various category dictionaries, each covering different sets categories; the dictionaries may be implemented as different category tables in the database 720. A given category may be present in one or more dictionaries.

ProReach first categorizes the document using a first dictionary. In most cases, this will determine the final category for the document. Suppose for the sake of example that the chosen category is an uncommon parent category for a whole branch of the standard tree 1400, say stored mostly within a second, different dictionary. In this case, a further classification occurs, and again the highly unusual situation occurs where a further categorization in yet another, third dictionary is needed in order to obtain the finest possible detail. In this example, it turns out that the root category in dictionary No. 3 is a better match for the document than any of its descendants. Thus the third step (using dictionary No. 3) merely confirms the previous classification. Depending on time constraints, the second and third steps may have been turned off. In this case, the first step would still have provided useful partial information. If many categorizations descend three steps deep, periodic optimizations will tend to redistribute categories between dictionaries in a way that lessens the likelihood of this descent.

Each dictionary operation is a database table query followed by a small amount of processing. This operation takes approximately three times as long as a classification that has completed inside dictionary No. 1. The reason for more complex structure is that it frees performance limitations associated with large database searches and excessively large collections of categories. In particular, it combines the high precision of many categories with a low expected processing time.

For ProReach systems 100 with low traffic, one dictionary is likely sufficient, since data constraints do not justify storage of finest level of detail. However, for larger systems, in case poorly performing categories are present, these can mainly be delegated to secondary, more specific dictionaries. These secondary dictionaries also store detail in areas infrequently used.

This optimization seeks to maximize the event record weight classified completely within the first dictionary. This is optimized automatically for each system 100 based on current event record history. To do this, the heaviest categories are stored in the first dictionary. As in the example, one secondary dictionary might store subcategories of the category returned by the first pass, which are then used to determine further detail.

In one embodiment, this approach may be implemented as follows: Provide a tree of categories such there is a parent-child relationship between categories, such as in the standard category tree 1400. As in the category tree, each category has either zero or one parents. The category with no parent is known as the root. Let there be a threshold T such T is some integer between zero and a million inclusive (this range should be identical with the range of the scores).

Next, define a queue Q of categories. Add the root of the category tree to the ordered queue Q.

Select a document D to be categorized. Let R be a vector of category/score pairs, such as the category vector 908. That is, each element in the vector is a record consisting of a category and a score.

While the queue Q is not empty do the following:
1. Pop a category C from the queue.
2. Retrieve S, the set of subcategories of C.
3. Let V be a vector of category/score pairs P that result from categorizing document D with the set of categories in S.
4. Add the elements of the vector V to the vector R.
5. For each category/score pair P in V, add the P.category to Q if and only if P.score>=T This approach provides a descent through a tree of categories that is controlled by how well a document scores against a parent category. If the score against the parent category is too low (i.e. lower than the threshold), then categorization of the subcategories of that parent category does not occur.

4. Category Cache

ProReach preferably uses a caching subsystem that associates documents resident on a ProReach system 100 with their categorizations. This avoids re-categorizing documents, unless the documents have been changed.

More specifically, ProReach maintains two caches. One cache is the page metadata cache 716 which is persistent, and is stored in a database 720. The other cache is main-memory resident. On an as needed basis, data from the database cache is brought into the main-memory cache. Items can also be ejected from the main-memory cache because of resource limits (e.g., main memory, CPU utilization). The database cache is maybe stored as a relation of documents, timestamps and their categorization. Use of the page metadata cache 716 is as follows.

Given a document, a search is made for the document in the memory cache. If it is not there, a check is made to see if the document is in the metadata cache 716. If it is, an item representing that information is loaded from the database into the memory cache. If there is no cached item, even on the metadata cache, then the document has not been categorized. It is then categorized, and eventually the categorization will be flushed back to the database. (Flushing updates from the memory cache to the database is done as a background process).

If a cached item is found in respect to a document, then this cached data is ignored if the timestamp on the document is more recent than the timestamp on the cached data. If the document is considered to have changed, based on its timestamp, then the document is re-categorized.

Certain optimizations may also be made to this cache over time. In particular, highly dynamic data may cause the cache to churn, through unnecessary related re-categorization attempts. Such wasted work may be avoided by keeping a counter on each cached item, and updating the counter each time the cached item is changed. If more than a predetermined number of changes occur (within some prescribed time period), it is probably reasonable to infer that the document is dynamic in its content and it should be considered uncacheable.

To this effect, a cached item could have an "UNCACHE-ABLE" field on it. Once a cached item has this field set, the cache manager will immediately stop looking for this item on the database, and it will not try to maintain it in the memory cache either.

Recently, when web sites want to customize web page content to users, they have tended to store specific parameters in cookies rather than in the parameters passed in URL's (and passed to CGI scripts.) Therefore, ProReach attempts to identify this practice to label these URL's as UNCACHEABLE.

Clients of the cache subsystem may want to aggressively populate the cache. Typically, this will be done by spidering some set of documents and running their corresponding uniform resource locators through the content recognition engine. Such spidering can be run once or periodically. It is quite possible in many systems that almost all documents will have an entry in the cache subsystem. This will reduce the computational cost and delay of runtime categorization.

VII. Global Services

ProReach provides a set of global services via the global services server 112. These global services are global in the sense that they are run via the Internet as a centralized set of services available to all ProReach systems 100 and ProReach-enabled web clients 108. One capability of these global services is the allocation of global identifiers that are used to identify web visitors, but these global services also provide many other capabilities.

There are six global services. They are as follows:
Global Identifier Service
Global Upload Service Global Client Management Service
Yellow Pages Service
Global Exchange Policy Service
Global Aggregation Service A. Global Identifier Service In ProReach, it is always the goal to identify a web client as accurately as possible. To this end, a number of modern techniques are used by the global identifier service 602 to identify web clients. First, each web visitor (or web client) will be represented by a unique identifier, such as a 128-bit value.

In many cases, a web visitor cannot be personally identified. In many cases, a web visitor cannot be personally identified. Instead, we can only identify the machine on which web visitor was using his or her web browser, sometimes we can only approximately identify the machine, because we can only identify the web browser via examination of cookies held by that web browser. If a single computer could only use a single web browser, then the one-to-one correspondence between the computer and the web browser would allow a more precise identification. However a user on a single machine might have multiple (N) web browsers, and thus would be treated as N distinct web visitors. It is also the case that multiple individuals could use the same web browser (or web browsers). In this case, we would be unable to detect the different individual persons using the same web browser, and would treat this set of individuals using the same browser as a single web visitor.

In other cases, a web visitor can be individually identified. To draw attention to this distinction, we have two kinds of 128-bit identifiers.

GIDs: Global IDs identify computers using cookies with those GIDs in the cookie.

PIDs: Person IDs identify individual web visitors based on their login name and other demographic data.

As just stated GIDs and PIDs are both 128 bits; to distinguish between these two types of IDs, the first bit of GID is always set to zero and the first bit of a PID is always set to one. Hence, GIDs and PIDs are easily distinguished from each other.

The Global Identifier Service 602 plays an important role in allocating or computing GIDs and PIDs. The "clients" of this aspect of the global services server 112 are other web servers, particularly ProReach-enabled web servers 102. These ProReach-enabled web servers 102 may need the assistance of the Global Identifier Service 602 in order to identify a web visitor —be this a computer needing a GID or a person needing a PID. We call the ProReach-enabled web servers 102 that make requests for identification as identifier requestors. These identifier requestors make identification requests to the global identifier service 612. Each such identification request will be one of two kinds. It will be an anonymous identification request or an individual identification request. The handling of each kind of request is described below.

1. Requests For GIDs.

An ProReach-enabled web server 102 needing a GID to identify a web client 106 makes a request to the Global Identifier Service 612. The protocol used is HTTP-based in order for the Global Identifier Service 612— acting as a web server—to gain access to ProReach cookies. The process flow for this request was previously described with respect to FIGS. 7a–7c.

The ProReach-enabled web server 102 cannot examine this ProReach cookie directly because the HTTP protocol only allows a web server to look at its own cookies. Since ProReach-enabled web servers 102 do not belong to the ProReach domain, but to their own domains, they do not have access to ProReach cookies. This fact explains why ProReach-enabled web servers depend on a global service, running under the ProReach domain, to get access to the GID stored in the ProReach cookie (if any).

When a web client 106 contacts a ProReach-enabled web server, the ProReach-enabled web server uses the HTTP protocol to redirect the web client 106 to the global services server 112. However, the global service server 112 must be able to redirect the web client 106 back to its web server 102. This is done by web server 102 redirecting the web client to the global services server 112 via a URL that contains callback information. In particular, the URL contains the domain of the web server 102, and it contains some other data.

The exact format of the URL-encoded request might be something like what is shown below:

http://www.ProReach.com/servlet/getGid?webserver=www.webserver.com/index.html where www.webserver.com identifies the domain of the requesting web server 102.

The web client 106 receives this URL as part of a redirection request. The web client then automatically goes to this URL, and carries the ProReach cookie with it. The global identifier service 602 takes this request and extracts the request identifier and the name of the web server. It checks for the ProReach cookie. If one is there, it extracts the GID. If one is not there, it generates a GID, and creates a ProReach cookie with the GID embedded in it. This GID is guaranteed to be unique across all systems. That cookie with the GID is then stored back on the web client, so it will be there for next time. Also a check is made to see if the cookie was accepted because we do not want to assume the client accepted the cookie; it is important enough to warrant a check to determine that it was accepted.

After this, the ProReach web server does a web redirect back to the originating "client" web server. So two web directions are involved in order to make this scheme work. This second web redirection just goes in the opposite direction of the first, and this time the URL to which the web client is redirected contains the GID obtained.

Suppose the 128 bit GID, in octal notation, is 123456787012345677, then the result message for the ProReach-enabled web server 102 might be something like this:

http://www.webserver.com/index.html?gid=123456787012345677

The format for encoding the information below used above is merely suggestive. The originating web server 102 can then take this metadata and associate the incoming request with a GID; it can then associate this GID with any kind of HTTP session it uses.

The global identifier service 612 also maintains another table called the GIDHID table. This table has two columns: a HID column and a GID column. A HID is an identifier that uniquely identifies a ProReach system 100, specifically it is a hub ID. For example:

| HID | GID |
|---|---|
| 119 | 023231787012345677 |
| 119 | 070701787012345672 |
| 391 | 023231787012345677 |
| 421 | 023231787012345677 |

Each time ProReach returns a GID to a ProReach system 100, it ensures that there is a row in this table with the HID of the requesting ProReach system and the returned GID.If the row already exists, no change is needed. If the row does not exist (e.g., for a newly created GID, or for an GID of a new web client to the server 102), it is inserted. Note that this is a many-to-many relationship. Each HID can be related to many GIDs. Each GID can be related to many HIDs. Note for example that GID 023231787012345677 is associated with two hubs, 391 and 421, meaning that this web client 106 has been used when visiting both hubs.

Using the GIDHID table, it is simple to form SQL-like queries that can compute what hubs a web visitor visited. It is also simple to compute the web visitors that visited a given hub. It is also simple to compute the web visitors that visited two different hubs.

2. Individual Identification via PIDs

It can often be difficult to uniquely identify an individual. For example, two distinct people can have the same exact name and same date of birth; conversely, a person might go by her maiden name when she works professionally and by her married name otherwise, and yet these "two" people with different names are the same person. Accordingly, to determine whether two web visitors are in fact the same person, we compare the demographic data of the two web visitors and determine, through some set of comparison rules, whether this demographic data identifies the same person or not. Such a conclusion is a judgment that will depend both on the quality and quantity of the demographic data and the comparison rules.

We call the demographic data of an individual a dossier. The actual data in such a dossier can vary, but will typically include attributes such as standard demographic data including attributes such as name, date of birth sex, country of residence, and country of national origin. A dossier might also include attributes for primary e-mail addresses, all known e-mail addresses, work phone number, home phone number, cell phone number, names of friends, university attended, name of spouse, education level, religion, occupation, hobbies, sports interests, favorite kinds of music, favorite kinds of books, favorite web sites, favorite web pages etc. because it is hard to anticipate all possible attributes that should be stored in a dossier, a dossier may also be implemented simply as a hashtable, so that an attribute name is used as a key, and its value is stored based on that key is the hashtable.

Requests for identifying an individual via a PID are called individual identification requests. An individual identification request contains some set of demographic information (e.g., name, date of birth, sex and occupation) selected from a dossier associated with the PID. Thus, for each PID, ProReach maintains a dossier in a dossier table. An example of a dossier table is:

providing multiple email address fields for each PID. By the same token, additional fields for other demographic attributes may be easily provided.

Using a dossier table the Global Identifier Service 612 maintains a database of such web visitor dossiers. Each row represents a dossier of a particular web visitor.

When an visitor visits the web server 103, the server determines if the user has visited before. Typically, this is done by requesting a name and password from the web visitor. Using the name and password, a check is made to see if such a registered user is known with this name and password. If so, then a PID for this user will have already been obtained. It will have been obtained via the following method.

During the registration process, demographic data from the user being registered is collected. Typically, this is done by having a user fill out a form with this information on some web based form. This demographic data for this registered user can be used to create a dossier.

The dossier of the user being registered at the web site is then shipped to the Global Identifier Service where this dossier can be matched against all the other dossiers in the dossier database. The actual matching rules by which it is determined if a dossier matches up with an existing dossier are specified by the systems administrator, and for example, may be embodied in an expert system that has rules that determine whether two dossiers do or do not represent the same person. If a matching dossier is found, the PID associated with that dossier is the PID for this newly registered user, and this PID is returned to the web server 102.

If no matching dossier is found, then a new PID is created, and a visitor dossier is created for this web client. This visitor dossier will contain the PID, the name, the e-mail address and other available metadata. This dossier is then added to the dossier table of visitor dossiers. The new PID is then returned to the ProReach-enabled web server 102 as the result of the identification request.

If a dossier match occurs, the new dossier (in the identification request) may contain information absent in the existing dossier. When this occurs, this new information is added to the existing dossier, so as to improve the likelihood of matches in the future.

An alternative embodiment is to never return PIDs to web servers. Instead, unique identifiers called RIDs could be returned to the web servers. An RID could be an integer or other string. Together, a web server's HID [its hub identifier] and RID form a compound key that uniquely identifies a PID on the global services server. The keys are stored in an HIDRID table maintained on the global services server. Note also that a HID and PID uniquely identifies a RID.

| PID | EMAIL | SEX | COUNTRY | GIDs of machines used | LASTNAME |
|---|---|---|---|---|---|
| 1234567870123456 77 | Jow@yahoo.com | male | USA | 0232317870345677 | Jones |
| 1776673701234165 31 | Yama@home.com | female | USA | 023231787012345677, 017643223422217653 | Yamaguchi |

The columns given here are suggestive only. For example, the table definition below does not account for the fact that the same person might have multiple e-mail addresses or physical addresses, though this is easily accommodated by Each time a PID request is fulfilled, a unique HID and RID is returned to the ProReach-enabled server. This is done as follows. The PID computed and the HID of the requesting hub are used to select a RID from the HIDRID table. If there is no such PID and HID combination in the table, then a unique RID value is generated for the combination and stored in the table. The RID must unique in the sense that the HID and RID columns form a compound key. Finally, the selected (or dynamically generated) RID is returned as the result of the PID request. The sample HIDRID table below illustrates this relationship:

| HID | RID | PID |
|-----|-----|-----|
| 184 | 343242 | 0232310000345677 |
| 199 | 444343 | 7652317870345644 |

An advantage of this approach is that there is a level of indirection between the RIDs and the PIDs. This level of indirection allows dossier matching 15 mistakes to be corrected. For example, suppose it is discovered that the PIDs 0232310000345677 and 7652317870345644 actually represent the same individual. This error can be fixed by adjusting the HIDRID table to replace one of the PIDs with the other, so that both HID-RID associated have the same PID. For example, PID column of the second row may be updated so that it now has the value 0232310000345677, as follows:

| HID | RID | PID |
|-----|-----|-----|
| 184 | 343242 | 0232310000345677 |
| 100 | 444343 | 0232310000345677 |

This change will now ensure that if the web visitor at hub 184 with RID 343242 is compared with the web visitor at hub 100 with RID 444343, they will be identified as the same individual.

The global identifier service provides a service that takes two such HID/RID pairs and returns true if they related to the same PID in the HIDRID table. Otherwise it returns false.

Note that this level of indirection can also be used to fix dossier matching mistakes where two actually distinct web visitors were erroneously matched, via dossier matching, as the same person. Again, as in the above example, the mistake can be fixed in the HID/RID table. The two or more rows that have the same PID would be altered so that their PID columns were distinct. In addition, new dossiers for the new PIDs would be created in the dossier table.

B. Global Upload Service

The Global Upload Service 606 enables ProReach-enabled web clients 108 to upload their web activities. In response to received data, the service sends an acknowledgement to the ProReach client 108 when an upload is completed successfully.

In addition, the Global Upload Service 606 has the responsibility for distributing this data to the appropriate ProReach systems 100. The Global Upload Service enables ProReach systems 100 become a subscriber to web visitor data. It also allows ProReach systems to stop being a subscriber to web visitor data. Each system 100 can subscribe for the uploaded data of specific web visitors. To do so, the service 606 provides a list of GID to an system 100; the system returns the GIDs of the visitors that it wants to subscribe for.

When a web client uploads its web activity data using the Global Upload Service, then the Global Upload Service determines which systems 100 subscribe to this visitor's data. The service notifies each subscribing ProReach system 100 that it has data waiting for it. This notification is sent to a Receive Client Data Service of each such subscriber ProReach system 100. Once the ProReach system 100 is notified of the waiting data, each such notified ProReach system 100 retrieve the data within a reasonable period of time (e.g., 24–72 hours). If it is not retrieved, it is deleted.

To manage delivery of uploaded data, the Global Upload Service 606 creates a package including the uploaded data and a recipient list. The list identifies by HID those ProReach systems 100 that are subscribers and includes a timestamp. The data will be deleted when the current time advances beyond the timestamp. At that time, the uploaded data expires and is deleted.

In addition, when subscribers come and retrieve the uploaded data, that subscriber is removed from the recipient list. When all subscribers are removed from the list, the data is discarded, as it has been delivered to all the recipients. Of course, if recipients fail to pick their data, it will be discarded anyway when it expires.

C. Global Client Management Service

ProReach tracks web clients with client-side software that monitors the web user's activities. Periodically, the collected data is uploaded to ProReach, as described above.

To provide this facility, user can download the ProReach client software to install on their computer. The global manager service 608 also maintains a list of those client computers (identified by GID) that have downloaded the client software. When the software is installed, the client 108 transmits a confirmation to the service 608, and with the client's GID. When a confirmation is given, the GID provided with the confirmation is maintained in a list of GIDs. Using the received GID from the installation, and an email address in the dossier, it is possible to contact any web clients that have installed the client-side tracking software.

If the client-side tracking software is uninstalled, the uninstall sends an uninstall message to this service along with the associated. This GID is then removed from list of GIDs with client-side tracking enabled.

D. Yellow Pages

This service 610 maintains a database of the ProReach systems 100. Every ProReach system 100 is registered by the yellow pages service 601, and listed in this database. The database includes for each ProReach system 100:

The name of the ProReach system.

IP address and port of hub, and a list of the supported domains.

Contact information for the ProReach system, including an e-mail address of the system's administrator is included, so that e-mail can be sent to the person responsible for the ProReach system.

A unique ProReach system ID (e.g., the HID) that uniquely identifies that ProReach system.

An indication whether the listing is private, protected or public. A listing is private if it cannot be seen by any one else (except ProReach Global Services). A listing is protected if it can only be seen by ProReach systems that share a common ProReach alliance 800. A listing is public if it can be seen by any ProReach system 100. The default is private.

A list of the alliances 800 that the ProReach system is a member of.

An ProReach system 100 can only add, delete or modify its own entry. An ProReach system 100 can read the entry of any public listing, and any listing that is private and in same alliance as it is.

The service 610 provides the abilities to add, delete, and update any entry, and to make an entry public, private or protected. The service further enables systems 100 to join or leave alliances. The service further provides lookup functions by company name, domain, or alliance. Finally, the service 610 provides functions to create an alliance, and list all alliances, and list members of an alliance.

E. Global Exchange Policy

Each ProReach system 100 can define an exchange policy. An exchange policy serves two related but distinct purposes. First, the exchange policy describes a demographic statement. A demographic statement explains what kind of visitors visit ProReach system: number of visitors, kind of interests, frequency of visits, kind of web visitors. The information in a demographic statement is the responsibility of the individual ProReach system that makes the statement. A demographic statement can be used by others as a way to evaluate this ProReach system. Such an evaluation may be made when one ProReach system is considering a sharing relationship with another ProReach systems. Second, the exchange policy enables trading of anonymous user group and category complexes, and user profiles. The policy can identify one or more specific users, user groups, or complexes as being available for trading. This information is anonymous, as the profiles and complexes do not contain information that can be used by the recipient to personally identify any individual user. A collection of such information is described in an information resources, which may be associated with keywords to allow other systems to more readily search for an identify the resource. An information resource may also contain one or more exclusions, which describe information (e.g., profiles, categories, groups, or complexes) that will not be traded.

For example, ProReach-enabled www.acme.com could have a SportsCustomer resource and another ProReach system-enabled www.womensclothing.com could have a WomensClothing resource. These two ProReach systems could agree to make an exchange, such that the profile data of both groups is transmitted to the other ProReach system, either on a one-time basis or periodically. The data in these exchange policies will make it simpler for these ProReach systems to find each other and do some trading. The transmission of this data preferably does not include customer contact information, so that the anonymity of the web visitor is preserved across systems. However, even with this restriction, the information is still useful, because now each ProReach system's database of profile information is increased.

For example, suppose via this exchange www.acme.com gets profile information on a web visitor associated with GID9834232122. Suppose that www.acme.com has never been visited by the web visitor with GID9834232122.

Now suppose that this web visitor with GID9834232122 visits this site. While this web visitor GID9834232122 is new to www.acme.com, this ProReach-enabled web site already has information about this web visitor. It got this profile from www.womensclothing.com.

An exchange policy can also specify a just-in-time sharing policy. A just-in-time sharing policy indicates that profile information for a specific GID can be requested. Such explicit requests are useful because, as a new visitor arrives at a ProReach-enabled web site, the website can welcome the web visitor and —in the background —request profile information related to this GID, looking for this information from its exchange partners.

Accordingly, the global exchange policy service 612 enables ProReach systems 100 to create, delete and modify an exchange policy. Creation includes defining the information resources that the system 100 is willing to trade. The service further enables methods to create, delete and modify an information resource for an exchange policy. The service 612 then maintains a database of the listed exchange policies, and allows searching of the database by keyword, category, user group, or user GID.

Global profiles are maintained very much the way they are maintained on the individual ProReach systems. However, unlike the local, system specific profiles, the global profiles only track user interest in the categories in the standard category tree 1400. It is anticipated that this database will be quite large, and thus a high performance, scalable database is desired. In a preferred embodiment, an Oracle8I database is used for this implementation so that any Java processing can be executed inside the actual database server.

VIII. ProReach Client Side Web Usage Data Collection

A. Web Activity Monitoring

As described above, certain web clients are ProReach enabled by including client side software that track their web activity. This activity is need only be recorded for web activity that arises on web servers 110 that are not ProReach enabled and thus do not have the ability to track web activity directly.

This activity is recorded in web event records and then uploaded to the global upload service. In one embodiment, this activity is captured by monitoring the browser during operation. One method is using browser APIs to monitor the browser events and communicate with the browser when a browser has API support for external applications. One other possible method is using low-level Windows API/service such as Windows Hooks to monitor browser's window events.

For monitoring Microsoft Internet Explorer browsers, we prefer to use a Browser Helper Object (BHO) to attach to Internet Explorer, which has a COM-based object model. A BHO is a COM in-process server registered under a certain registry's key. Upon startup, Explorer looks up that key and loads all the objects whose CLSID is stored there. The BHO is tied to browser's main window. Each new instance of a browser window will have its own BHO associated with it. A BHO is unloaded when a browser window is destroyed. A BHO can receive notifications about the Explorer OLE-COM events. There are a total of 18 different events an browser window can fire. By monitoring events such as DownloadComplete, NavigateComplete2, OnStatusBar etc., a BHO can know what document has been downloaded in a browser window.

Netscape browsers provide an API called NCAPI (Netscape Client API). NCAPI has two major parts: one part uses OLE, the other uses DDEML (Dynamic Data Exchange Management Library). The one of interest to ProReach client-side tracking is DDEML. Just like BHO in Explorer, an application can use NCAPI's DDEML to communicate with Netscape browsers and get notifications when certain browser activities happen. Unlike BHO, an NCAPI DDEML program is an external application, and it is tied to a Netscape process, not just a browser window. One instance of an NCAPI DDEML program can monitor all Web activities in all browser windows associated with a Netscape browser process.

B. ProReach Client Web Usage Data Filtration and Aggregation

1. Time-based consolidation

Given the rapidity with which users view and move between web content it is likely the many web events that are not useful to record. Second, because the many web clients 108 are not time synchronized, the recorded times in the records will not be consistent between clients. There are various mechanisms to handle these issues.

a) Adjust web event record time stamps

Every client machine has different clock settings. It is meaningless to record the time of the user's Web activity based on client machine clock. ProReach client software needs to adjust the time stamp of each user Web activity with a global reference time. This adjustment is done before web event record is uploaded.

1) ProReach client software to firsts query the ProReach Global Upload Service on the server's GMT reference time.

2) ProReach client software then calculates the difference in GMT time between the client machine and the ProReach server. This difference is TD.

3) ProReach client software adjusts the time stamp in each entry of web event record by adding this TD to the time stamp.

b) Ignore short-term activities

If a web activity lasts for a very short time, for example, less than 10 seconds, ProReach will not record it in a web event record. This may happen while a user is using the browser's back/forward button to search for a previously visited URL or when a user is navigating through links.

c) Aggregate Web activities

As mentioned before, multiple occurrences of the same Web activity will be aggregated. This aggregation is done on the fly while URL is being captured by ProReach client software. To speed up computation, ProReach client software will use hash table to store WUR.

2. Other Filtration of Data

To further limit the data collected, the client 108 also filters out and does not store web event records for accesses to the user's home page. However, the user's homepage may be stored in the user's profile to provide additional demographic or other interest information about the user.

As noted, when the client 108 is visiting a ProReach enabled web server 102, there is no need for the client 108 to capture web events. Accordingly, whenever the client 108 observes URLs for web servers 102, or domains served by such servers, it does not store the web activity data.

3. Privacy Control

ProReach client 108 users agree to use ProReach client software based on "informed consent." ProReach system provides an explicit privacy statement to potential users before they become ProReach client software users, so that users will know that their activity is being tracked and recorded. The ProReach client software contains a user-modifiable control mechanism and a default control mechanism. The default control mechanism addresses the control of common privacy related issues that can be applied to all users. These mechanisms allow the user to filter web activity data from being recorded according to user preference.

C. Filtration based on privacy settings (User modifiable)

ProReach client software supports configurable user privacy preferences and at least two types of filtration based on user privacy settings: URL pattern-based filtration and keyword-based filtration.

1. URL pattern-based filtration—

ProReach client software allows users to set the patterns of the URLs they do not want to be recorded and shared with a ProReach system 100. The URL pattern can be a complete URL, the domain part of a URL or part of a URL with wild-card characters. Example of URL patterns include:

1) A complete URL: http://www.xyz.com/xyz/abc.html

2) A partial URL: http://www.xyz.com

3) The domain part of a URL: http://www.xyz.com

4) Wild-card pattern:*xyz*

2. Keyword-based filtration

Users can specify a list of keywords as part o their privacy preference settings. ProReach client software matches the content of the URL captured against the keywords, and if there's any keyword matching, the URL will not be recorded in a web event record. Keyword matching includes single word, multiple single word, and phrases. In one embodiment, to reduce the overhead of this process to the user's computer, by default, the client 103 only does the keyword match on document title and the HTML "keyword" <meta> tag. Alternatively, the entire document content keyword matching will be provided as user-selectable option.

In one embodiment, the ProReach client software provides a standard keyword templates for its users. Each template is based on a specific category or categories from the ProReach standard category tree. Users also have an option to add more keywords to a specific template. Again, when keywords from the template are matched against a page of web content, then the URL is not recorded D. Default privacy-related filtration ProReach client software supports a default policy on privacy-related accesses to user's Web activity data. One privacy-related activity is the user login process. Many Web sites use a simple HTML form-based login, and the user login information is sent to a CGI program by an HTTP "GET" request. In such cases, the user's login data are all included in the URL, and ProReach client software can capture all those data. In its simplest form, the login data may not even be encrypted before they are sent from the user's Web browser. If the ProReach client software treats such kind of URL without discrimination and sends it in its entirety to the ProReach system, it may inadvertently disclose private information Any person who has control of a ProReach system could get access to many people's very private information such as bank account, social security number etc. Accordingly, ProReach client software makes it a default policy to filter and strip off the login data contained in the URL. For example, user Joe is trying to log in to XYZ bank's online service via a browser, the URL may look like:

http://www.XYZbank.com/login.cgi?login=joe&pwd=joexyz&set_cookie=xyz1234567abcdefg In this case, the ProReach client software either strips off the sub-string in the URL after "?" or ignores the entire URL completely.

E. ProReach Client Data Upload

1. ProReach client upload queue

ProReach client software maintains an Upload Queue. We use the file system of client computer's Operating system for creating the ProReach client upload queue. Each item in the upload queue is a file. The file name has a fixed portion and a variable portion. The variable portion of the file name is a number. ProReach client software will maintain a counter for this queue number. For example, the file can be named ProReach1.WER, ProReach2.WER, ProReach3.HOM etc. "WER" means the upload item is a list of web event records, while "HOM" means the upload item is the user's browser's startup page URL. The counter will be reset to 0 when the queue is empty. There is a pre-set size of the upload queue, and it is FIFO (First In First Out). If the upload queue is full and new data need to be inserted into the queue, the first item in the queue has to be discarded. The upload queue size will be large enough, 500K, for instance, so that no data will be discarded before the upload of them occur. The data will only be discarded either after a successful upload or after some number of repeated upload attempts.

2. ProReach Upload Stream and Upload Record

An ProReach upload stream represents data uploaded in one upload session. Data uploaded in one upload can be composed of several upload records. The upload stream has a head and a data part. The head marks the beginning of the upload stream and contains the ProReach Global ID for the user and the number of upload records contained in this upload stream. The data portion-contains one or more upload records. Each upload record in the upload stream corresponds to an upload item in the upload queue. There can be two types of upload records: web event record and HOM record. Each upload record also has a head and a data part. The head marks the beginning of an upload record, and the data is the actual upload data. The head of the upload record contains the head divider, the name of the upload queue item for this record, the upload record number, the length of the data (excluding head and record dividers), and the number of records in the data portion. The heads for both the upload stream and the upload record have fixed lengths. The web event records and the HOM records have variable lengths. ProReach client software will use a non-printing character as the record divider.

3. Data upload a) Web Event Record upload

ProReach client software has to upload the captured web events at pre-configured time intervals. This time interval is pre-determined and preferably cannot be reset by the ProReach client user. The preferred time interval is between every 15 and 30 minutes.

b) Homepage URL upload

This upload is an infrequently scheduled task. It is not likely that a user will change the startup page daily or weekly. Each time when the ProReach client software is started, it will check if the user's browser startup page has changed. If the startup page has changed, ProReach client software will insert a "HOM" upload record in the upload queue. It will perform this operation only if the startup page is a Web page designated with "http" protocol; it will not do this if the startup page is a local file.

4. Upload time and upload stages

Let's discuss ProReach client software operation related to data upload in three different stages: pre-upload, upload, and post-upload. Upload is needed only if the web event records in memory are not empty or the upload queue is not empty. There are two condition for uploading:

1) On a pre-set interval, when the user is connected to the Internet and the web event in memory is not empty or upload queue is not empty.

2) When a new browser process is started and the upload queue is not empty a) Pre-upload stage Before uploading a web event record:

1) Adjust time stamps.

2) Add the current web event record in memory to the ProReach upload queue. In addition to at the pre-set upload time, ProReach client software needs to add the web event record in memory to the upload queue when it exits.

b) Upload stage

ProReach client software will always upload data from the upload queue. ProReach client software has an "upload threshold". This is the amount of data that can be uploaded during each upload. During ProReach client software initialization time, this threshold is calculated based on the client computer's modem speed. It is desirable to limit each upload task to last for no more than 5 seconds. For example, if a client has a 14.4K modem, the "upload threshold" will be (14.4K/8)*5=9 K bytes. In each upload time, ProReach client software checks the size of the items in the upload queue and upload data up to the threshold. As an example, assume there are three items in the upload queue: item 1 is 1K, item 2 is 6K, and item 3 is 5K. Only item 1 and item 2 will be uploaded in the current upload; item 3 will be left to the next upload. If any upload item is greater than the upload threshold, it will be divided into smaller items before ProReach client software does the actual upload. If a user has a fast network connection, the threshold will be bigger. User's network connection speed will be detected by the ProReach client software during its initialization.

c) Post-upload stage

After the upload, the ProReach client software has to wait for acknowledgment from the ProReach Global Upload Service on uploaded data before it can discard the uploaded data. If there are no acknowledgments, the same items in the upload queue could be uploaded repeatedly until acknowledgments are received. Since there is a limit on the size of the upload queue, items uploaded previously without acknowledgments will be discarded eventually. However, if that happens, it usually means there are some serious problems with either the network or the ProReach Global Upload Service.

5. ProReach Upload Service and upload

As mentioned in previous sections, ProReach client software has to wait for acknowledgment from the Upload Service before it can discard upload items in the upload queue. The ProReach Global ID in the header of the upload stream tells the Upload Service where it comes from and what user the uploaded data is associated with. The Upload Service will check information contained in the Upload Stream header and the Upload Record headers to make sure all data are received successfully. The Upload Service will then send an Acknowledgment Record to the ProReach client to note it has successfully received the upload stream. The Acknowledgment Record contains a header and the data. The header contains a number that represents the number of names contained in the data part of the acknowledgment. The data part is a string with names of received upload items; the names are separated by ",". After the ProReach client software has received the acknowledgment record, it deletes upload queue items whose names match the names in the acknowledgment record.

This client data upload can be done via HTTP. In this case, the Global Upload Service resides on a Web server 112 or it has to be able to handle HTTP protocol, and the ProReach client software is implemented as an HTTP client (agent). The ProReach Upload Stream is sent as an HTTP POST request. There will be a timeout set for the ProReach client to wait for the Upload Service HTTP server reply for that HTTP POST request. If the ProReach client does not get reply within the timeout, the upload data stream will be resent later.

IX. Content Targeting

One of the features of ProReach is enabling targeted content delivery for web visitors. The services running on the web server that deliver this targeted content need to have a mechanism to access the profile of a current web visitor, or access the category information about a given page the web visitor has selected. ProReach makes this possible by exposing API's for java, "C", or Perl to access the ProReach data on visitor profiles and page categorization.

There are two scenarios where a dynamic web server process would need to access the ProReach data at runtime from a CGI or filter/module:

A. Access to Profile by a CGI

Each ProReach server 102 maintains a database of visitor profiles for each visitor that has ever visited a site within this ProReach hub's network; this is the profile table of the database 720. In one implementation of this database 720 in Java, a visitor profile object is composed of a vector of interests that indicate the categorization of activities of this web visitor. This Java-based instance of a visitor profile also contains several methods for accessing string-valued data such as the web visitors real name and postal address, which may be utilized in targeting web advertising to this visitor. For instance, it would not be useful to show a web visitor an advertisement for an Auto Transmission shop that does not exist in the region where the web visitor lives.

Figure 16:
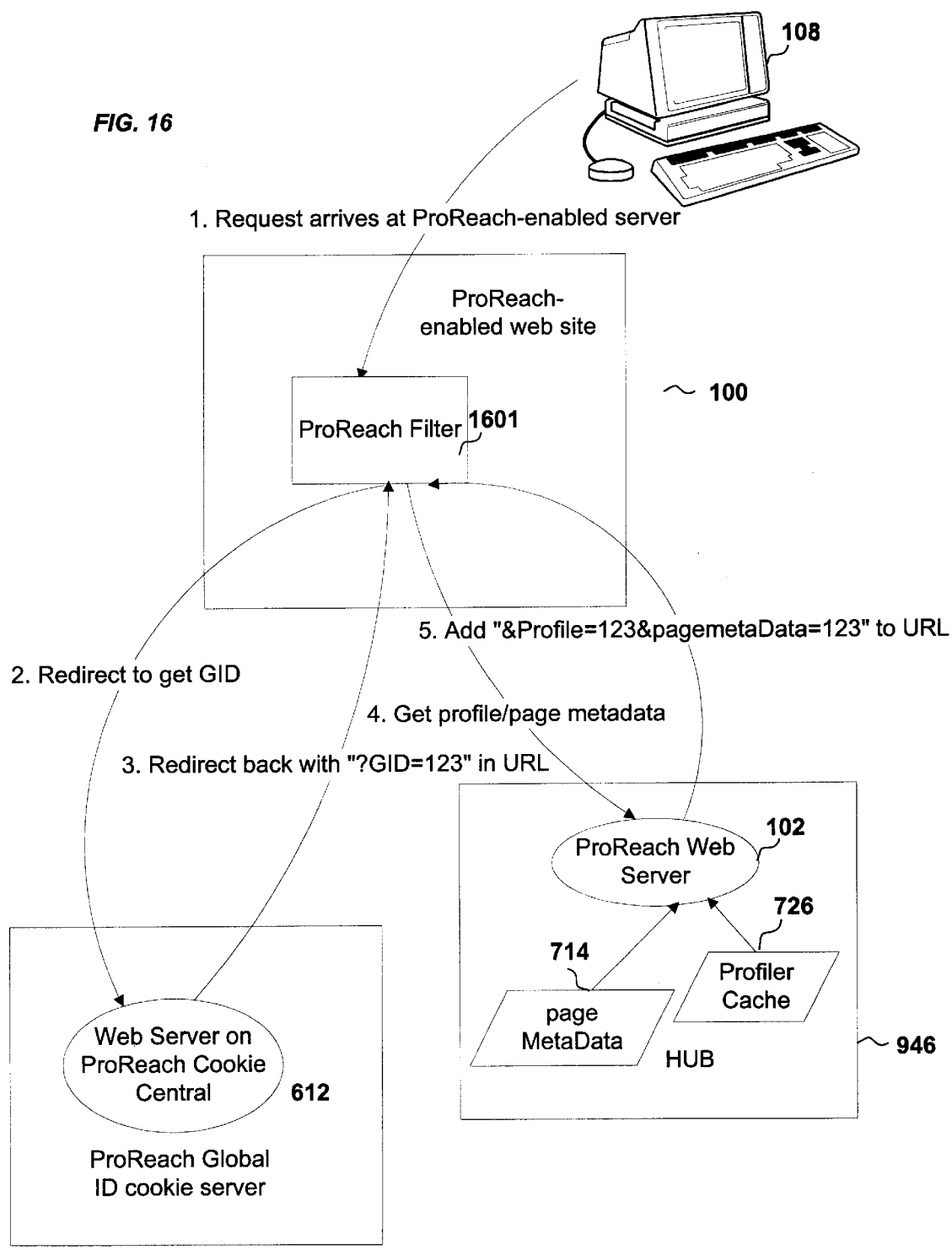
FIG. 16 illustrates the process of customizing content based on a user profile.

We have described above the process of uniquely identifying the web visitor via the GID using the HTTP protocol redirect functionality and cookies. If a ProReach-enabled system 100 wants to enable targeted content delivery we can use a similar method to get the profile for the web visitor. FIG. 16 shows a typical ProReach-enabled web site configuration, with the profiler 726 residing on the ProReach Spoke 202. If a web site wants to attempt to get a user profile record for each visitor that requests a page of the web site, a filter on the site is configured to redirect the request a second time to the web server 102 on the Spoke to pick up this information. FIG. 16 shows the flow of the request as it is redirected to the ProReach Back Office Web Server and the Profile record is added to the URL as a GET variable. This is simple and optimally performing implementation for getting profile data at runtime.

Some web sites may wish to access Profile data from a Java Servlet or application, and in this case an API is provided. Some examples of access to the Java API are listed below:

```
VisitorProfile joeUser=new VisitorProfile(ProReachGID);//con-
    structor for visitor profile, takes GID as input For (int i=0; i<joeUser.interestvec.length( ); i++)
```

/* Each profile contains a vector of interest names and integer values, called interestvec here. This loop will print out all of the interest names and values for this web visitor

```
system.out.println("interest"+joeUser.interestvec[i].get name(
    )+"score is "+joeUser.interestvec[i].get_value( ));
```

Int interest_value=joeUser.interestvec.get_value(int interest_index);//get the interest value given the index String interest_name=joeUser.interestvec.get_name(int interest_index); //get interest name given index Identity joesData=new Identity(ProReachGID);// constructor for the demographic portion of profile Identity joesData=joeuser.Identity;//getting identity out of the profile String firstname=joesData.firstname;//getting first name from demographic portion of profile String lastname=joesData.lastname;//getting last name from demographic portion of profile String email=joesData.email;//getting email from demographic portion of profile String address1=joesData.address1;//getting address from demographic portion of profile String day_phone=joesData.day_phone;//getting phone from demographic portion of profile

1. Access to page Metadata by CGI

The ProReach server maintains a database of categorizations for every page of the site, called Page Metadata 716. The method described above for using the http protocol to access profiles on the ProReach Spoke can also be used to efficiently access page Metadata. This solution for getting the metadata about a page at runtime only works if a mapping exists between all of the possible URL's of the site and their categorizations. This mapping is created by the Page Content Spider. This is a tool used by the web master to pre-categorize all of the web pages on the site before it goes into production. The Page Metadata Service can then use this data to service requests for page categorizations from the ProReach-enabled web server (see Chapter 14 for more information on the Page Metadata Service).

Some web sites have a single entry point for all page requests that come into their web server. This would be like an IIS filter, an Apache module or it could be a servlet. If such an architecture previously exists on the ProReach customers web site or can be implemented on the ProReach-enabled web site we can take advantage of this to optimize the ProReach-enabled web site's access to page metadata. A web developer may design a filter, module, or servlet that reads in the entire mapping to main memory first, and then indexes into this structure from main memory to access a page's metadata in the fastest way at runtime.

In the Java language the pageindex Object could be derived from the Hash object. The PageIndex object returns a Vector object of category scores for each valid URL object that is used to index into it:

PageIndex pageIndex=New LoadPageIndex(String SiteIdentifier);//constructor for page metadata object Vector Cat=pageIndex.get_value(Url);//retrieve the categorization for the page given the url Vector Cat=GetCatFromPageIndex(Integer Index);// retrieve the categorization of a page given its index Below is a static method to perform the same task in Java in the case where the CGI only needs the category vector for a single page:

Vector Cat=GetCatFromUrl(URL Url);//this is a static method call to get one categorization for one URL a) Handling dynamic content categorization of multipart pages at runtime The above solutions for server-side content targeting and page classification require that each URL requested from the server has been pre-categorized. Another embodiment provides a solution to web site developers who build pages from many component documents, and cannot or do not wish to categorize all of the possible permutations used to form the composite documents.

To implement this feature we a function such as getCategoryFromComponents(A, B, C, etc.). In this case A, B, and C are documents that are subcomponents of a page and have been pre-categorized and stored in the Page Metadata. The system administrators of this ProReach site then instrument the site CGI's that compose pages from components to make the above ProReach API call, which categorizes each component. This provides the capability to determine at runtime the composite categorization derived from these three component categorizations.

We claim:

1. A system for profiling users of online information systems, comprising:
    a first web server that receives requests from a user for web content items and records web events for selected web content items,
        wherein each web event comprises content identification information identifying a web content item, time information describing an amount of time the user interacted with the web content item, and category relevance information for a plurality of categories about the web content item;

an aggregation service that aggregates the plurality of web events recorded by the first web server with at least one web event obtained from a source remote from the first web server into aggregated information along at least one of a plurality of categorization dimensions;

a user group service for defining a plurality of user groups, each user group having a definable membership rule which can be evaluated with respect to at least one category based on category relevance information from web events aggregated by the aggregation service;

a profile service that determines for each user a user profile, the user profile specifying at least one user group, defined by the user group service, of which the user is member;

an alliance service for sharing user profiles with one or more remote web servers participating in an alliance;

a client application resident on a computer used by the user that records web events for selected items of web content requested from a second web server that does not itself record such web events, each web event recorded by the client application containing information identifying the web content item and time information describing an amount of time the user interacted with the web content, where the client application uploads the recorded web events periodically to a global upload service; and a global upload service, remote from the first web server, that maintains information for each user indicating one or more web servers that subscribe to receive web events for the user, receives the web events from the client application of a user, and provides the web events to the web servers that subscribe to the user's web events.

2. A system for profiling users of online information systems, comprising:

a first web server that receives requests from a user for web content items and records web events for selected web content items, wherein each web event comprises content identification information identifying a web content item, time information describing an amount of time the user interacted with the web content item, and category relevance information for a plurality of categories about the web content item;

an aggregation service that:
an aggregates the plurality of web events recorded by the first web server with at least one web event obtained from a source remote from the first web server into aggregated information along at least one of a plurality of categorization dimensions;

scales the category relevance information of a web content item as a function of the amount of time the user interacted with the web content; and transforms the category relevance information for each category into a weight, the weight being a function of a category score, the amount of time the user interacted with the web content item, a scaling factor, and a total time scaled category score for all categories;

a user group service for defining a plurality of user groups, each user group having a definable membership rule which can be evaluated with respect to at least one category based on category relevance information from web events aggregated by the aggregation service;

a profile service that determines for each user a user profile, the user profile specifying at least one user group, defined by the user group service, of which the user is member;

an alliance service for sharing user profiles with one or more remote web servers participating in an alliance;

wherein each category receives a scaled category score:

$$\text{NewScore}_i = \text{Category Score}_i * \text{Duration}_i * \text{Constant}$$

where $\text{Duration}_i$ is the amount of time the user interacted with the web content item, and Constant is a scaling factor; and wherein each category receives a Weight:

$$\text{TotalScore} = \sum_{i=1}^{n} \text{NewScore}_i$$

$$\text{Weight}_i = 100 * \frac{\text{NewScore}_i}{\text{TotalScore}}$$

* * * * *

UNITED STATES PATENT AND TRADEMARK OFFICE
CERTIFICATE OF CORRECTION

PATENT NO.    : 6,839,680 B1
DATED         : January 4, 2005
INVENTOR(S)   : Albert M. Liu, Stefan F. Gower and Hamid Ben-Malek It is certified that error appears in the above-identified patent and that said Letters Patent is hereby corrected as shown below:

Title page,
Item [56], References Cited, U.S. PATENT DOCUMENTS, insert -- 6,308,202 B1 * 10/2001 Cohn et al. ...........709/217 --.
OTHER PUBLICATIONS, insert -- Vignette Expands Focus from Content Management to Internet Management," M2 Communications, Coventry, 07-1998.* --

Column 70,
Line 2, replace "an aggregates" with -- aggregates --.
Line 29, replace "category" with -- $category_i$ --.

Signed and Sealed this

Twenty-second Day of March, 2005

JON W. DUDAS
*Director of the United States Patent and Trademark Office*